United States Patent [19]

Sakaki et al.

[11] Patent Number: 4,599,691

[45] Date of Patent: Jul. 8, 1986

[54] TREE TRANSFORMATION SYSTEM IN MACHINE TRANSLATION SYSTEM

[75] Inventors: Hiroshi Sakaki; Kazuo Hashimoto, both of Tokyo, Japan

[73] Assignee: Kokusai Denshin Denwa Co., Ltd., Tokyo, Japan

[21] Appl. No.: 494,361

[22] Filed: May 13, 1983

[30] Foreign Application Priority Data

May 20, 1982 [JP] Japan .................................. 57-83961

[51] Int. Cl.[4] .......................................... G06F 15/38
[52] U.S. Cl. .................................... 364/419; 364/900
[58] Field of Search ... 434/157; 364/419, 900 MS File

[56] References Cited

U.S. PATENT DOCUMENTS 4,502,128 2/1985 Okajima et al. ................. 364/419 X

FOREIGN PATENT DOCUMENTS 102071 8/1980 Japan .

OTHER PUBLICATIONS

Amamiya, M. et al., "Japanese Question-Answering System on the Topic of Figure Manipulations", *Review of the Electrical Communications Labs*, vol. 26, Nos. 7-8, Jul.-Aug. 1978, 1045-54.

Tsujii, Jun-ichi, "The Transfer Phase in an English-Japanese Translation System", Coling 82, J. Horecky, North-Holland Publishing Company, 1982.

*Primary Examiner*—Jerry Smith
*Assistant Examiner*—Clark A. Jablon
*Attorney, Agent, or Firm*—Collard, Roe & Galgano

[57] ABSTRACT

A mechanical translation system is provided to obtain a sentence of target language from the tree expression of source language. The processing progresses as follows: First, a pattern which coincides with partial structure, including the highest node, of the tree fragment chosen, is selected among patterns previously contained in the pattern dictionary. The pattern has a production rule attached to the pattern. The production rule takes "extraction information" which is composed of information in the source language tree fragment concerning the part outside of and under the above mentioned partial structure and "instruction information" which is attached to the highest node of the tree fragment, as input information and generates a tree fragment in target language corresponding to the source language tree fragment and also "instruction information" to be attached to the border nodes of the partial structure and other parts in the source language tree fragment which consists of memorizing the target language tree fragment and erasing the partial structure from the source language tree fragment and bringing back to the memory to contain target language tree fragments, thus produced normally plural "child" tree fragments. After processing a plurality of target language tree fragments contained in the corresponding memory and uniting them into a single tree producing the tree of target language tree, from which the sentence in target language is obtained immediately.

1 Claim, 135 Drawing Figures

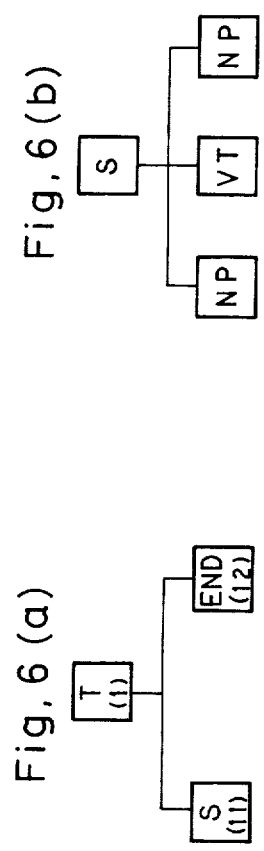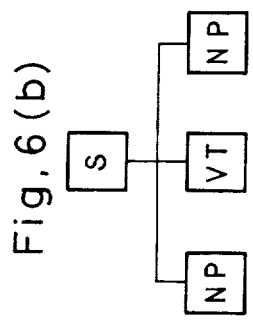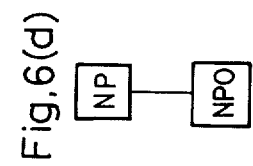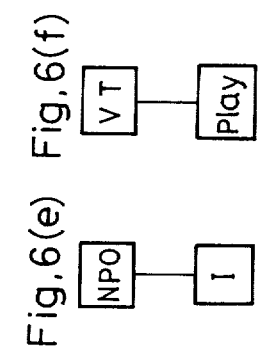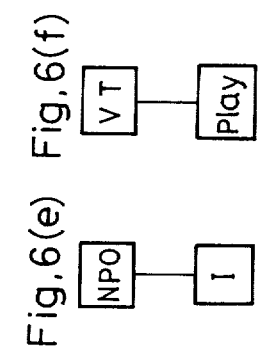

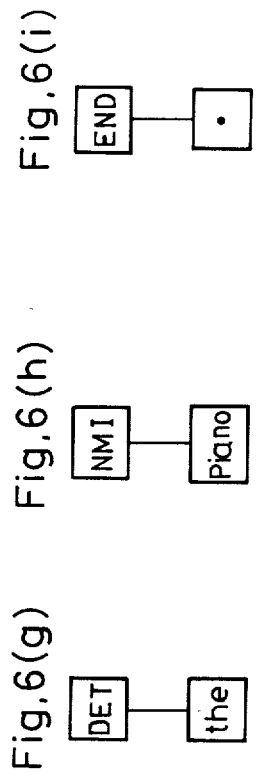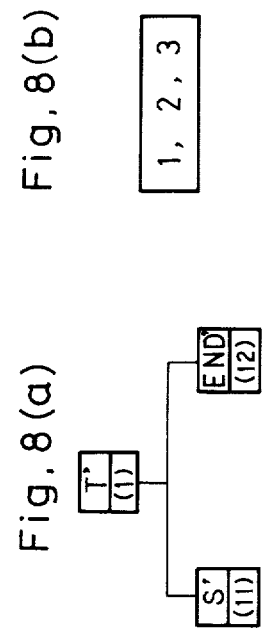

Fig. 15
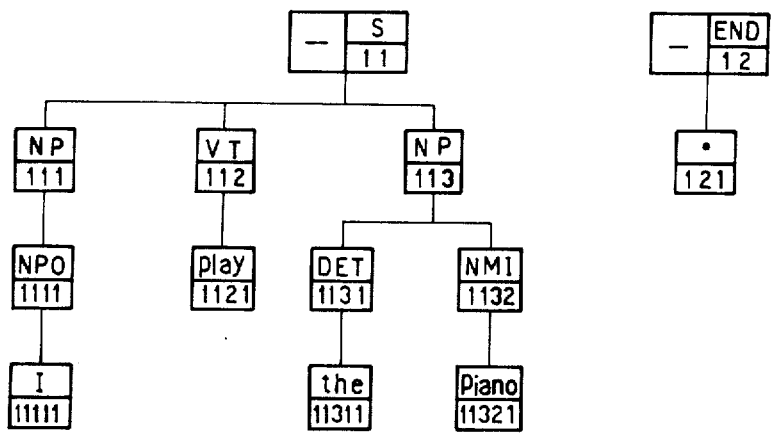
Fig. 16
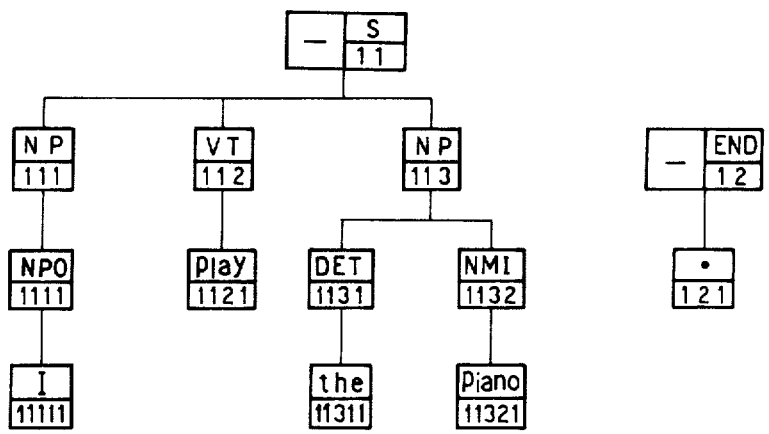
Fig. 17

Fig. 18
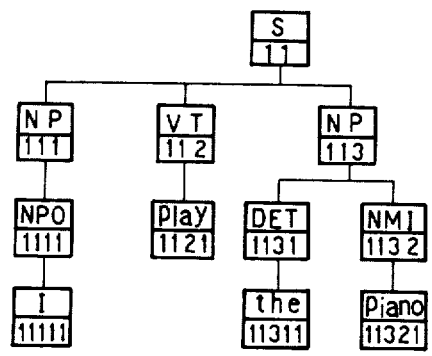
Fig. 19(a)   Fig. 19(b)
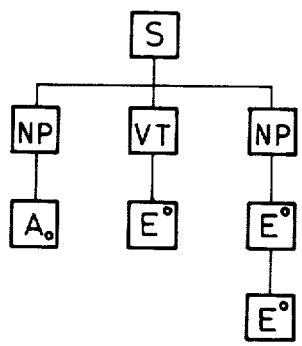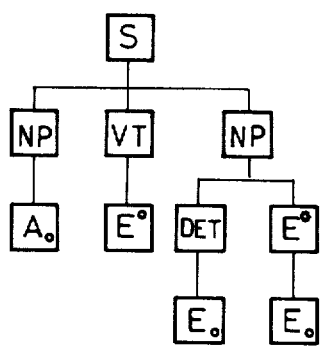
Fig. 19(c)   Fig. 19(d)
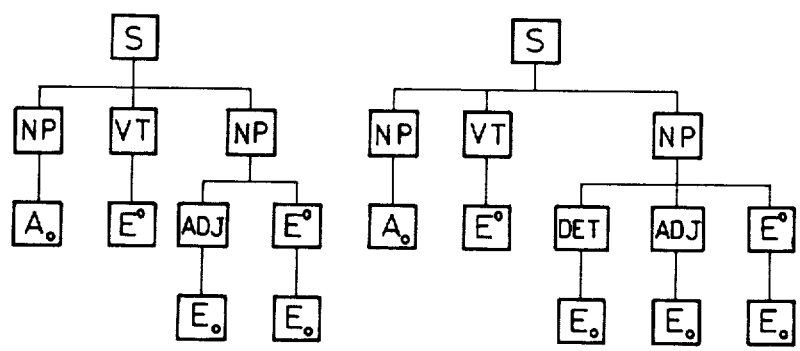

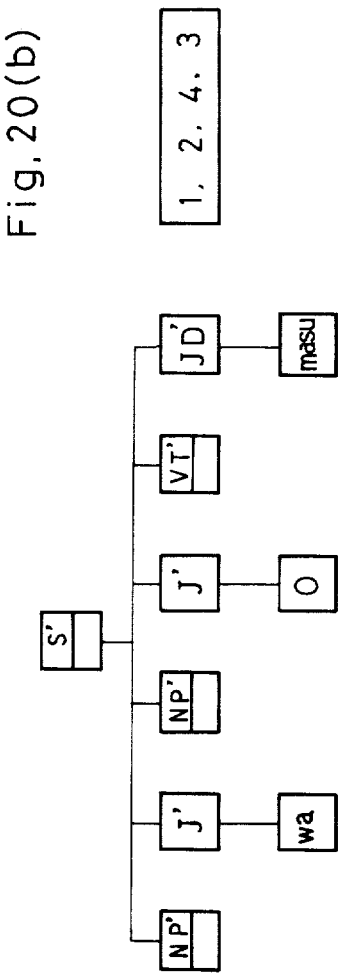
Fig. 20(a)
Fig. 20(b)
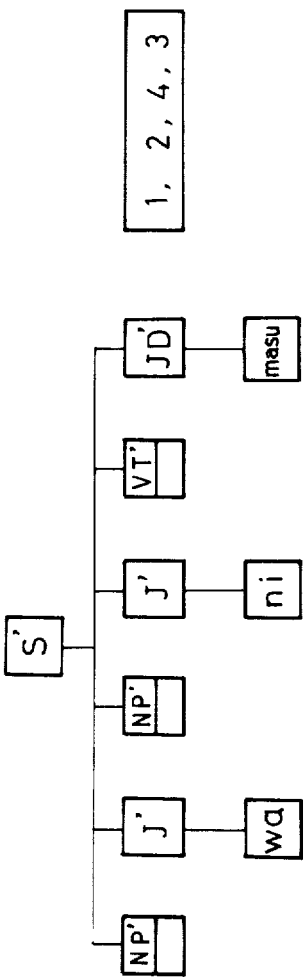
Fig. 21(a)
Fig. 21(b)

Fig. 22
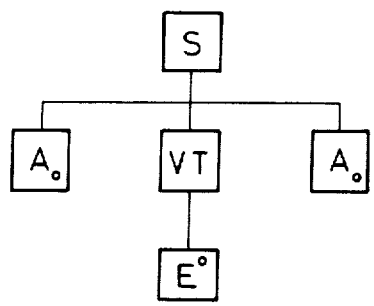
Fig. 23
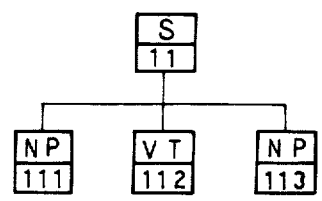
Fig. 24
| 11 | | 111 | | 112 | | 113 |
Fig. 25
| 11 | | 111 | | 113 | | 112 |
Fig. 26
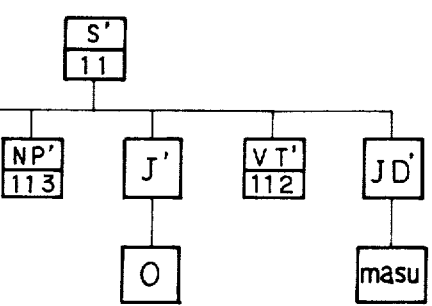
Fig. 27
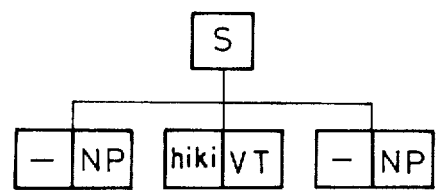

Fig. 39
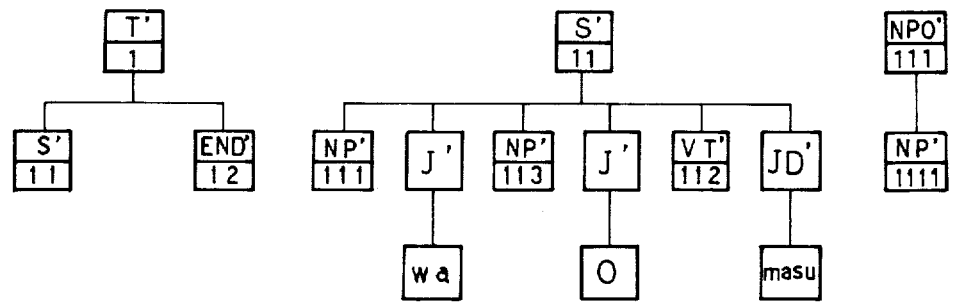
Fig. 40  Fig. 41  Fig. 42
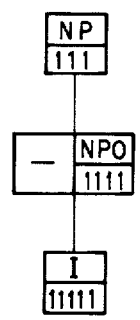 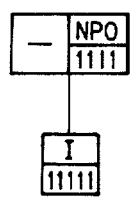 
Fig. 43
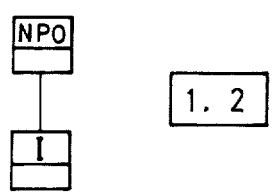
Fig. 44
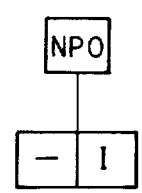

Fig. 45
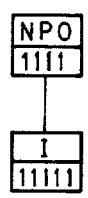
Fig. 46
Fig. 47
Fig. 48
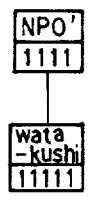
Fig. 49
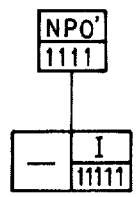
Fig. 50
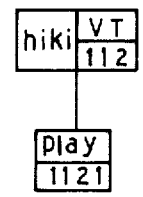
Fig. 51
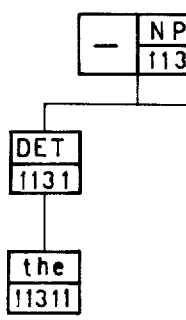
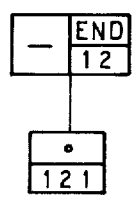
Fig. 52
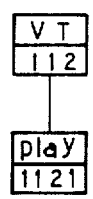

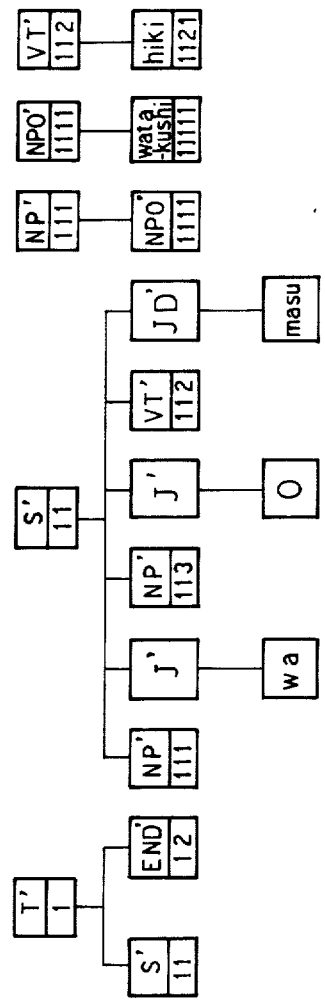

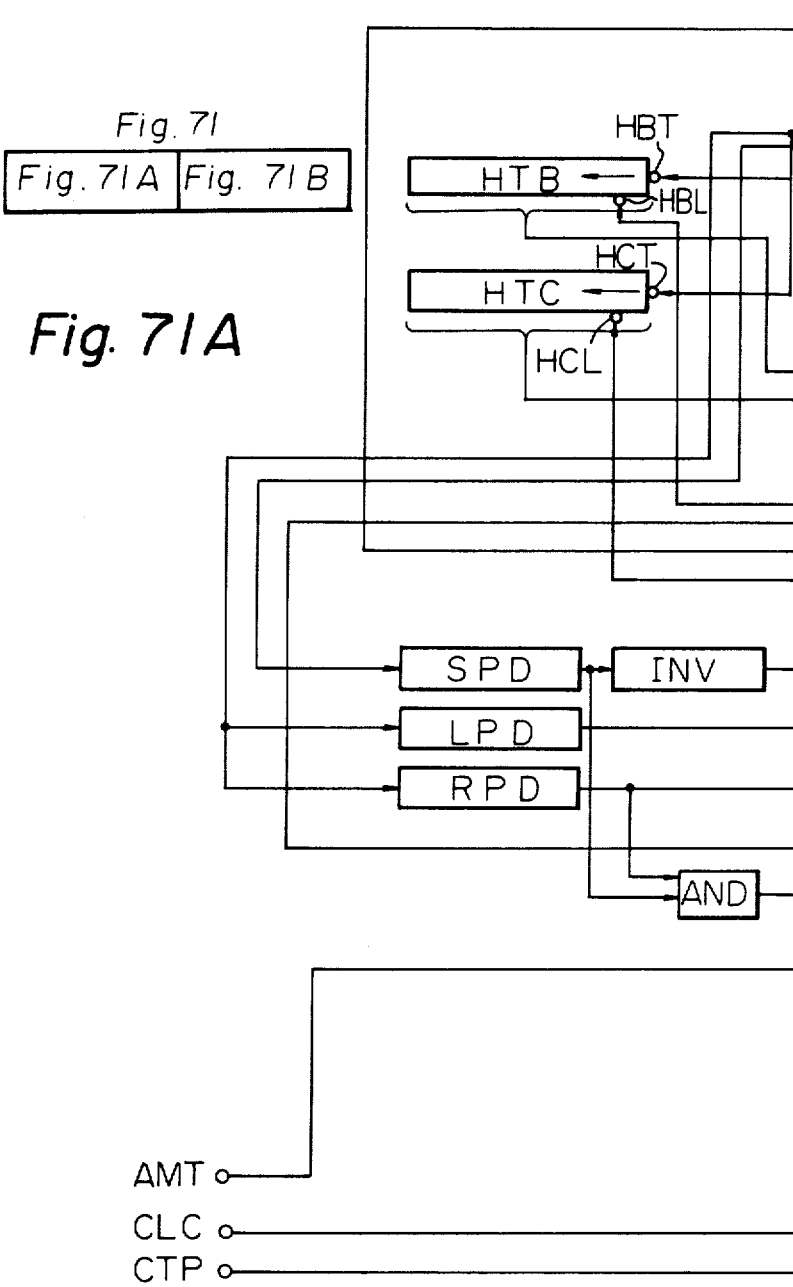

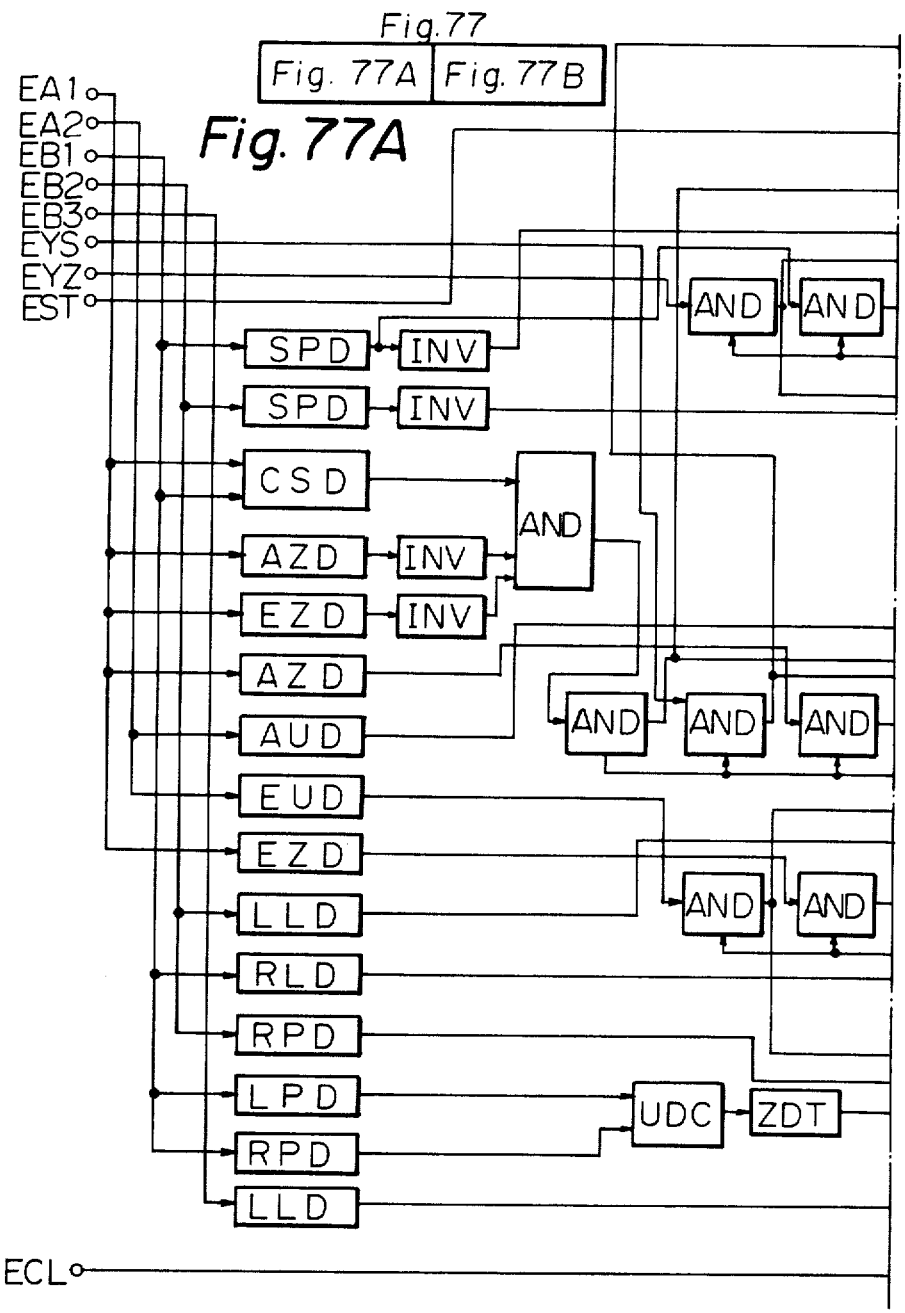

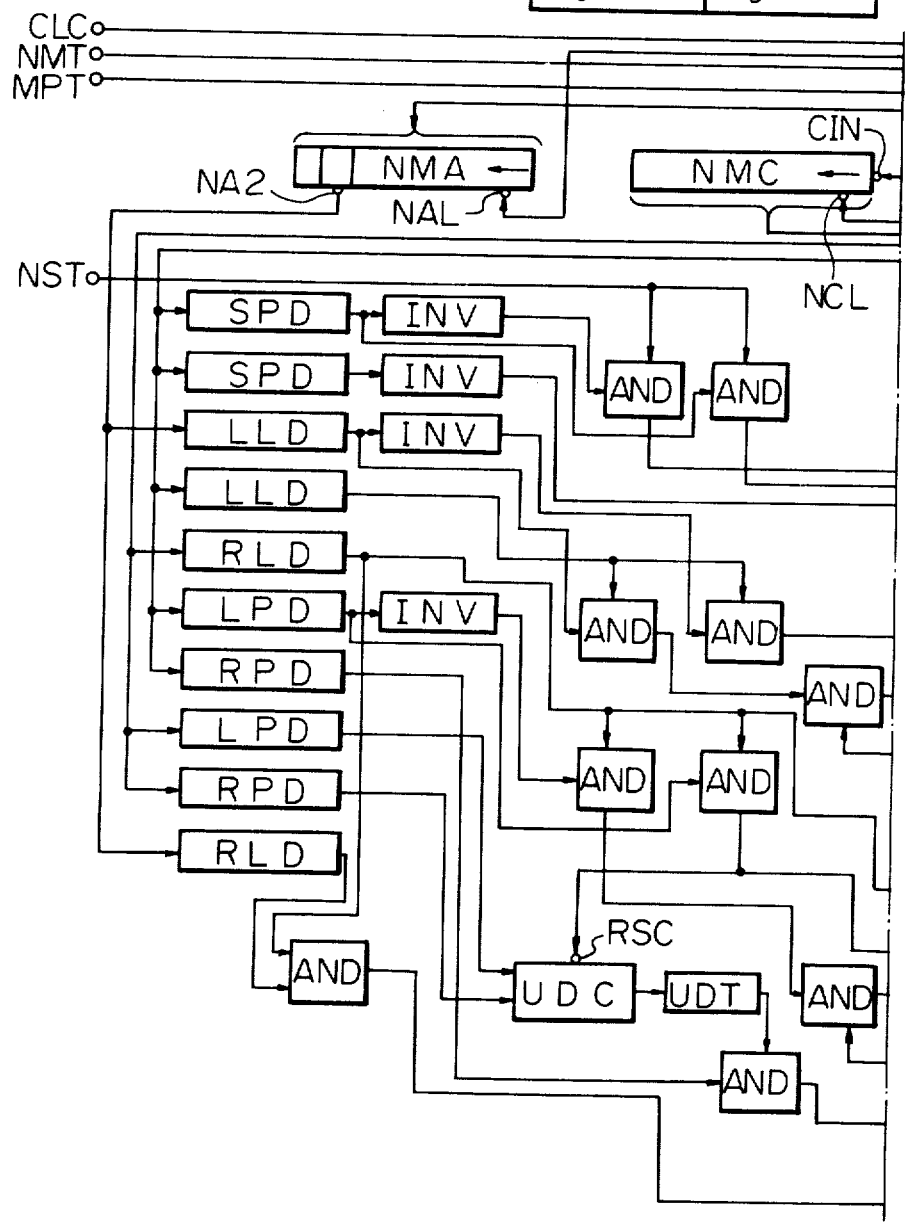

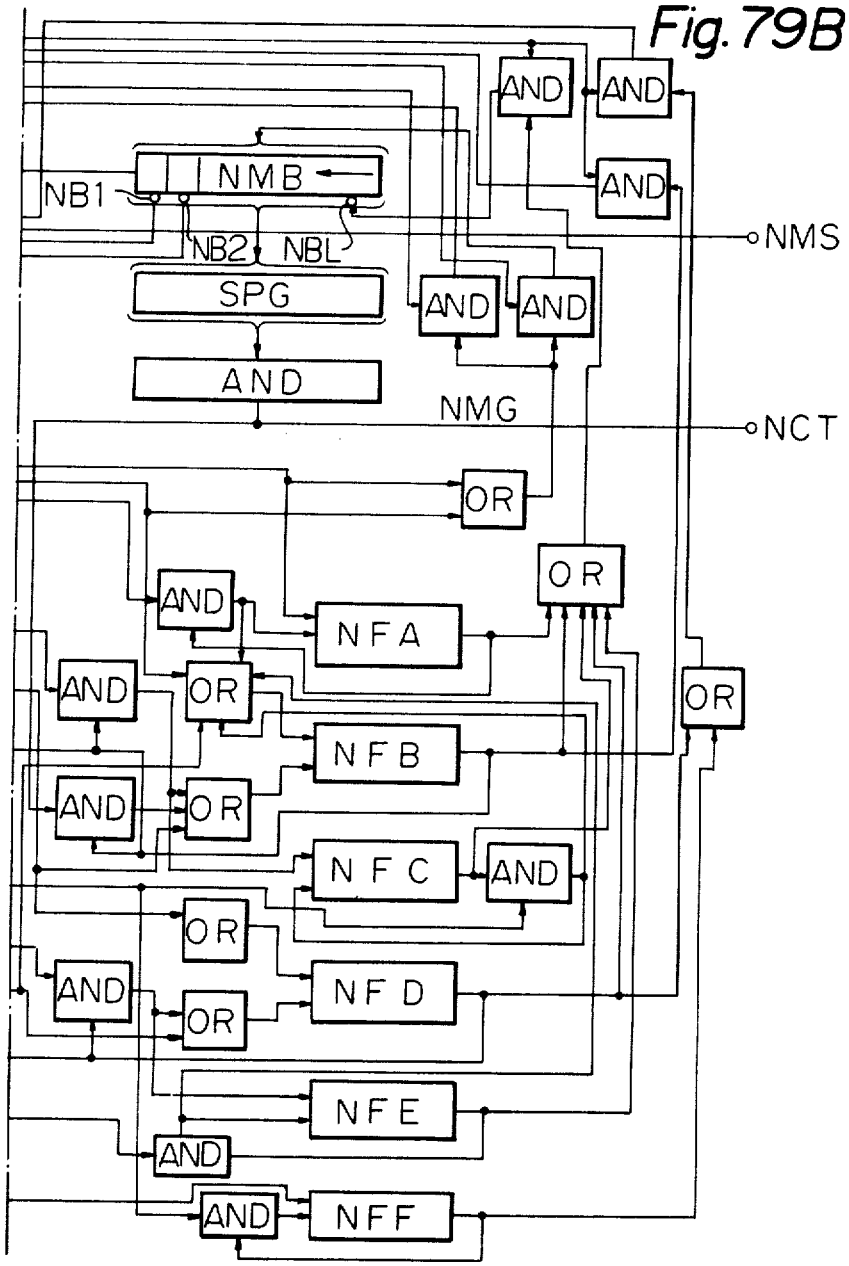

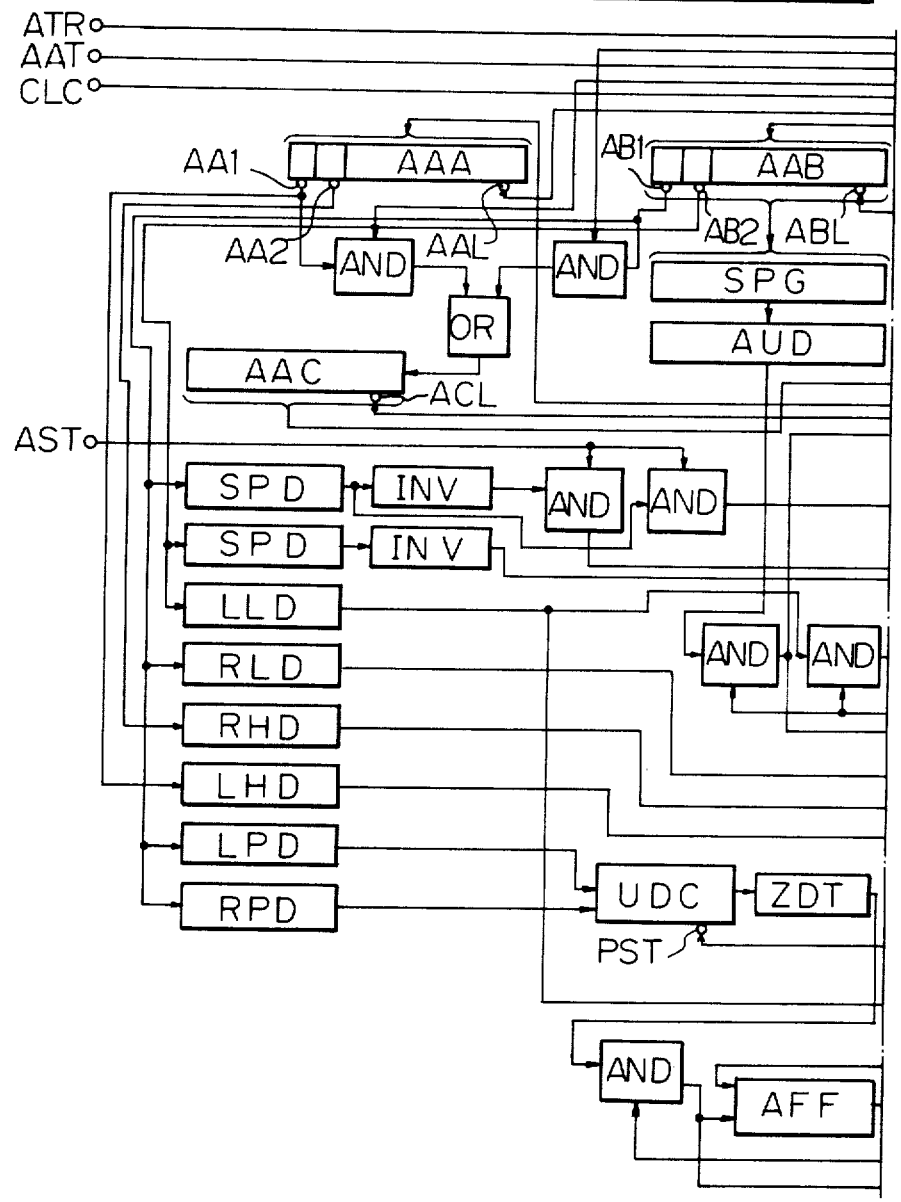

| Fig. 83A | Fig. 83B |

TREE TRANSFORMATION SYSTEM IN MACHINE TRANSLATION SYSTEM

BACKGROUND OF THE INVENTION

As for machine translation system, many systems have been proposed so far. The most popular ones have a feature that they generate target language or language to be translated into, after introducing sentence in source language or language to be translated from, and applying the process consisting of extracting the meaning of the introduced sentence in source language, which process should be called processing into deep structure. Though these types of methods conform with theories in linguistics, they are not well suited to accept special expressions a little out of general rules of language in spite of the fact that these expressions inevitably occur in natural language such as Japanese, and to reflect these expressions to translation.

SUMMARY OF THE INVENTION

It is an object, therefore, of the present invention to overcome the disadvantages of a prior art by providing a new and improved machine translation system.

It is also an object of the present invention to provide a machine translation system which can translate sophisticated language like Japanese.

This invention treats language as a set of specific patterns and conducts translation by alloting corresponding patterns in target language for each pattern in source language, and as a result, can conduct sophisticated translation by including patterns corresponding to these specific expressions. Following is the detailed explanation of the invention.

BRIEF DESCRIPTION OF THE DRAWING

The foregoing and other objects, features, and attendant advantages of the present invention will be appreciated as the same become better understood by means of the following description and accompanying drawings wherein;

FIG. 6 consists of figures for transformation patterns among among which FIG. 6(a) shows transformation pattern P-1, FIG. 6(b) shows transformation pattern P-2, FIG. 6(c) shows transformation pattern P-3, FIG. 6(d) shows transformation pattern P-4, FIG. 6(e) is for transformation pattern P-I, FIG. 6(f) is for transformation pattern P-play, FIG. 6(g) is for transformation pattern P-the, FIG. 6(h) is for transformation pattern P-piano and FIG. 6(i) is for transformation pattern P-period.

FIGS. 7, 7(a), 7(b) and 7(c) are figures of composition of machine translation system of this invention.

FIG. 8 is figures concerning target language pattern for the transformation pattern P-1. FIG. 8(a) is the figure for body of target language pattern and FIG. 8(b) is the figure for structure order correspondence table.

FIG. 15 shows rest tree structure after the elimination of trees concerning partial pattern P-1.

FIG. 16 is the figure of handled tree structure at the beginning of second round of operation.

FIG. 17 is the figure of not handled tree structure at the beginning of second round of operation.

FIG. 18 shows the figure of handled tree structure affected by separation of instruction.

FIGS. 19(a), 19(b), 19(c) and 19(d) show the extraction indication for partial pattern P-2. It consists of four kinds of extraction indications.

FIG. 20 is the figures for target language pattern P'-2-1. FIG. 20(a) is the figure for body of target language pattern and FIG. 20(b) is the figure for structure order correspondence table.

FIG. 21 is the figures for target language pattern P'-2-2. FIG. 21(a) is the figure for body of target language pattern and FIG. 21(b) is the figure for structure order correspondence table.

FIG. 22 shows a utilization method of "A".

FIG. 23 is the figure of tree structure with node number attached for the partial pattern P-2.

FIG. 24 is structure for pattern P-2 where node number of source language is arranged according to the structure order in source language pattern.

FIG. 25 is structure for the pattern P-2 where node number is arranged in the structure order of target language structure.

FIG. 26 is the figure of target language tree structure for partial pattern P-2.

FIG. 27 shows the instruction to lower layer concerning partial pattern P-2.

FIG. 39 shows memory contents of output tree structure memorizing part SPM after the third round of operation.

FIG. 40 is the figure of handled tree structure for third round of operation with attached instruction for partial pattern P-4.

FIG. 41 is the figure of handled tree structure at the fourth round of operation.

FIG. 42 is the figure of handled tree structure at the fourth round of operation after the separation of instruction.

FIG. 43 is the figure of target language pattern P'-1-1.

FIG. 44 is the figure of instruction to lower layer concerning partial pattern P-I.

FIG. 45 is tree structure with attachment of node number concerning partial pattern P-I.

FIG. 46 is arrangement, concerning partial pattern P-I, of node numbers in accordance with structure order in source language pattern.

FIG. 47 is arrangement, concerning partial pattern P-I of node numbers in accordance with structure order in target language structure.

FIG. 48 is the figure of target language tree structure for partial pattern P-I.

FIG. 49 is the figure for partial pattern P-I as handled tree structure with attachment of instruction at the fourth round of operation.

FIG. 50 is the figure of handled tree structure at the fifth round of operation.

FIG. 51 is the figure of not handled tree structure at the fifth round of operation.

FIG. 52 is the figure of handled tree structure after the separation of instruction.

FIG. 53(a) shows that of P'-play-1, FIG. 53(b) shows that of P'-play-2 and FIG. 53(c) shows that of P'-play-3.

FIG. 54 is figures concerning the pattern P-kiss.

FIG. 57 shows the memory content of output tree structure memorizing part SPM at the end of fifth round of operation.

FIG. 58 shows instruction to lower layer concerning partial pattern P-play.

FIG. 59 is the figure of handled tree structure for partial pattern P-play with attachment of instruction.

FIG. 60 is the figure of handled tree structure at the sixth round of operation.

FIG. 61 is the figure of not handled tree at the sixth round of operation.

FIGs. 71, 71(a) and 71(b) are the figures of tree structure deciding part HTD realized by electronic circuit.

FIGS. 73, 73(a) and 73(b) are the figures of partial pattern finding part PPD realized by electronic circuit.

FIGS. 77, 77(a) and 77(b) are figures of another portion of extraction generating part EXG realized by electronic circuit.

FIGS. 79, 79(a) and 79(b) are figures of node number dealing part NMH realized by electronic circuit.

FIGS. 81, 81(a) and 81(b) are the figures of instruction dealing part INH realized by electronic circuit.

FIGS. 85, 85(a) and 85(b) are the figures of second node number arranging part NNA2 realized by electronic circuit.

FIGS. 87, 87(a) and 87(b) are the figures of output tree structure generating part SPG realized by electronic circuit.

FIGS. 89, 89(a) and 89(b) are the figure of output tree structure connecting part SPC realized by electronic circuit.

FIGS. 92, 92(a) and 92(b) are the figures of target language pattern linearizing part SPL realized by electronic circuit.

DESCRIPTION OF THE PREFERRED EMBODIMENTS

Figure 1:
FIG. 1 shows application result of pre-processing (ii) to the input sentence.

The processing concerning the invention can be divided into two phases, one of which is pre-processing needed to extract information to be introduced to the system of this invention, from sentence in source language, another of which is proper processing of this invention. The pre-processing is explained first. The pre-processing consists of the following steps.

(i) Putting in a sentence in source language which must be translated.

(ii) Introducing nodes which have names of respective word names contained in aforementioned sentence and composing a set of nodes by arranging them in a row at the order of the position in the sentence. These nodes will constitute nodes of lowest layer in tree structure and called terminal nodes.

(iii) Deciding category names of whole words in the sentence by the use of a dictionary. Putting, after above processing, a node of category name on each corresponding node of word name and connecting each pair of nodes by a line. Lines connecting nodes are called arcs. The processing here is called "non terminalization", as the processing is constituted of putting non terminal nodes on the terminal nodes corresponding to word names. The category classification here is much detailed one compared with usual "part of speech" classification.

Following is the processing proper to this invention.

(iv) Composing a non separate tree structure by using a set of rules called parsing grammer the composing element of which unites several nodes adjoined to each other into one node higher by one layer, and by connecting by arcs between the higher node and every united node in lower layer and by repeating above processing. The tree structure is called tree structure of input sentence. A tree is a configuration which has no path obtained by tracing different arcs and nodes alternatively and returning to the starting node.

(v) Affixing a number to every node in tree structure. The way of numbering can be arbitrary, nevertheless the numbering method in which the highest node is affixed by 1 and a node other than the highest node is affixed by number of the node higher by one layer and directly connected to the former one, but supplemented by the number corresponding to the number of the order of the former node counted from the left, at the lowest place, is used here.

Above is the explanation of processing including pre-processing and proper processing. Though the "non terminalization" grammar shown in (iii) is a kind of parsing grammar, it is treated as different from parsing grammar because it has peculiar character in that it is applied prior to parsing grammar and it depends on word names. Many kinds of elements in parsing grammar are used in the processing concerning the invention. Hereafter an element of parsing grammar is also called parsing grammar where confusion is not expected.

Now pre-processing and processing proper to this invention are explained successively using an example. A block diagram is used at the explanation of the treatment on the example. The English sentence used in the example is:

$$\text{I play the piano.} \tag{1}$$

Figure 2:
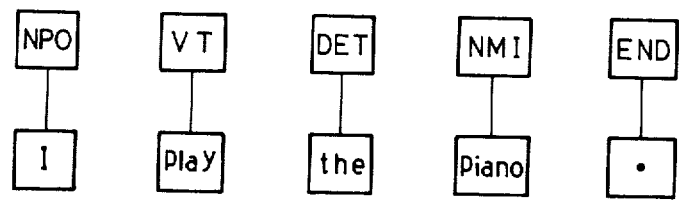
FIG. 2 shows application result of pre-processing (iii).
Figure 3:
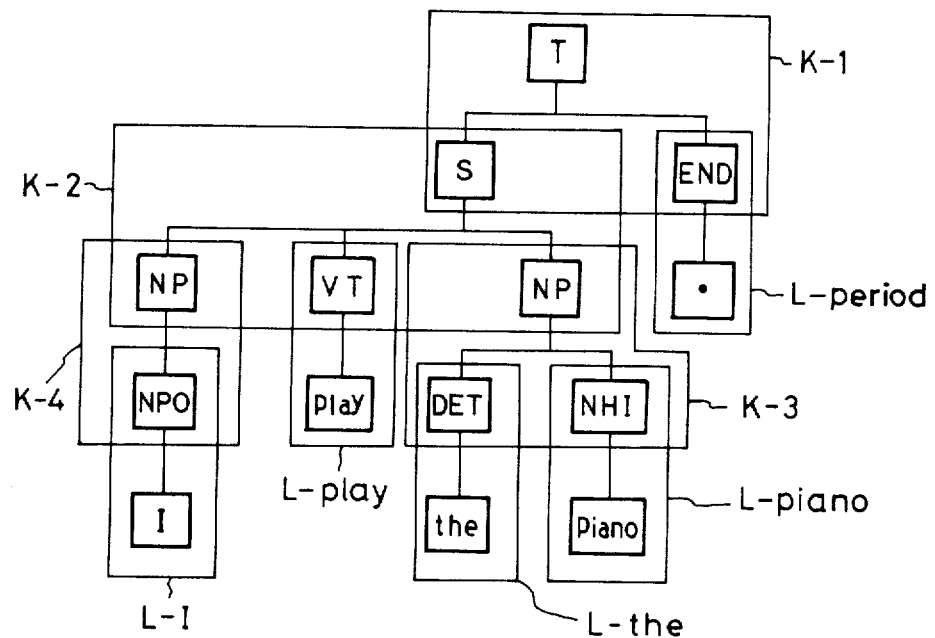
FIG. 3 shows application result of pre-processing (iv).

As a result of pre-processing (iii) the configuration in FIG. 1 is obtained. Every square represents a node which has name written in it. After the pre-processing (iii), the configuration in FIG. 2 is obtained. N which is not expressed in the figure represents noun in general. VT, DET, and END represent transitive verb, determinative and end mark respectively. As for noun N, more detailed category classification in which NPO and NMI correspond pronoun and musical instrument respectively, is adopted. End mark denoted by END includes .(period), ?(question mark) and !(exclamation mark). After the processing of (iv), tree structure of input sentence shown in FIG. 3 is obtained. S, T and NP which are newly introduced, denote sentence, text and noun phrase respectively. Region of L-I, L-play, L-the, L-piano and L-period in the FIG. 3 denote application region for non terminalization grammars of I, play, the, piano and period respectively and K-1, K-2, K-3 and K-4 denote application region of four kinds of parsing grammars. These grammars expressed in the shape of equation for representation of parsing grammar are shown below. As for non terminalization grammar, L-I is expressed as:

$$\text{NPO} \leftarrow \text{I} \tag{2}$$

L-play is expressed as:

$$\text{VT} \leftarrow \text{play} \tag{3}$$

L-the is expressed as:

$$\text{DET} \leftarrow \text{the} \tag{4}$$

L-piano is expressed as:

$$\text{NMI} \leftarrow \text{piano} \tag{5}$$

and finally L-period is expressed as:

$$\text{END} \leftarrow \tag{6}$$

Concerning parsing grammar, K-1 is expressed as:

$$\text{T} \leftarrow \text{S END} \tag{7}$$

K-2 is expressed as:

$$\text{S} \leftarrow \text{NP VT NP} \tag{8}$$

K-3 is expressed as:

$$\text{NP} \leftarrow \text{DET NMI} \tag{9}$$

and finally K-4 is expressed as:

$$\text{NP} \leftarrow \text{NPO} \tag{10}$$

Figure 4:
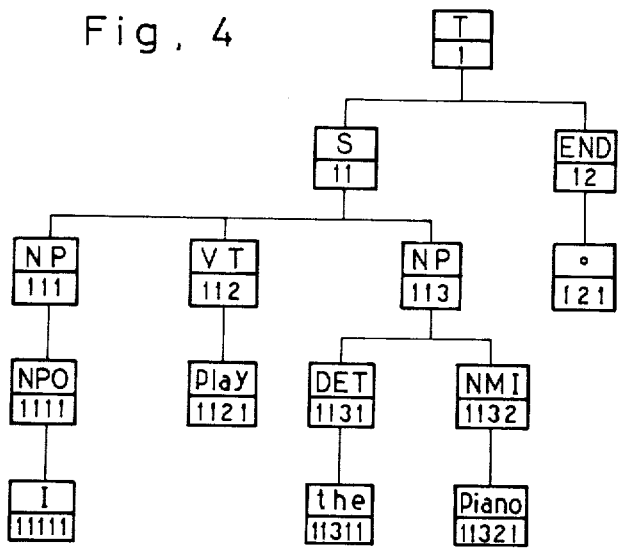
FIG. 4 shows the figure of input tree structure.

Non terminalization grammars among these grammars are used to express catagory names of words and parsing grammars, which are deduced from theories of natural language paying attention to the convenience in translation are used to unite more than one node into upper concept. These amount to several hundred in usual translation systems. In the equations as shown in FIGS. (2)–(10), one or more nodes which must be united and which are situated in lower layer are written in right hand and one node obtained by the unification is written in left hand. Among parsing grammars, K-1 denoted in Eq. (7) shows that text is composed of sentence and end mark. K-2 expressed in Eq. (8) corresponds to sentence pattern of transitive verb with one object. K-3 expresses that determinative and musical instrument name makes noun phrase and K-4 shows that pronoun alone will make noun phrase. After the processing of (iv), configuration in FIG. 4 is obtained. Number for each node is shown in the lower part of each node. Numbers are used to construct sentence tree structure of target language after the time when the input sentence tree structure have been split into several patterns and each so generated pattern is transformed into tree structure of target language. Configuration shown in FIG. 4 is input information for machine translation system of this invention. This is the tree structure of source language which is English. The explanation for the invention is done using this example and following the method of this invention until the generation of Japanese sentence.

Figure 5:
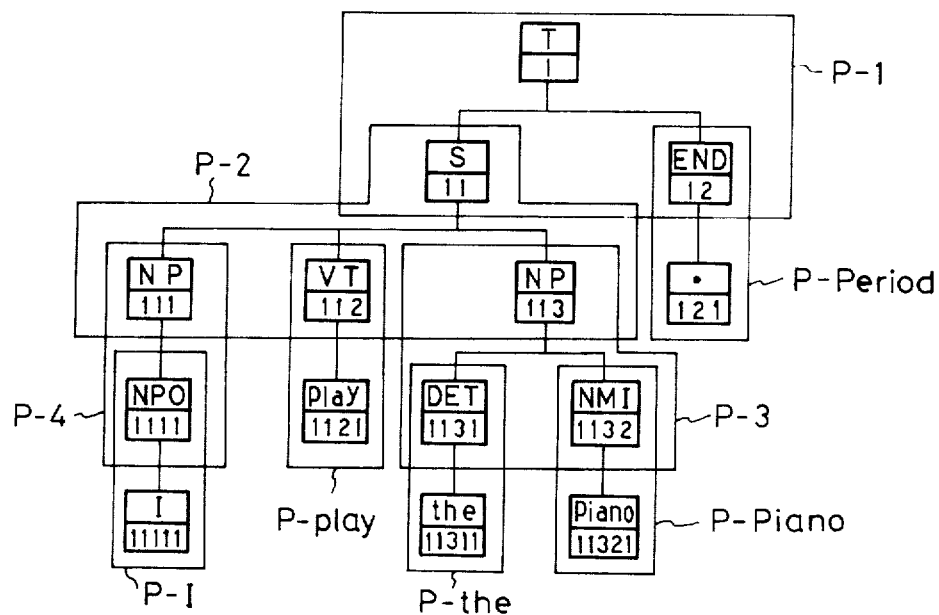
FIG. 5 shows the tree structure of FIG. 4 totally covered with transformation patterns.

For convenience of explanation, the situation where tree structure of input sentence which is shown in FIG. 4 is totally covered by transformation patterns is shown in FIG. 5. Though the patterns are obtained by the from top to bottom order successively, whole patterns are shown for the sake of explanation. These transformation patterns respectively correspond to minimum meaning units for translation. As easily understood by comparison of FIG. 5 and FIG. 3, transformation patterns and parsing grammars are all the same, but generally speaking transformation patterns and parsing grammars are chosen from a different standard and are apt to be different. A transformation pattern connecting a terminal node and a non-terminal node directly on the terminal node, and, as a result, having strong relation with word constituting specific terminal node, is given a name, such as P-I or P-play, which name is composed by connecting the name of the terminal node after the letter P which means transformation pattern. For the other types of transformation patterns, the names, such as P-1 or P-2, composed by connecting numbers after P is given. Transformation patterns are chosen following the standards that they, as a whole, can cover tree structure of input sentence totally, and that they each have unique highest nodes and the nodes common to the node contained in patterns of higher layer. The transformation patterns P-1, P-2, P-3, P-4, P-I, P-play, P-the, P-piano and P-period are again shown in FIG. 6(a) through FIG. 6(h).

Figure 7A:
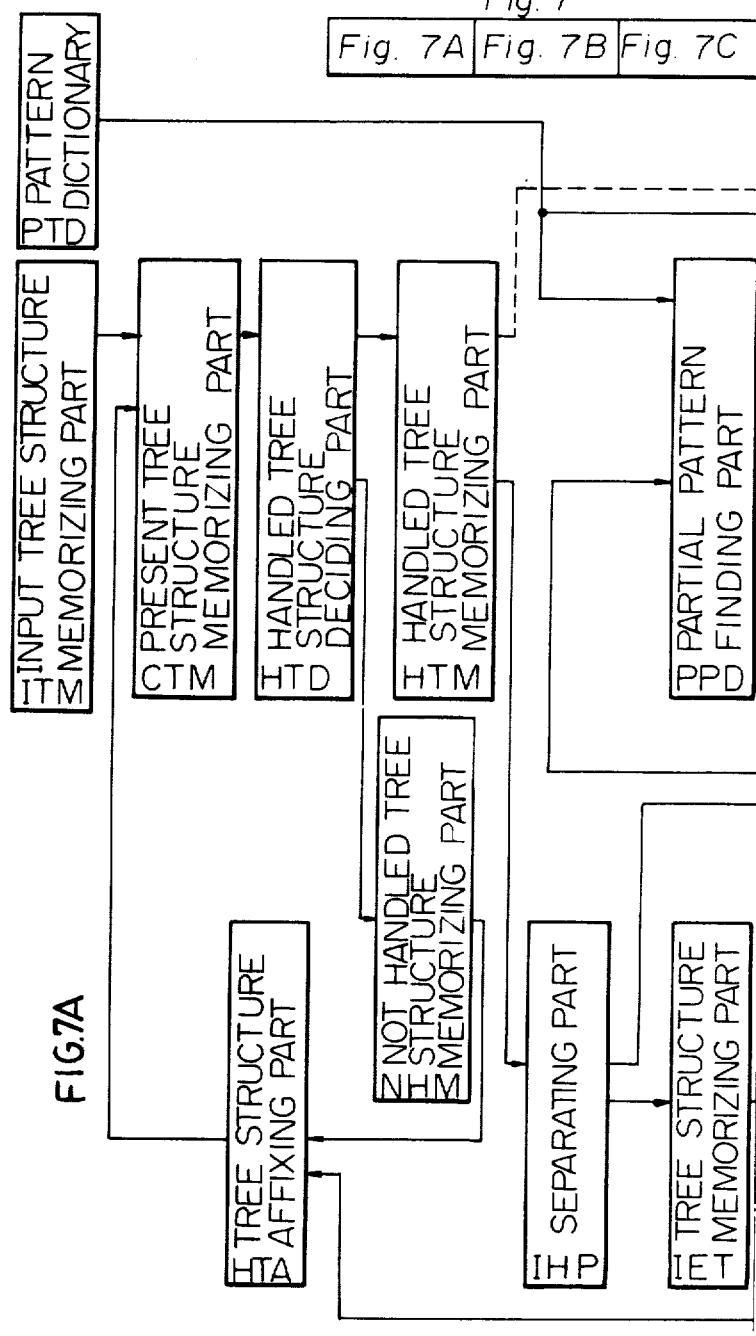
Figure 7B:
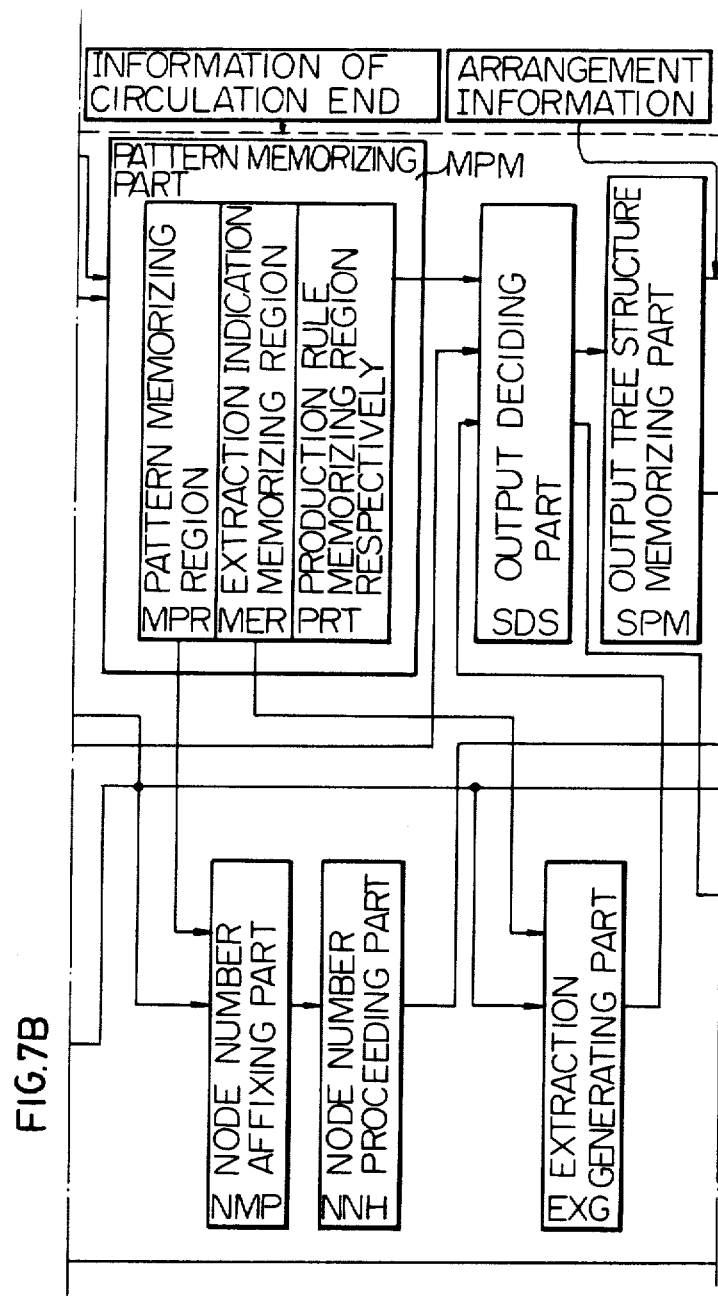
Figure 7C:
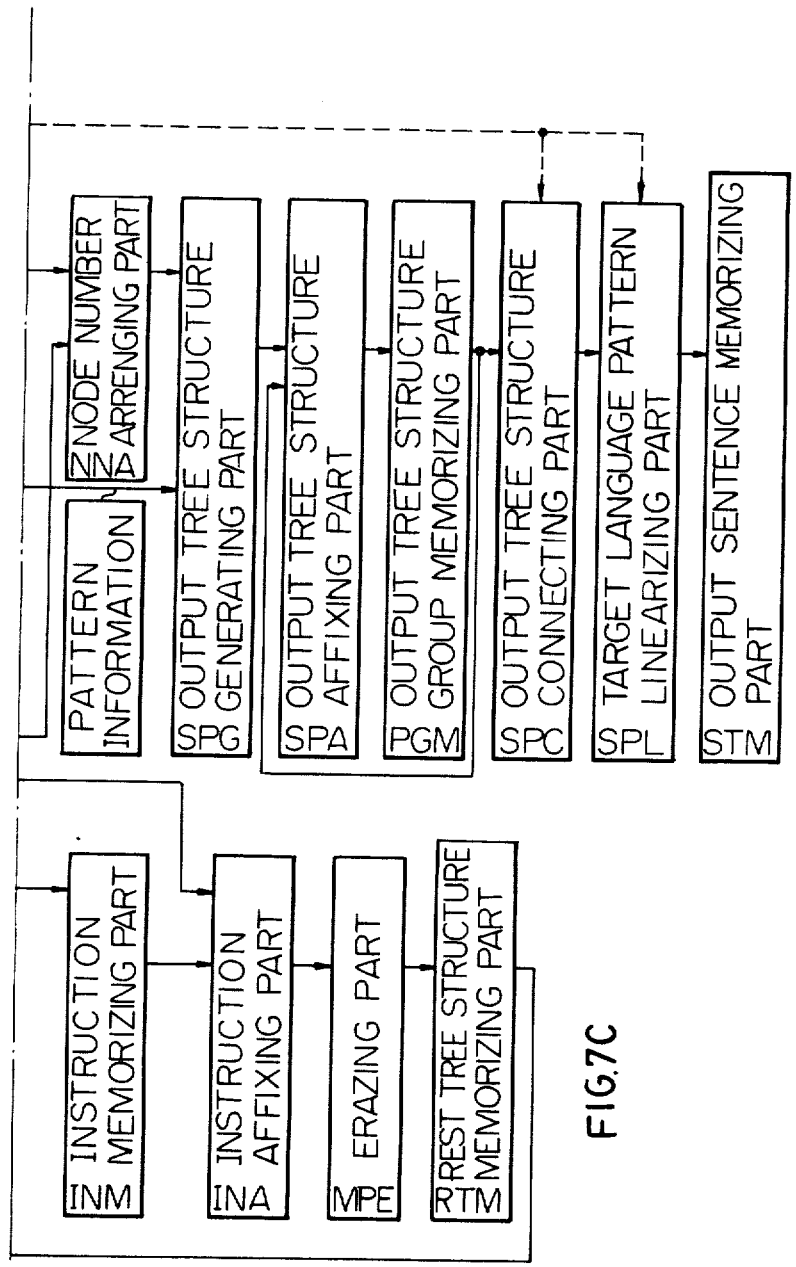

Following is the description of machine translation of the type of the invention accommodating tree structure of the input sentence shown in FIG. 4. The composition is shown in FIG. 7. First the names of composing parts are given. PTD, ITM, CTM, HTD, HTM, NHM, HTA, PPD and MPM are pattern dictionary, input tree structure memorizing part, present tree structure memorizing part, handled tree structure deciding part, handled tree structure memorizing part, not handled tree structure memorizing part, tree structure affixing part, partial pattern finding part and pattern memorizing part respectively. MPR, MER and PRT are pattern memorizing region, extraction indication memorizing region and production rule memorizing region respectively and these three as a whole constitute memorizing region of MPM, the pattern memorizing part. SDS, IHP, IET, NMP, NNH, EXG, INM, INA, MPE, RTM, SPM, NNA, SPG, SPA, PGM, SPC, SPL and STM are output deciding part, separating part, tree structure memorizing part, node number affixing part, node number processing part, extraction generating part, instruction memorizing part, instruction affixing part, erasing part, rest tree structure memorizing part, output tree structure memorizing part, node number arranging part, output tree structure generating part, output tree structure affixing part, output tree structure group memorizing part, output tree structure connecting part, target language pattern linearizing part and output sentence memorizing part respectively.

Following is the operation of the configuration of FIG. 7 for the input shown in FIG. 4. The input shown in FIG. 4 is first memorized in input tree structure memorizing part ITM and, because no output from tree structure affixing part HTA is present through the fact that operation is at an early stage, output from ITM is sent to present tree structure memorizing part CTM unaltered. This output is sent to handled tree structure deciding part HTD and then immediately sent to handled tree structure memorizing part HTM as there is only one tree structure. Nothing is sent to not handled tree structure memorizing part NHM. Output of the HTM is sent to separating part IHP. IHP is the part where the separation of instruction and body of the tree structure is done. The system is at most early phase of operation and there is no instruction, consequently the output to the output deciding part is information of no instruction. Ultimately the input tree structure shown in FIG. 4 is introduced to tree structure memorizing part IET unaltered. The output which is tree structure deprived of instruction, is introduced into partial pattern finding part PPD.

The examination of coincidence by piling up the tree structure of the type of FIG. 4 and many tree structure terms in pattern dictionary PTD is conducted and, as a result, the tree structure which is the partial tree structure of the input tree structure and has the same highest node as the one in the tree structure of FIG. 4 is found. In the pattern dictionary, many tree structure patterns are registered in the shape shown in FIG. 6. The present output of the partial pattern finding part PPD is the pattern P-1 shown in FIG. 6(a) and the information telling the pattern is selected, which is brought to pattern memorizing part MPM. The part among the parentheses will be explained later. MPM obtains the information concerning P-1 through the information and pattern dictionary PTD. These consist of, structure of the pattern itself, namely the information shown in FIG. 6(a), extraction indicating information, namely the extraction indicating information concerning the part outside of present pattern in the tree structure, memorized in the tree structure memorizing part IET and also production rule information, namely indication of operation after the extraction indication is obtained, and are memorized in pattern memorizing region MPR, extraction indication memorizing region MER and production rule memorizing region PRT respectively. Concretely speaking, the contents of the MPR is the structure in FIG. 6(a) and contents of MER is the information of no instruction and contents of PRT is a table shown in Table 1.

TABLE 1

| input | | output | |
|---|---|---|---|
| Instruction from upper layer | Extraction information | Target language pattern | Instruction to lower layer |
| — | — | P'-1-1 | |

The table indicates the treatment of the pattern P-1 and shows that the treatment is done irrespective of the instruction from upper layer and that the extraction operation which is extraction of structure outside and lower than the pattern, is not done and, as a consequence, treatment is done without using information concerning extraction operation and that the target language pattern of P'-1-1 is used and that no instruction is sent to lower layer. The detailed operation according to the table is explained later. Structure extraction indicating information from extraction indication memorizing region MER and information concerning handled tree are sent to extraction generating part EXG, nevertheless, the output of EXG which is extraction information is the information of no instruction and introduced to the output deciding part SDS. Further instruction from upper layer comes from separating part IHP to SDS but this is also information of no information. To SDS comes also a rule called production rule shown in Table 1 and depicting the method for processing the pattern P-1. Here it shows that there is only one candidate for output which tells that target language pattern P'-1-1 should be sent to output tree structure memorizing part SPM and that instruction information of no information should be sent to instruction memorizing part INM. Target language pattern consists of target language pattern itself shown in FIG. 8(a) and FIG. 8(b) which is structure order correspondence table showing the correspondence of specific node in source language pattern and specific node in target language pattern. The nodes in target language pattern itself have an empty column in which the node number is accommodated at a later stage. Presently, for the sake of explanation, there are numbers in parentheses which have no relation with the operation of the system of this invention. The symbol with prime shows that the symbol is in the target language tree structure. T', S', and END' denote text in target language, sentence in target language and end mark in target language.

Following is the explanation for structure order correspondence table as is shown in FIG. 8(b). The structure in FIG. 6(a) is source language pattern and the structure in FIG. 8(a) is target language pattern. When numbering method used in FIG. 4 is applied to the three nodes in FIG. 6(a), the numbers in the parentheses in FIG. 6(a) are obtained. Here the dictionary order where a number is thought to be a word and the word with less number at the same position from the left has the priority at the dictionary. When nodes in source language pattern which is FIG. 6(a) are arranged according to above-mentioned dictionary order, the row is obtained to be T(1), S(11), END(12). This type of arrangement of node is said to be arrangement of node in structure order. Similarly this kind of operation can be done for target language pattern shown in FIG. 8(a) and the result, when numbering in the parentheses in the figure is done and the node is arranged at the above-mentioned dictionary order or structure order, is obtained to be, T'(1), S'(11) and END'(12). As the designation is done in which the correspondence of T-T', S-S', END-END' is established between nodes of source language and these of target language, the node of the order number 1 in target language tree structure correspond also to the node of the order number 1 at the target language tree structure. As this situation is true also for the nodes of the order 2 and 3, the structure order correspondence table in FIG. 8(b) which contains the order of 1, 2, 3 is obtained. The structure order correspondence table will contain the order of 2, 3, 1, where the structure order of the node in the target language tree structure, which corresponds to the node of structure order number 1 in source language, is 2 and where second ordered node correponds to the third ordered one and also third ordered one corresponds to first ordered one. It must be noted that numbers in parentheses affixed in nodes in FIG. 6(a) and FIG. 8(a) are, as explained partially earlier, only for explanation of structure order and have nothing to do with the operation concerning this invention. The node number affixing part NMP receives tree structure shown in FIG. 4 from tree structure memorizing part IET and tree structure input shown in FIG. 6(a) from pattern memorizing region MPR and generates partial pattern with node number shown in FIG. 9.

Figure 9:
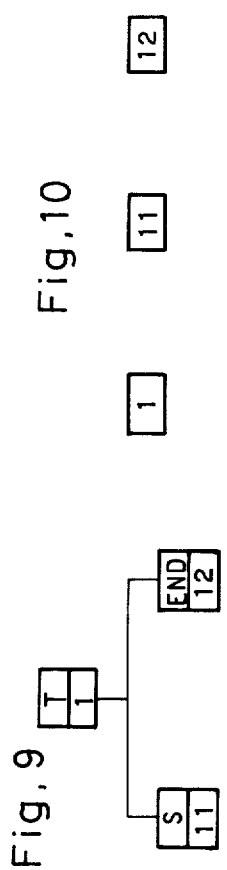
FIG. 9 is figure for partial pattern P-1 with attachment of node number.
Figure 10:
FIG. 10 is arrangement, concerning partial pattern P-1, of node numbers in source language in accordance with structure order in source language pattern.
Figure 11:
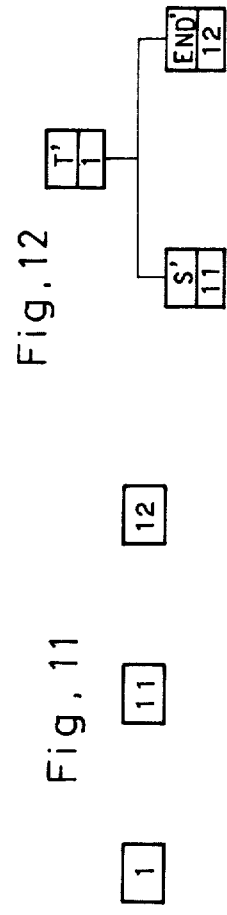
FIG. 11 is arrangement, concerning partial pattern P-1, of node numbers in accordance with structure order in target language.

Node number processing part NNH produces the structure in FIG. 10 using the structure of FIG. 9. This is arrangement of node number of source language in present pattern, according to the structure order. Node number arranging part NNA arranges node number according to the structure order in target language structure shown in FIG. 11 using the output of output tree structure memorizing part SPM shown in FIG. 8(b). In this case the order in FIG. 10 appears in FIG. 11 unaltered according to the structure order correspondence table. On the basis of output of NNA shown in FIG. 11 and the output of output tree structure memorizing part SPM which is structure order correspondence table shown in FIG. 8(b), the processing in which empty columns in every node number shown in FIG. 8(b) filled presently with numbers in parentheses is filled up according to structure order, is conducted at the output tree structure generating part SPG, producing tree structure of target language. This signal is introduced to output tree structure memorizing part SPA and memorized at output tree structure group memorizing part PGM coexisting with former memory contents of the part. Nevertheless memory contents of PGM become tree structure of FIG. 12, because there are no other tree structures in PGM except above tree structure, as the system is on early stage of operation.

Figure 12:
FIG. 12 is figure of target language tree structure for the partial pattern P-1.
Figure 13:
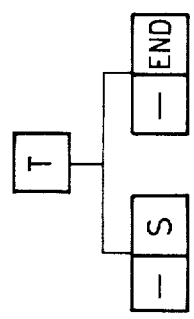
FIG. 13 shows the instruction to lower layer concerning partial pattern P-1.
Figure 14:
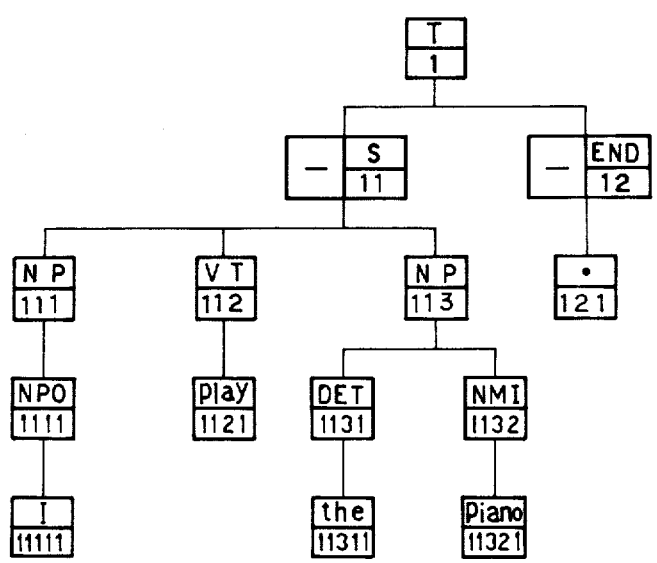
FIG. 14 is the figure of input tree structure with instruction for partial pattern P-1.

Output deciding part SDS sends target language patterns shown in FIGS. 8(a), (b) and sends, as the other output, instruction to lower layer shown in Table 1 as the other output. It is composed of instruction to nodes on the border to the lower pattern and expressed as pair of node name and instruction. Present case is of no instruction as shown in Table 1. Instruction to lower layer in Table 1 is actually written as shown in FIG. 13. Namely, no instruction which means there is no instruction to the node is written in the instruction columns attached at the left of border nodes S and END. SDS output shown in FIG. 13, via instruction memorizing part INM, arrives at the input of instruction affixing part INA together with tree structure shown in FIG. 4 which is output of tree structure memorizing part IET, producing tree structure shown in FIG. 14. The output is introduced to erasing part MPE, where present pattern of FIG. 6(a) is erased excluding border nodes. The standard of processing here is that node higher than ones having instruction including no instruction information should be eliminated. As a result of the operation, rest tree structure information shown in FIG. 15 is introduced to rest tree structure memorizing part RTM. The present contents consist of 2 tree structures arranged in the order shown in FIG. 15. This makes the input to tree structure affixing part HTA. As the system is at early stage of operation, there is no information from not handled tree finding part NHM and consequently tree structure of FIG. 15 is memorized at present tree structure memorizing part CTM. This makes the end of processing for pattern P-1 shown in the FIG. 6(a) resulting in the situation where tree structure shown in FIG. 12 is memorized in output tree structure group memorizing part PGM and 2 tree structures shown in FIG. 15 are memorized in present tree structure memorized part CTM at the order of the figure.

Following is the operation of the system at the second round. At the beginning of the first round, the tree structure in FIG. 4 was memorized at the present tree structure memorizing part CTM whereas now, at the beginning of second round, group of 2 trees shown in FIG. 15 is memorized. This is introduced to the handled tree structure deciding part HTD where one of the trees at the present tree structure memorizing part CTM is decided to be handled tree structure and is sent to handled tree structure memorizing part HTM whereas the other part is sent to not handled tree structure memorizing part NHM as tree not to be handled at present. As the choice of tree structure does not affect the operation, as a whole, the leftest tree structure is always chosen to be handled. Consequently handled tree structure deciding part HTD sends tree structure of FIG. 16 to handled tree structure memorizing part HTM and also sends tree structure shown in FIG. 17 to not handled tree structure memorizing part NHM. The tree structure in FIG. 16 is sent to separating part IHP where instruction and body of tree structure are separated. As there is also no instruction, instruction information to output deciding part SDS is information of no information. The tree structure of FIG. 18 which is made from tree structure of FIG. 16 through elimination of instruction information is sent to tree structure memorizing part IET and memorized there. Tree structure in FIG. 18 is sent to various parts but at first it is introduced to partial pattern finding part PPD, where the test for coincidence of tree structure in FIG. 18 and various tree structures in pattern dictionary PTD is done selecting a tree which is partial tree of tree structure in FIG. 18 and has the same highest node. The output of partial pattern finding part PPD is the partern P-2 which is shown in FIG. 6(a) and the information that this pattern was selected comes to pattern memorizing part MPM. MPM obtains information concerning pattern P-2 from the information and pattern dictionary PTD and memorizes three kinds of information thus obtained in three memorizing regions in the MPM. Tree structure of FIG. 6(b) is memorized at pattern memorizing part MPR in unaltered shape and extraction indication shown in FIGS. 19(a), (b), (c) and (d) respectively is memorized in extraction indication memorizing region MER and table of production rule shown in Table 2 is memorized at production rule memorizing region PRT.

Tree structure shown in FIGS. 19(a), (b), (c) and (d) comes to extraction generating part EXG as extraction information. The node name ADJ newly introduced in FIG. 19 corresponds to adjective. On the other hand, the output of tree structure memorizing part IET shown in FIG. 18 comes in to the part. Extraction indication information indicates that information concerning lower layer downward of pattern P-2 shown in FIG. 6(b) must be obtained from tree structure in FIG. 18. Extraction indication, as a consequence, has the shape of pattern P-2 attached with affixed part for acquisition of information from lower layer. Acquisition of instruction information is conducted by piling up each figure in FIG. 19 with FIG. 18. At the piling up various arbitrarization measures and inspection measures are taken. The mark for these measures are $A_o$, $A^o$, $E_o$ and $E^o$ in the FIG. 19. $A_o$ denotes that the part corresponding to $A_o$ is arbitrary including structure of tree structure with node contained in the tree, at the decision of success or fail in piling up. $A^o$ denotes, together with the measures shown above, the part corresponding to $A^o$ must be obtained. $E_o$ denotes that one node at the part is arbitrary at the piling up. $E^o$ denotes that, together with the measures taken for $E_o$, the name of the node must be obtained as extraction information. Extraction indication information and extraction information are named by number for each tree structure at piling up. For example FIG. 19(a) is first extraction indication information and thus obtained extraction information is called first extraction information and so on. Where piling up is not established including arbitrarization, the no piling up information is sent and when piling up is established, the output requested by $A^o$ and $E^o$ are generated keeping the order of left to right excluding the case of no request where a blank is generated. According to request, number of extraction indication information can be increased accompanying minute classification and making complex of tree structure constituting extraction indication information and, as a consequence, processing for the pattern presently dealt with can be optimized. When number of extraction indication information is increased, necessary information can be obtained using only $A_o$ and $E_o$ namely information obtained solely by piling up. Thoroughly pursuing these measures, information can be obtained without using even $A_o$ and $E_o$ through the measure in which every possibility is coded for extraction information. From above, the fact that extraction indication information can be obtained without introducing arbitrarizing and inspection measures at piling up is understood, nevertheless, these measures concerning $A_o$, $A^o$, $E_o$ and $E^o$ makes number of extraction indication information smaller and labour of decision less. Convenient arbitrarizing and inspection measures, for example the measure to obtain terminal node under node with specific name, can be conceived but, nevertheless, only $A_o$, $A^o$, $E_o$ and $E^o$ are used here for extraction indication

TABLE 2

| Input | | | | | Output | |
|---|---|---|---|---|---|---|
| Instruction from upper layer | First extraction information | Second extraction information | Third extraction information | Fourth extraction information | Target language pattern | Instruction to lower layer |
| — | * | play⌴NMI | * | * | P'-2-1 | hiki (VT) |
| — | * | play⌴NSP | * | * | P'-2-1 | si (VT) |
| — | * | play⌴NRO | * | * | P'-2-1 | enji (VT) |
| — | * | kiss⌴— | * | * | P'-2-2 | — | information from the reason that necessary information with optimum labor can be obtained. The extraction information mentioned above is for acquisition of node names in tree structure. On the other hand it is also possible for a node, which is one corresponding to category name and directly on the terminal node, that subsidiary information, for example sort of conjunction for verb etc., can be affixed to the node as comments and that the comment is inspected together with the name of category node giving rise to a part of extraction information. Table 2 is similar to Table 1 and the contents of the table are rules called production rule which describe the method of processing the pattern P-2 using extraction information obtained through extraction indication information and which are affixed to the pattern as indicated by the fact that it is read out from pattern dictionary. Input part has columns for first, second, third and fourth extraction indication information shown in FIG. 19(a), (b), (c) and (d) together with the column for instruction information. The pattern P-2 shown in FIG. 6(b) is that of transitive verb with one object and the Table 2 of production rule for the pattern is huge table having entry for each verb or, furthermore, having entry for each condition of NP (noun phrase) at the right of verb which is kept unaltered. Here the part of the table covering tree structure in FIG. 18 and the verb "kiss" for reference purposes are expressed. Similarly with Table 1, columns for target language pattern are not filled with the letters P'-2-1 or P'-2-2 but with tree structure themselves represented by these letters. Figures for P'-2-1 and P'-2-2 are shown in FIGS. 20(a) and (b) and FIGS. 21(a) and (b). Target language pattern is consisted with, as in FIGS. 8(a) and (b), body of target language pattern shown in the (a) side of respective figure and structure order correspondence table which shows the correspondence of specific node in source language pattern and specific node in target language pattern. The correspondence table is the correspondence table between nodes in source language pattern and nodes in target language pattern which have empty columns to be filled with node number and nodes, on the other hand, which are newly introduced and do not need node number are ignored here. The node names with primes denote that they are in target language tree structure. As formerly explained, S', NP' and VT' denote sentence, noun phrase and transitive verb respectively. Among the nodes newly introduced, J' and JD' denote auxiliarly term and auxiliarly verb respectively. As shown in FIGS. 20(a) and (b), target language patterns include "wa", "o", "ni" and "masu" which are terminal node symbols. Above was minute description of memorized contents of pattern memorizing part MPM especially focusing on memorized contents of extraction indication memorizing region MER shown in FIG. 19 and production rule memorizing region PRT shown in Table 2, when pattern P-2 is taken as an example, and succcessively the operation of extraction generating part EXG and output deciding part SDS using above mentioned information, will be explained.

Tree structure in FIG. 18 from tree structure memorizing part IET and first, second, third and fourth extraction indication information shown in FIGS. 19(a), (b), (c) and (d) respectively from extraction indication memorizing region MER come in extraction generating part EXG. At EXG piling up of each term of IET output and MER output is conducted taking into account arbitrarizing measures and inspection measures $A_o$, $A^o$, $E_o$, $E^o$. The piling up with each structure in FIGS. 19(a), (c) and (d) fails and *'s are generated as the first, third and fourth extraction information. "play" from the $E^o$ under VT in FIG. 19(b) and "NMI" from the $E^o$ under NP right of VT emerge as second extraction information resulting in second extraction information of play⊔NMI. ⊔ denotes space symbol. Space is inserted among information emerged from different position. Second extraction indication information can be re-divided resulting in the situation where "play" and NMI emerge separately. Production rule shown in Table 2 from production rule memorizing region PRT and instruction from separating part IHP which is of no instruction at present, come in output deciding part SDS as shown in FIG. 7. From extraction generating part EXG, the information of play⊔NMI is sent. The output deciding part SDS does operation of table look up of Table 2 and decides that input corresponds to the highest line with meaninful letters in the Table 2, as a consequence, sends target language pattern P'-2-1 to output tree structure memorizing part SPM and also sends "hiki(VT)" which is instruction to lower layer to instruction memorizing part INM. Extraction indication information except one in FIG. 19(b) are ones to cope with possible shape of noun phrase other than the shape of determinative+noun such as "the piano". They are noun itself like "I" or adjective+noun like "good piano" or determinative+adjective+noun like "the good piano". Three lines of information in Table 2 are, as explained later minutely, necessitated corresponding the fact that the verb "play" in English must be translated to be "hiki" when object is name of musical instrument (with category name of NMI) and translated to be "suru" when object is name of sports (with category name of NSP) and finally translated to be "enjiru" when the object is noun having the nature of a role (with category name of NRO). When verb happens to be "kiss", different treatment according to object becomes unnecessary and, as a result, the information in the column of second extraction information becomes "kiss⊔-" involving the mark "-" of arbitrariness or of no information. Nevertheless, the object pattern here must be the one in FIG. 21(a) which requires auxiliary term "ni" after object NP' instead of the one in FIG. 20(a) at the case of "play".

The interesting way of use of $A_o$, where a node or nodes with definite name is surrounded between $A_o$'s. FIG. 22 is the example for the case where "play" will be generated when applied to the tree structure in FIG. 18.

Node number affixing part NMP receives tree structure in FIG. 18 from tree structure memorizing part IET and tree structure in FIG. 6(b) from pattern memorizing region MPR, detecting partial pattern with node number shown in FIG. 23. Node number processing part NNH generates the structure of FIG. 24 in which node numbers in source language are arranged according to structure order in source language tree structure using the structure of FIG. 23. Node number arranging part NNA generates the structure in FIG. 25 interchanging third and fourth node numbers in FIG. 24 according to structure order correspondence table in FIG. 20(b), using NNH output shown in FIG. 24 and structure in FIG. 20(b) which is output of output tree structure memorizing part SPM. This is the arrangement of node in the order of structure order in target language pattern tree structure. NNA output thus obtained is used to fill the empty column corresponding each node at target language pattern tree structure shown in FIG. 20(a) which constitute part of SPM output, giving rise to target language tree structure with node number shown in FIG. 26 at the output of output tree structure generating part SPG. The nodes newly generated at target language structure have no node number but it does not cause any inconvenience because these nodes will not be connected with any other part. The SPG output is introduced to output tree structure affixing part SPA and memorized there coexisting with former memory contents of output tree structure group memorizing part PGM shown in FIG. 12. Consequently new contents of memory of PGM will be the structure where the structure of FIG. 26 exists at the right side of the structure in FIG. 12.

Figure 28:
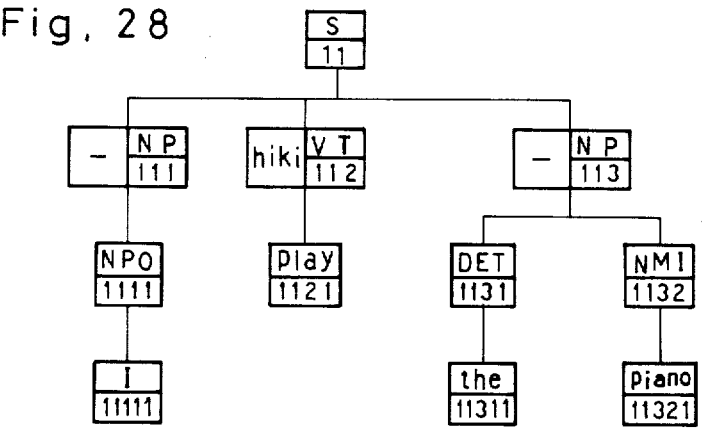
FIG. 28 is the figure of handled tree structure at the second round of operation with attached instruction for the partial pattern P-2.
Figure 29:
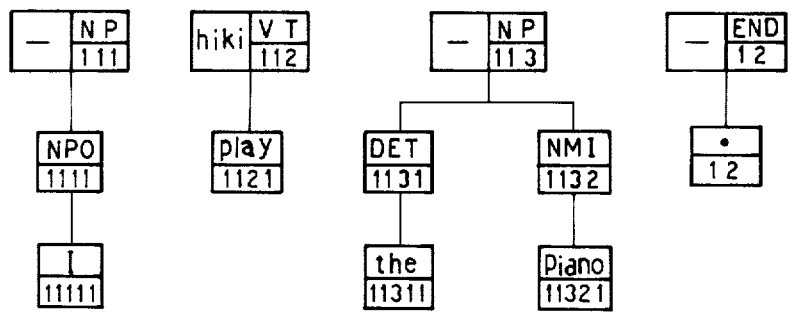
FIG. 29 is the figure for rest tree structure after the erasing of partial pattern P-2.

In structure to lower layer consisting the other part of the output of output deciding part SDS is expressed in simplified fashion in Table 2 as "hiki(VT)" but actually this is meant to indicate that instruction of "hiki" must be given to VT node and nothing must be given to border nodes consisted of the other 2 NP's and is of the shape of structure in FIG. 27 resembling to FIG. 13. This information, after being memorized at instruction memorizing part INM, is introduced to instruction affixing part INA together with structure in FIG. 18 which is output of tree structure memorizing part IET. There, the operation of piling up is done among them and tree structure in FIG. 28 is generated. The output is introduced to erasing part, where erasing of the present pattern shown in FIG. 6(b) is conducted by erasing nodes higher than the nodes having instruction to lower layer, excluding ones on the border. As a result, 3 tree structures shown in FIG. 29 are sent to rest tree structure memorizing part RTM. This output is added with output of not handled tree structure memorizing part NHM at tree structure affixing part HTA. Tree structure affixing part HTA affixes tree structure in FIG. 17 at the right side of 3 trees in FIG. 26 ordered in this order and sends the result to present tree structure memorizing part CTM. Above is the operation of this system at the second round or the operation for pattern of P-2.

Figure 30:
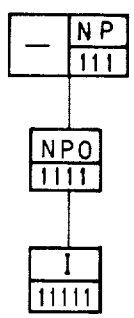
FIG. 30 is the figure of handled tree structure for the third round of operation.
Figure 31:
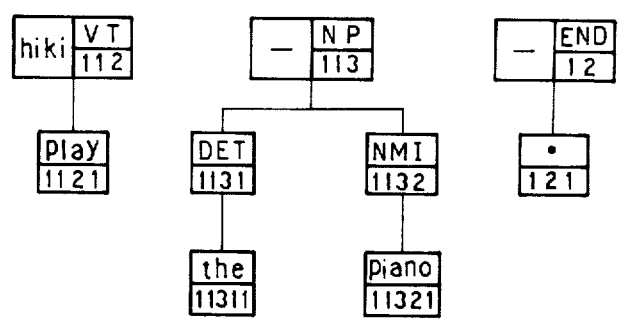
FIG. 31 is the figure of not handled tree structure for the third round of operation.
Figure 32:
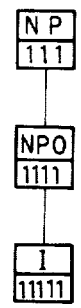
FIG. 32 is the figure for handled tree structure for the third round of operation after the separation of instruction.

Following is the description of the operation of third round for the system in FIG. 7. The leftest tree structure in FIG. 29 or the tree structure of FIG. 30 is designated as handled tree structure at the handled tree structure deciding part HTD and sent to handled tree structure memorizing part HTM, and consequently other part of the input to HTD or the part in FIG. 31 is sent to not handled tree structure memorizing part NHM and memorized there. Tree structure of the shape of FIG. 30 out of HTM is separated into instruction and body of tree structure at the separating part IHP. The instruction information of no instruction is sent to output deciding part SDS, meanwhile the tree structure shown in FIG. 32 is sent to tree structure memorizing part IET. The IET output of the shape of FIG. 32 is sent to partial pattern finding part PPD, where the coincidence detection is done between pattern dictionary PTD. Present PPD output is pattern P-4 shown in FIG. 6(d), and the information of this selection is sent to pattern memorizing part MPM. MPM obtains information pattern P-4 from the information and pattern dictionary PTD and memorizes it in the 3 memorizing regions in MPM. Pattern memorizing region MPR stores structure of FIG. 6(d) unaltered, and extraction indication memorizing region MER stores the information of no information and finally production rule memorizing region PRT memorizes production rule shown in Table 3.

TABLE 3

| Input | | Output | |
|---|---|---|---|
| Instruction from upper layer | Extraction information | Target language pattern | Instruction to lower layer |
| — | — | P'-4-1 | — |

Figure 33:
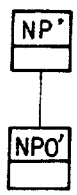
FIG. 33 is the figure of target language pattern P'-4-1.
Figure 34:
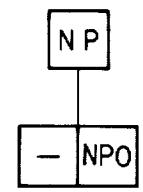
FIG. 34 shows instruction to lower layer concerning partial pattern P-4.
Figure 35:
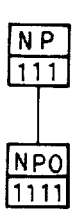
FIG. 35 is the figure for tree structure with node number for partial pattern P-4.
Figures 36, 37:
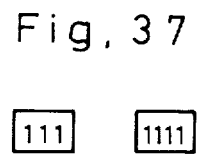
FIG. 36 is arrangement, concerning partial pattern P-4, of node numbers in accordance with structure order in source language.
FIG. 37 is arrangement, concerning partial pattern P-4, of node numbers in accordance with structure order in target language.
Figure 38:
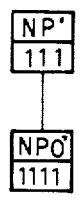
FIG. 38 is figure of target language tree structure concerning partial pattern P-4.

Extraction generating part EXG sends information of no information to output deciding part SDS as there is no indication from extraction indication memorizing region MER. SDS sends the structure of P'-4-1 shown in FIG. 33 to output tree structure memorizing part SPM and also information of no information which is shown in FIG. 34 to instruction memorizing part INM according to the PRT output which is in Table 3, because of the fact that information of no instruction has arrived from separating part IHP. Further, only output of respective parts according to the order of processing will be mentioned. Node number affixing part NMP output is shown in FIG. 35 and node number processing part NNH output is shown in FIG. 36 and node number arranging part NNA output is shown in FIG. 37. Output tree structure generating part SPG output which is shown in FIG. 38 is added to output tree structure group memorized in output tree structure memorizing part PGM at the output tree structure affixing part SPA resulting in the tree structures in FIG. 39 with the same order of arrangement. Instruction affixing part INA output is shown in FIG. 40 and output of MPE or RTM is shown in FIG. 41. This is added to the left of the memory contents of not handled tree structure memorizing part NHM depicted in FIG. 31 at the tree structure affixing part HTA and the result is sent to present tree structure memorizing part CTM. The output is sent to handled tree structure deciding part HTD where the leftest tree structure shown in FIG. 41 is chosen as the handled tree structure and tree structure of FIG. 31 is again sent to not handled tree structure memorizing part NHM and memorized there. Output of handled tree structure memorizing part HTM in FIG. 41 is introduced to separating part IHP. The output of IHP is consisted of two parts and one of them which is information of no instruction is sent to output deciding part SDS and the other of them which is body of tree structure shown in FIG. 42 is memorized at tree structure memorizing part IET. Part of IET output is sent to partial pattern finding part PPD, where coincidence test by piling up with memory contents of pattern dictionary is performed resulting the information that P-I in FIG. 6(e) is chosen, which information is immediately sent to pattern memorizing part MPM. MPM, on the other hand, memorizes in its three regions the information concerning P-I using the information and information for P-I written in pattern dictionary PTD. Pattern memorizing region, among them, memorizes structure of FIG. 6(e) unaltered and extraction indication memorizing region MER stores the information of no information and production rule memorizing region PRT have production rule shown in Table 4.

TABLE 4

| Input | | Output | |
|---|---|---|---|
| Instruction from upper layer | Extraction information | Target language pattern | Instruction to lower layer |

TABLE 4-continued

| | | P'-I-1 | |
| --- | --- | --- | --- |

Extraction generating part EXG sends information of no information to output deciding part SDS as there is no indication from extraction indication memorizing region MER. Here, the information of no instruction has already come from separating part and so SDS, according to the production rule information in Table 2 which is PRT output, sends instruction of P'-I-1 in FIG. 43 to output three structure memorizing part SPM and also sends structure of FIG. 44 corresponding to no instruction to instruction memorizing part INM. Output of each part will be solely described hereafter according to the order of processing. Output of node number affixing part NMP is shown in FIG. 45 and output of node number processing part NNH is shown in FIG. 46 and output of node number arranging part NNA is shown in FIG. 47. The output of output tree structure generating part SPG is shown in FIG. 48, which is added to output tree structure group already memorized in output tree structure group memorizing part. Tree structure group memorized in PGM takes a shape consisted of that of FIG. 39 added with tree structure of FIG. 48 to the right. Output of instruction affixing part INA is shown in FIG. 49 and output of MPE or RTM is that of no output. As RTM output is that of no output, output of tree structure affixing part HTA becomes to be the same as output of not handled tree structure memorizing part NHM. HTA output is sent to handled tree structure deciding part HTD via present tree structure memorizing part CTM. Here again the leftest tree structure shown in FIG. 50 is selected as handled tree structure and is sent to handled tree structure memorizing part HTM and the rest of the tree structure shown in FIG. 51 is sent to not handled tree structure memorizing part NHM and memorized there. The output of handled tree structure memorizing part HTM shown in FIG. 50 is introduced to separating part IHP. IHP output consists of two parts and one of them, the information of "hiki" is sent to output deciding part SDS and the other of them, the body of tree structure depicted in FIG. 52, is memorized at tree structure memorizing part IET. The latter is then sent to partial pattern finding part PPD, where it is imposed with coincidence by piling up with memory contents of pattern dictionary PTD sending the information that P-play in FIG. 6(f) is selected to pattern memorizing part MPM. MPM, on the other hand, stores information concerning P-play in its three memorizing regions, where the information and information from pattern dictionary concerning P-play are used. Structure of FIG. 6(f) is memorized at the pattern memorizing region MPR unaltered, and the information of no instruction is memorized at extraction indication memorizing region MER and production rule shown in Table 5 enters at production rule memorizing region PRT.

TABLE 5

| Input | | Output | |
| --- | --- | --- | --- |
| Instruction from upper layer | Extraction information | Target language pattern | Instruction to lower layer |
| hiki | — | P'-play-1 | — |
| si | — | P'-play-2 | — |
| enji | — | P'-play-3 | — |

Figure 53:
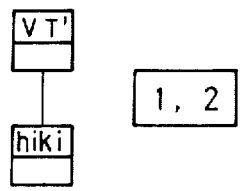
FIG. 53 is the figures of target language patterns for the partial pattern P-play.
Figure 53:
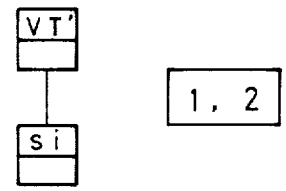
Figure 53:
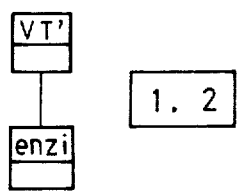
Figure 54A:
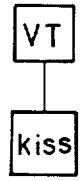
FIG. 54(a) shows the figure of source language pattern P-kiss.

Extraction generation part EXG, obtaining no indication from extraction indication memorizing region MER, sends information of no information to output deciding part SDS. SDS decides that an input consisted of highest line in production rule expressed by Table 5 has come in, through the aid of the instruction "hiki" from separating part IHP and above mentioned information of no extraction, and consequently sends target language pattern P'-play-1 and information of no instruction to lower layer to tree structure memorizing part SPM and instruction memorizing part INM respectively. FIGS. 53(a), (b) and (c) show actual contents of P'-play-1, P'-play-2 and P'-play-3 respectively. For reference purposes, production rule where the verb "kiss" is used instead of the verb "play" is shown in Table 6 and related source language pattern of "kiss" and target language patterns corresponding figures in FIG. 53 are shown in FIGS. 54(a) and (b) respectively.

TABLE 6

| Input | | Output | |
| --- | --- | --- | --- |
| Instruction from upper layer | Extraction information | Target language pattern | Instruction to lower layer |
| hiki | — | P'-kiss-1 | — |

Figure 55:
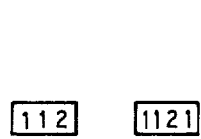
FIG. 55 is arrangement, concerning partial pattern P-play, of node numbers in source language in accordance with structure order in source language pattern.
Figure 56:
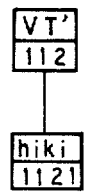
FIG. 56 is figure of target language tree structure for partial pattern P-play.

This corresponds to the description given in lower part of Table 2 and structure in FIG. 21(I a). Instruction was given in the shape of Table 2 and FIG. 27, for the case of pattern P-2, and on the other hand it is received in the shape of Table 5 and FIG. 53(a), for the case of P-play, which instruction is used in selection of translated word for "play". The aim of use of instruction, other than the use for selecting translated words shown here, can turn out to be the use for tranformation of negative source language pattern to affirmative target language pattern and the use of transformation of future tense to present tense and various other uses conforming to various requests in natural language. As seen in the tables mentioned so far, the transformation can be expressed by production rules which generate pairs consisting of target language pattern and instruction to lower layer by the use of instruction from upper layer and extraction information from lower layer. This is the merit of production rule which constitutes important element in this invention. The type of instruction can be arbitrary as far as it is registered at the patterns in lower layer. Node number affixing part NMP generates again the structure in FIG. 52 to its output through the use of tree structure in FIG. 52 from tree structure memorizing part IET and tree structure in FIG. 6(f) from pattern memorizing region MPR. Based on NNH output shown in FIG. 55 and right side part of the structure in FIG. 53(a) which is output of output structure memorizing part SPM, node number arranging part NNA generates the structure consisting of node numbers arranged in the order of structure order in target language tree structure and, as a result and by the use of above information, the tree structure shown in the left side of FIG. 53(a) which is a part of SPM output, sends the target language structure with node number shown in FIG. 56 as its output. This output is introduced to output tree structure affixing part SPA, where it is affixed to the right of the memory contents in output tree structure group memorizing part PGM. As a result, memory contents of output tree structure group memorizing part PGM become the one shown in FIG. 57. Instruction memorizing part INM, as is formerly seen, is generating the information of no instruction shown in FIG. 58. The information and tree structure memorizing part IET output aid to generate the output shown in FIG. 59 at the instruction affixing part INA. This enters in erasing part MPE making the output of MPE to be no output, in consequence of the fact that output of rest tree structure memorizing part is also of no output. Only not handled tree structure memorizing part NHM output enters to tree structure affixing part HTA, because RTA sends no output. This information enters into present tree structure memorizing part CTM via handled tree structure deciding part HTD. HTD emits the structure expressed in FIG. 60 to handled tree structure memorizing part HTM and also emtis the structure in FIG. 61 to not handled tree structure memorizing part NHM. The processing in the system of this invention progresses similarly as before but the operation of the circular part, from now on, is abbreviated at the explanation and the result will be only expressed in the following passage because recognition for the operation becomes easy as there is no instruction operation hereafter. Ultimately tree structure group in FIG. 62 becomes memorized at the output tree structure group memorizing part PGM after the operation of circular part so far explained. At the figure, the contents of upper left column, upper right column and lower left column are memorized in this order. The source language patterns P-3, P-the, P-piano and P-period are shown in FIGS. 6(c), (g), (h) and (i) respectively and corresponding production rules are shown in Table 7, 8, 9 and 10 respectively and also corresponding target language patterns which are P'-3-1, P'-the-1, P'-piano-1 and P'-period-1 are expressed by FIGS. 63, 64, 65 and 66 respectively, which give rise to the target language tree structures with node numbers shown in the fourth, third, second and first portion in FIG. 62 counted from right respectively. Here, DET' and NMI' denote node marks for determinative and musical instrument name in target language respectively.

TABLE 7

| Input | | Output | |
|---|---|---|---|
| Instruction from upper layer | Extraction information | Target language pattern | Instruction to lower layer |
| — | — | P'-3-1 | — |

TABLE 8

| Input | | Output | |
|---|---|---|---|
| Instruction from upper layer | Extraction information | Target language pattern | Instruction to lower layer |
| hiki | — | P'-the-1 | — |

TABLE 9

| Input | | Output | |
|---|---|---|---|
| Instruction from upper layer | Extraction information | Target language pattern | Instruction to lower layer |
| hiki | — | P'-piano-1 | — |

TABLE 10

| Input | | Output | |
|---|---|---|---|
| Instruction from upper | Extraction | Target language | Instruction to lower |

TABLE 10-continued

| layer | information | pattern | layer |
|---|---|---|---|
| hiki | — | P'-period-1 | — |

Figure 67:
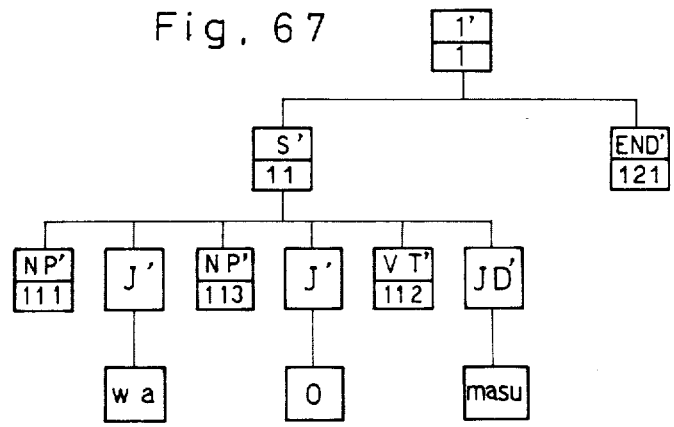
FIG. 67 shows the result of first connecting operation at output tree structure connecting part SPC.
Figure 68:
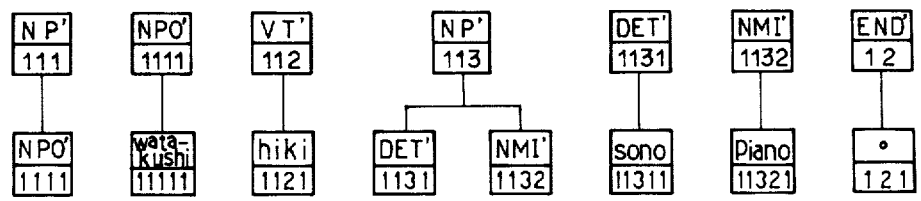
FIG. 68 shows the remaining part after the first connecting operation at output tree structure connecting part SPC.
Figure 69:
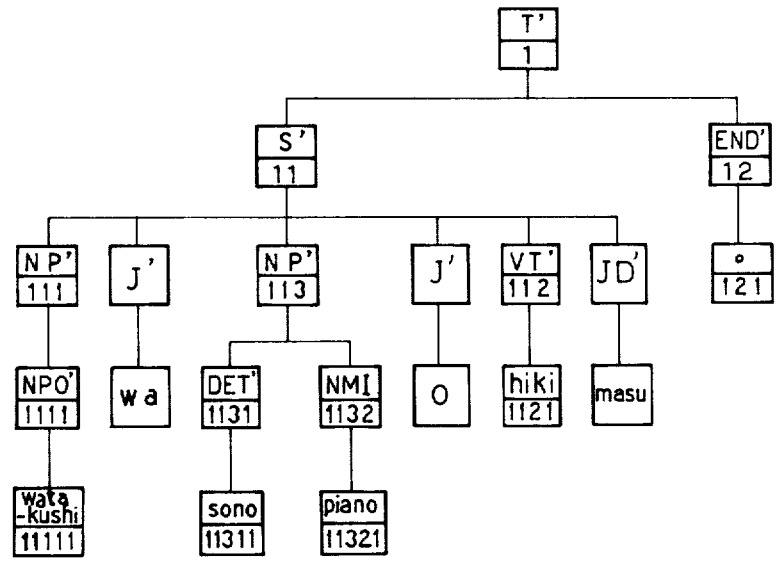
FIG. 69 shows result of merge at output tree structure connecting part SPC.

Above is the explanation concerning circular part of the system in FIG. 7. At the last stage of the circulation the situation where input to handled tree structure memorizing part HTM is absent, occurs. The information, namely information of end of circulation, is sent to output tree structure connecting part SPC and target language pattern linearizing part SPL, resulting in commence of operation at these parts. First SPC repeats the operation in which "second from leftest" tree structure in the tree structure group memorized in work memory region in SPC is merged with the leftest one at the node common to both using structure in FIG. 62 emerged from output tree structure group memorizing part PGM, and finally generates one tree structure. The result of first merge, the remaining part after the first merge and final result of merge are shown in FIGS. 67, 68 and 69 respectively. The structure in FIG. 69 is output of output tree structure connecting part SPC, which is introduced to target language pattern linearizing part SPL. SPL picks up terminal nodes from input tree structure shown in FIG. 69 and removes node numbers from them and finally arranges them at the order of original position in FIG. 69 resulting in the output of FIG. 70 and generates the information keeping the order unaltered and finally gives the target language sentence or translated result in Japanese. The result is:

$$\text{watakushi wa sono piano o hiki masu}_o \qquad (11)$$

This in the output corresponding to the input tree structure shown in FIG. 4. When verb is altered from "play" to "kiss" at the FIG. 4, the result obtained via the structure of FIG. 21(a) becomes:

$$\text{watakushi wa sono piano ni kisushi masu}_o \qquad (12)$$

Here operation of parts comprising the system of this invention shown in FIG. 7 must be reviewed again to make clear the operation as a whole. Explanation is successively made for every part except for simply constituted memorizing parts. The typical operation of handled tree structure memorizing part HTD will be as follows. Namely, it selects leftest one from tree structure group shown in FIG. 29 as handled tree structure and sends to handled tree structure memorizing part HTM and sends remaining parts or tree structure group in FIG. 31 to not handled tree structure memorizing part NHM and, as a result, separates leftest tree structure and other part among tree structure group constituted of many tree structures. When the input is constituted of only one tree structure as is in FIG. 4, the input becomes its output unchanged.

Separating part IHP takes tree structure with instruction at the highest node as shown in FIG. 50 as an input and generates instruction information and body of tree structure shown in FIG. 52 in separated fashion, where instruction information is sent to output deciding part SDS and body of tree structure is sent to tree structure memorizing part IET. When instruction attached to the highest node is mark of "-" of no information, IHP sends information of no information to SDS. Partial pattern finding part PPD, taking tree structure memorizing part IET output as one input and taking pattern dictionary PTD output as the other input, calls up each term registered in PTD successively and compares it with IET output and trys to find a tree structure which is partial tree structure of IET output and which, moreover, contains the highest node of IET output as its highest node. When the tree structure memorizing part IET output happens to be as shown in FIG. 18, as explained minutely concerning FIG. 18, registered term of FIG. 6(b) in pattern dictionary is chosen.

Pattern memorizing part MPM obtains information concerning the name of coincident partial pattern from partial pattern finding part PPD together with information of formerly mentioned coincident partial pattern written in PTD from PTD and memorizes this information in the three memorizing regions in MPM. When information is attached to above mentioned pattern, the signal path from PTD to PPD becomes unnecessary. Above-mentioned information consists of three parts which are coincident partial pattern, extraction indication information and production rule and these are memorized in pattern memorizing region MPR, extraction indication memorizing region MER and production rule memorizing region PRT respectively. When the coincident partial pattern is as shown in FIG. 6(b), for example, memory contents in MPR is of course as shown in FIG. 6(b) and memory contents in MER is four tree structures in FIG. 19 and memory contents of PRT is as shown in Table 2. Explanation for FIG. 19 is made at the explanation of extraction generating part EXG and that of Table 2 is made at the part of output deciding part SDS.

Extraction generating part EXG obtains information by piling up some tree structure terms contained in extraction indication memorizing region MER on tree structure memorized in tree structure memorizing part IET. Each tree structure term in MER has the structure of coincident partial pattern but attached with some additional structure. To the tree structure terms the arbitrarization measures which ensure that the parts affected by the measures must not pile up with the tested tree and can be arbitrary and inspection measure which directs to inspect some portion or the whole of the parts affected by arbitrarization measure, are also attached. The explanation is already done at FIG. 18 or FIG. 19.

Output deciding part SDS, using production rule related to the coincident partial pattern sent from production rule memorizing region PRT and obtaining information of instruction from upper layer which is one of the input required by above-mentioned production rule, from output of separating part IHP and also obtaining extraction information which is the other of the input, from above-mentioned extraction generating part EXG, generates output consisting of two sorts of information which are target language pattern and instruction to lower layer. The operation of this part is done by the shape of table look up which consists of finding pair of input which falls under desired one and generating corresponding output. At the example of FIG. 20, target language pattern consists of body of target language pattern shown in FIG. 20(a) and structure order correspondence table which is a correspondence table between the structure order of source language nodes shown in FIG. 20(b) and that of target language nodes, and both of them are sent to output tree structure memorizing part SPM. The other part of SDS output is instruction to lower layer, which consists of coincident partial pattern tree structure but attached with instruction to lower layer at border nodes and which is sent to instruction affixing part INA via instruction memorizing part INM. When no instruction must be sent, the marks of no instruction which are "-" are attached to the border nodes. The information, at the example of P-2 is shown in FIG. 27. Node number affixing part NMP receives input concerning whole tree structure presently treated, from tree structure memorizing part IET and also receives input concerning coincident partial pattern deprived of node numbers from pattern memorizing region MPR, and piles up the former on the latter and takes off the portion of the former not involved in the latter and generates as a result coincident partial pattern with node numbers. As for example of pattern P-2, the processing corresponds to the generation of output of FIG. 23 from the two portions of information which are shown in FIG. 18 and FIG. 6(b).

Node number processing part NNH does the operation of arranging node numbers according to structure order using the input consisting of node number affixing part NMP output. Similarly when the case of P-2 is taken as an example, this part generates output of structure in FIG. 24 using the input tree structure shown in FIG. 23. Node number arranging part NNA receives structure order corresponding table which is correspondence table between nodes in source language pattern and target language pattern emerged from output tree structure memorizing part SPM, and also receives the structure made of a row of node numbers arranged according to structure order of source language and generates the structure made of a row of node numbers arranged according to structure order of target language. As for the example of pattern P-2, the processing corresponds to the generation of the structure in FIG. 25 using the structure in FIG. 24 and that in FIG. 20(b).

Output tree structure generating part SPG uses node number arranging part NNA output which is row of node number arranged in structure order and also uses target language pattern structure with empty column, both as input information, and does operation to fill empty columns in above-mentioned pattern with node numbers in corresponding structure order. In the example P-2, the operation is to generate structure in FIG. 26 from structure of FIG. 20(a) which is output of output tree structure memorizing part SPM and structure of FIG. 25 which is output of node number processing part NNH.

A portion of instruction affixing part INA input is tree structure memorizing part IET output which is, an INA, piled up with coincident partial pattern tree structure having instruction to lower layer at border nodes and consisting the output of instruction memorizing part INM. INA transposes, as a result, instruction to lower layer formerly obtained by the border nodes of the latter to the corresponding nodes in the former tree structure. For the case of pattern P-2, it corresponds to the operation of piling up the structure in FIG. 18 on the structure in FIG. 27 and giving rise to the structure in FIG. 28.

Erasing part MPE, as formerly mentioned, erases all nodes higher than the nodes with instruction to lower layer from the formerly mentioned instruction affixing part INA output. As for the case of pattern P-2 the operation corresponds to generation of structure of FIG. 29 from that of FIG. 28.

The structure affixing part HTA adds output of not handled tree structure memorizing part NHM to the right of the output of rest tree structure memorizing part RTM. Similarly output tree structure affixing part SPA adds output of output tree structure generating part SPG to the right of output tree structure generating part SPG output. As the operation of output tree structure connecting part SPC and target language pattern linearizing part SPL will not be treated here whereas they have been explained minutely.

Above is explanation for the system in FIG. 7 including detailed explanation for every composing part. These composing parts can be realized by ample program of list processing computer language called LISP using programs which indicate modification, addition, elimination and test of coincidence of tree structure written by the language. The system also can be realized by some high grade computer language such as PL-1 without using LISP. Composing parts of the system of this invention shown in FIG. 7 can be also realized by electronic circuit without using above-mentioned computer languages. The methods of the realization is mentioned hereafter for every composing part in FIG. 7.

For the case, the expression of a tree structure by a row of letters must be used. The expression is called as expression by S equation. This expression is based on the expressing method of Eq. (13) for the structure where some children nodes are connected directly below a mother node.

$$\text{mother node name (first child name} \sqcup \text{second child name} \sqcup \text{- - -} \sqcup \text{n'th child name)} \quad (13)$$

At the above equation, the part written between the left parenthesis "(" and right parentheses ")" is expressed to be connected directly below the node written directly left of the left parenthesis. Children nodes are arranged in the same order as in the order in corresponding tree but separated by blank marks "$\sqcup$". Using this method the structure in FIG. 6(a) is written as:

$$T(S \sqcup END) \quad (14)$$

and the example of FIG. 3 which is a little complicated can be expressed as is in the following Eq. (15) successively using the expression shown in Eq. (13).

$$T(S(NP(NPO(I) \sqcup VT(play) \sqcup NP(DET(the) \sqcup NMI(piano))) \sqcup END(.)) \quad (15)$$

The expressions not included in ordinary S equation, where node number is expressed by the number surrounded by large parentheses [] at the directly right position to the corresponding node and instruction is expressed by the instruction surrounded by angle parentheses < > at the left to correspond node, are introduced here. For example the structure of FIG. 30 is expressed as:

$$<-> NP[111](NPO[1111] \sqcup I[11111]) \quad (16)$$

The empty node number position is expressed by left large parentheses "[" and the case of FIG. 20(a) for example is expressed as:

$$S'[(NP'[\sqcup J'(wa) \sqcup NP'[\sqcup J'(o) \sqcup VT'[\sqcup JD'(masu)) \quad (17)$$

$A_o$, $A^o$, $E_o$ and $E^o$ corresponding to arbitrarization measures and inspection measures are expressed as they are ordinary nodes. For example the structure in FIG. 19(b) can be written as:

$$S(NP(A_o) \sqcup VT(E^o) \sqcup NP(DET(E_o) \sqcup E^o(E_o))) \quad (18)$$

The structure in which some tree structures are arranged in a row, is expressed by the row of sequences consisting of S equation each of which corresponds to a tree structure, with more than one spaces between sequences. For the sake of clarity at description, a bar is inserted at the space between sequences of tree structures in this explanation as shown in Eq. (19) corresponding to FIG. 31, but in the actual processing in this invention, there are no such bars at the position of above-mentioned spaces.

$$(19)$$

$$<hiki> VT[112](\text{play}[1121]) \mathrel{\underset{\cdot}{\cup}} <-> NP[113](DET[1131]$$

$$\sqcup(\text{the}[11311]) \sqcup NMI[1132](\text{piano}[11321])) \mathrel{\underset{\cdot}{\cup}} <->$$

$$END[12](.[121])$$

Above is the explanation concerning S equation used in the invention and following is composing component in the system of machine translation in FIG. 7 using above-mentioned expression of tree structure. The input to the machine translation of this invention is the result of pre-processing expressed in S equation explained in Eq. (13). The input tree structure in FIG. 4, for example, is expressed by:

$$T[1](S[11](NP[111](NPO[1111](I[11111])) \sqcup VT[112] \quad (20)$$

$$(\text{play}[1121]) \sqcup NP[113](DET[1131](\text{the}[11311] \sqcup NMI[1132]$$

$$(\text{piano}[11321]))) \sqcup END[12](.[121]))$$

Following the operation of composing elements of machine translation system shown in FIG. 7.

Input tree structure memorizing part ITM can be composed by ordinary RAM (random access memory), and so explanation for the detail of this part is abbreviated. The situation is the same for present tree structure memorizing part CTM. Typical operation of handled tree structure deciding part HTD is one, in which the tree structure shown in FIG. 30 which is the leftest among the structure in FIG. 29 is selected as handled tree and sent to handled tree structures memorizing part HTM and the other component consisting of tree structure group shown in FIG. 31 is sent to not handled tree structure memorizing part NHM. The S equation expression for above operation is the operation of receiving the structure in following Eq. (21) and sending the structure in following Eq. (22) which is the leftest to HTM and sending other component to NHM.

$$(21)$$

$$<-> VP[111](NPO[1111](I[11111])) \mathrel{\underset{\cdot}{\cup}} <hiki> VT[112]$$

$$(\text{play}[1121]) \mathrel{\underset{\cdot}{\cup}} <-> NP[113](DET[1131](\text{the}[11311])$$

$$\sqcup NMI[1132](\text{piano}[11321]) \mathrel{\underset{\cdot}{\cup}} <-> END[12](.[121])$$

$$<-> VP[111](NPO[1111](I[11111])) \quad (22)$$

Figure 71B:
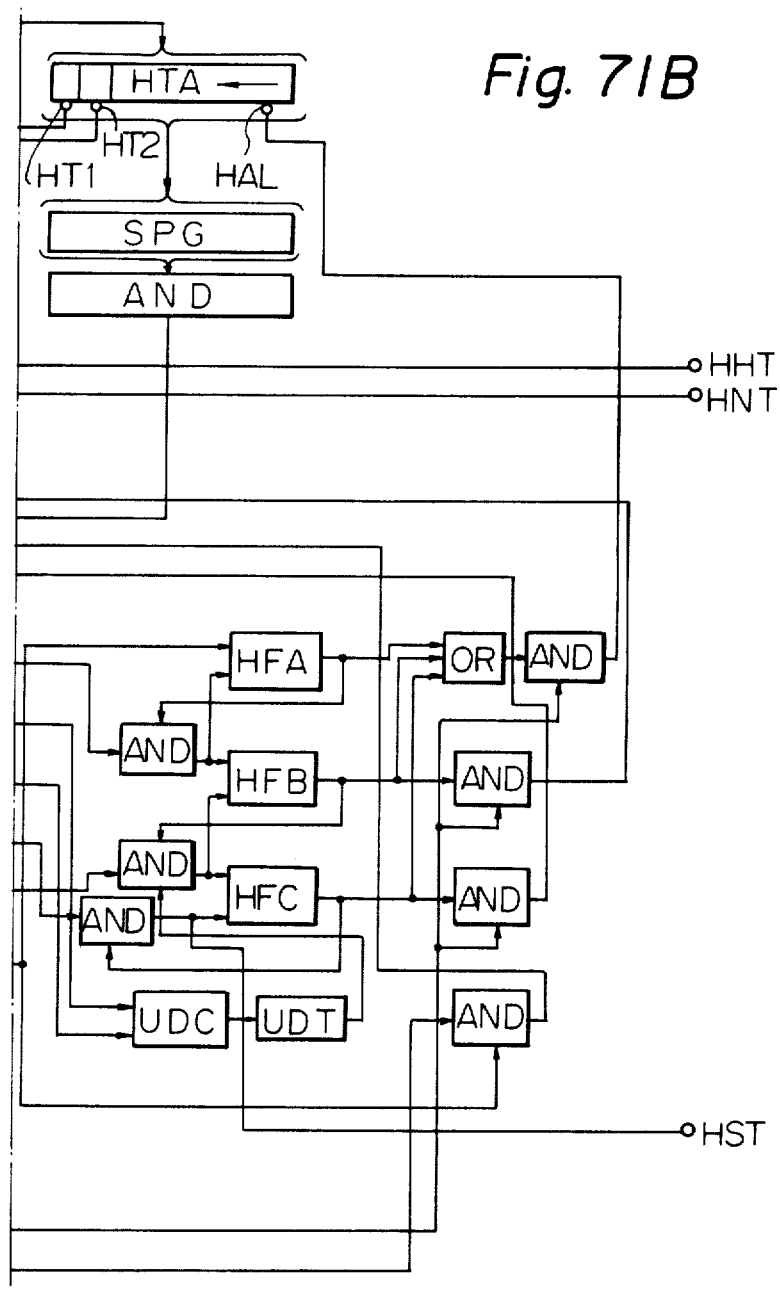

It will be easily seen that number of left parentheses and right parentheses contained in a tree structure are equal. Handled tree structure deciding part HTD can be realized by the electronic circuit shown in FIG. 71. AMT, CTP and CLC, in FIG. 71, are start pulse input terminal, present tree structure input terminal receiving signal from present tree structure memorizing part CTM and clock input terminal respectively and they constitute the entire input terminals in handled tree structure deciding part HTD. HHT, HNT and HST are handled tree structure output terminal sending signal to handled tree structure memorizing part HTM, not handled tree structure output terminal sending signal to not handled tree structure memorizing part NHM and completion pulse output terminal sending the information that the operation of handled tree structure deciding part HTD is completed. They all constitute the entire output terminals of HTD.

HTA, HTB and HTC are A, B and C shift registers respectively and clock terminal of these shift registers are HAL, HBL and HCL respectively. B shift register HTB and C shift register HTC have input terminals HBT and HCT respectively. Input terminals will be written at the input terminal of rightest stage of shift register through the figures appearing hereafter, except commented otherwise. A shift register HTA has two output terminals HT1 and HT2 and they are called A shift register first output terminal and A shift register second output terminal respectively. Hereafter except the case where other notation is indicated, the output terminal of leftest stage of shift register has a name with 1 at the last letter and the output terminal of the stage of the stage right of the former stage has a name with 2 at the last letter. The output terminal having 1 at the last letter of its name and having 2 at the last letter of its name are called first ouput terminal and second output terminal respectively. Similarly the way of expression is applied to numbers other than 1 and 2. Simultaneous input and simultaneous output to and from the whole stages of the A shift register HTA is possible. The symble of ⇢ shows the path of simultaneous input and consequently the lead connected to the symbol is of multi-leads and deals with multi-signal. The symbol of ⇠ shows similarly the symbol for simultaneous output at whole stages. Accordingly, B shift register HTB and C shift register HTC can conduct simultaneous input and output operation. All registers do the operation of sending signal by one stage to the left every time clock signal comes at their clock terminals. Shift register having these functions can be realized by RAM (random access memory). Every shift register consists of 1 bit shift registers arranged in parallel configuration enough to accommodate all of letters used in natural language together with parentheses ( ), angle parenthese < >, large parenthese [ ] used for processing and also $A_o$, $A^o$, $E_o$, $E^o$ which are symbols for dealing condition.

AND in the figure is AND circuit which emits 1 at its output when all of its input signals are 1 and emits 0 otherwise. OR in the figure is OR circuit which emits 0 at its output when all of its input signals are 0 and emits 1 otherwise. They are realized by gate circuits. SPD is space detector and LPD is left parentheses detector and RPD is right parenthesis detector all of which emit 1 when letters which must be detected by these specific detectors occur at their input consisting of some bits and emit 0 otherwise. The circuit doing above-mentioned operation can be realized by keeping a bit input which must be 1 at the letter to be detected, unchanged and inverting, by an inverter which generates 1 at the output when the output is 0, a bit which must be 0 and then introducing all input to an AND circuit. SPG is space detector group which consists of a plurality of space detectors of the number equal to the stage number of A shift register HTA and do simultaneous input and output operation explained by symbols of ⇢ ⇠. The part denoted by INV is inverter which emits 1 when input is 0 and 0 when input is 1 and can be realized by gate circuit.

HFA is A state flip-flop and HFB is B state flip-flop and HFC is C state flip-flop. These flip-flops play the role of memorizing the operating state of this part HTD. For example when this part is at the state of $S_A$, A state flip-flop is "on" and emits 1 and other flip-flops are "off" and emit 0. Of course when this part is at the state of $S_B$, B state flip-flop HFB becomes "on" and others are "off". Hereafter the notation that "x" state flip-flop which has letter "x" at the last of its name, is "on" when the part is at state $S_X$, is used. Hereafter the expression where the upper terminal among the two terminals of each flip-flop is "on" terminal and the flip-flop becomes "on" and begins to emit 1 as its output when this terminal receives a pulse and the lower terminal is "off" terminal and flip-flop becomes "off" begins to emit 0 as its output when this terminal receives a pulse.

UDC is up-down counter which count-ups by one count when a pulse appears on the upper terminal among its two input terminals and count-downs by one count when a pulse appears on the lower terminal. Hereafter the notation is observed. UDT is unit detector which emits 1 when count of up-down counter is 1 and otherwide emits 0.

Figure 73A:
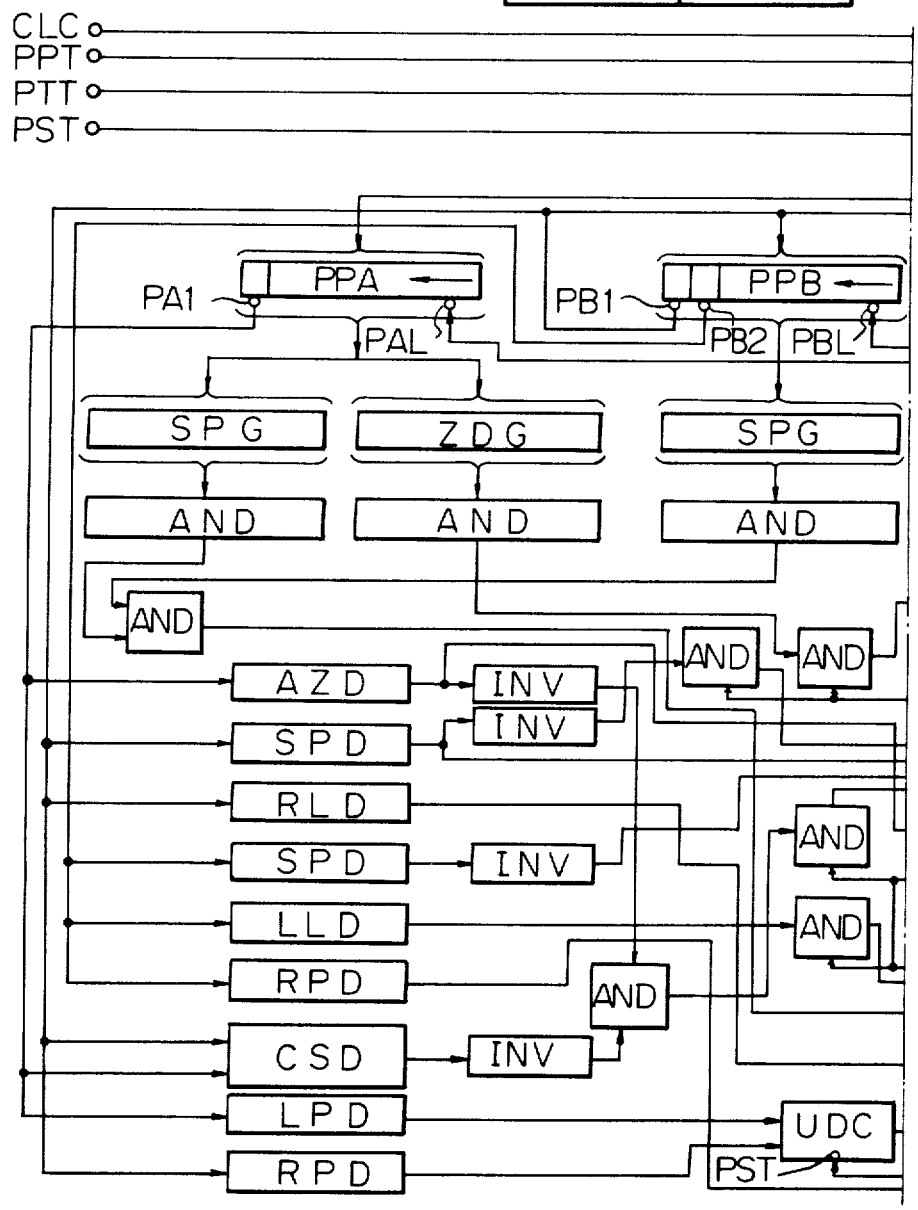
Figure 73B:
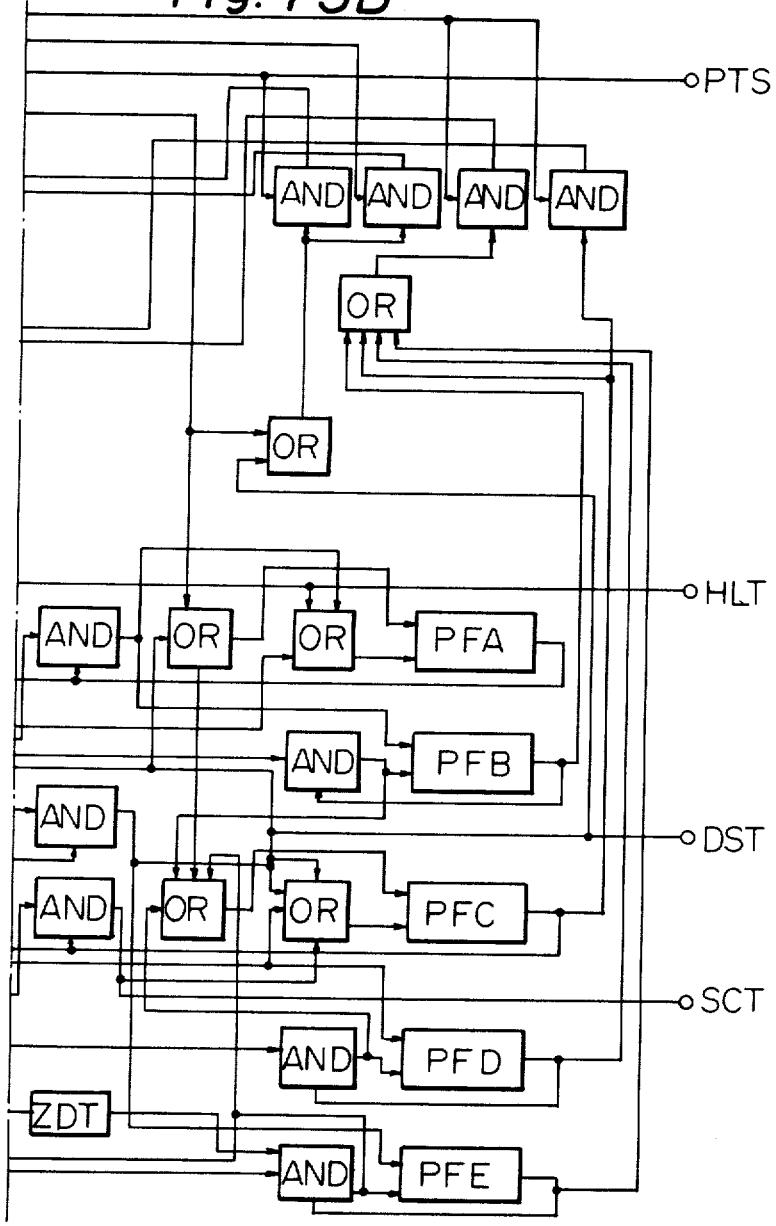

Here the explanation for composing parts as themselves in handled tree structure deciding part HTD shown in FIG. 71 is concluded and the part of nature which is common to FIG. 73 or the figures after FIG. 73 is abbreviated to avoid complexity.

Following is the operation of the handled tree structure deciding part HTD as a whole, the operation of HTD will be summarized as follows. It reads-in S equation of the type of Eq. (21), for example, in its A shift register HTA and moves S equation of Eq. (22) which corresponds to handled tree structure to B shift register HTB and moves other parts to C shift register HTC. The detailed is given below.

Figures 70, 72:
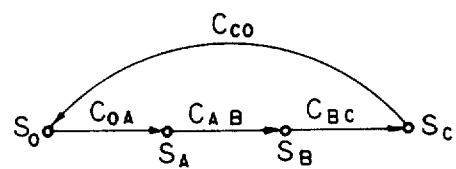
FIG. 70 shows the output of target language pattern linearizing part SPL.
FIG. 72 is state diagram of tree structure deciding part HTD.

The part or handled tree structure deciding part HTD has a state diagram of FIG. 72. Namely this part has four states consisting of $S_0$, $S_A$, $S_B$ and $S_C$. The state transition signals are $C_{0A}$, $C_{AB}$, $C_{BC}$ and $C_{C0}$. State are, as before, expressed by S followed by a suffix hereafter and state transition signals are expressed by C followed by suffixes. As seen in FIG. 72 the states progress in one direction and finally come back to $S_0$. Explanation is made for the nature of each state. The state $S_0$ is idling state of this part where all flip-flops HFA, HFB and HFC are in "off" condition sending no output and interrupting, through the effect of AND circuit, clock signal present continuously at the clock input terminal CLC and giving, as a result, no clock signal to shift registers HTA, HTB and HTC and preventing the operation of each register. The clock signal is supplied to every composing part including this part from single clock oscillator. The oscillator can be realized by ordinary pulse generator of constant oscillating frequency.

When this part is in the state $S_0$, which is the initial state of this part, the pulse reporting that present tree structure memorizing part CTM which is situated in front of this part has completed its operation, comes in as the start pulse to this part at start pulse input terminal AMT. Then the part transfers to state $S_A$ by making A state flip-flop HFA "on". Namely, start pulse at AMT constitutes state transition signal $C_{OA}$. Further, as is apparent in FIG. 71, the present tree structure information written in Eq. (21), for example, is read-in in parallel fashion in A shift register HTA through present tree structure input terminal CTP which receives signal from present tree structure memorizing part CTM and through AND circuit connects to the CTP. The fact that AND circuit plays the roll of switch is easily recognized considering that letters are transferred in the shape divided to their composing bits. State $S_A$ following $C_{OA}$ is the state when clock pulse is fed to clock terminal HAL of A shift register HTA through the AND circuit directly right of A state flip-flop HTA, resulting that HTA continuously transfers its memory contents by on memory stage every time clock signal arrives. B shift register HTB and C shift register HTC are in idle condition whereas no clock signal is fed to them. During these operations the instance comes when left edge of meaningful part of memory contents, which is any letter other than the letter "space", of HTA comes on the second output terminal. Then signal other than space appears, for the first time, at the output terminal which has been continuously emitting space signal. At this instance the output of 1 appears at the output terminal of invertor INV which receives output of space detector SPD and the signal makes, as seen in FIG. 71, A state flip-flop HFA "off" and also makes B state flip-flop "on". Apparently the state transition signal $C_{AB}$ in FIG. 72 corresponds to first letter other than space at the terminal of HT2. The aim of AND circuit on the path of signal which makes HFB "on" HFA "off" is to prevent error of operation by making information other than space constituting state transition signal $C_{AB}$ effective only at the state of $S_A$ and also making above information ineffective in states other than $S_A$. These types of error preventing measures are utilized all over the composing component in FIG. 7. $C_{AB}$ transfers the states from $S_A$ to $S_B$. At the state of $S_B$ only B state flip-flop HFB is "on" resulting in the situation that clock signal is fed to A shift register and B shift register through their clock terminals HAL and HBL respectively and that B shift register begins to read-in signal from first output terminal HT1 of A shift register through its input terminal HBT. As reading-in of signal at each shift register begins at the arrival of first clock signal arriving after the transition, the point of gathering of information telling the appearance of signal other than space, is chosen to the second output terminal HT2 and not first output terminal HT1 of A shift register HTA to prevent drop-out of signal. The state $S_B$ is the one where signal from A shift register comes into B shift register which memorizes handled tree structure. At the state $S_B$, left parenthesis detector LPD, right parenthesis detector RPD, up-down counter UDC and unit detector UDT as a whole are counting number of parentheses, appearing at the first output terminal HT1 of A shift register, doing the operation of counting-up when left parenthesis "(" appears and counting-down when right parenthesis ")" appears. UDT emits 1 when left parenthesis "(" has been counted by one count more than right parenthesis ")". When right parenthesis ")" and space appear at first output terminal HT1 of A shift register and second output terminal HT2 respectively during the period when UDC is emitting 1, B state flip-flop HFB is made "off" and C state flip-flop HFC is made "on" through the operation of space detector SPD and right parenthesis detector RPD and succeeding AND circuit shown in FIG. 71. As a result state is tranferred from $S_B$ to $S_C$. Namely the state transition signal $C_{BC}$ in FIG. 72 corresponds to the condition where right parenthesis, space and 1 are appearing at HT1, HT2 and output terminal of up-down counter UDC.

At the state $S_C$, clock is fed to A shift register HTA and C shift register HTC and HTA output is being read-in into HTC which is shift register for "not handled tree". The situation is easily recognized at FIG. 71. During above operation, the instance when all information in A shift register go out making HTA empty, comes. Then each output of composing part of space detector group SPG connected to corresponding stage in HTA becomes 1 making output of AND circuit following SPG also 1. This last signal makes C state flip-flop "off" and consequently makes all state flip-flops "off" changing states from $S_C$ to $S_O$. The state transition signal $C_{CO}$ is information of emptiness in A shift register HTA. The state $S_0$ is the state when all composing part in FIG. 71 is in stop or idle condition. The signal corresponding to $C_{CO}$ and making C state register "off" is sent to next components which are handled tree structure memorizing part HTM and not handled tree structure memorizing part NHM. At this timing, this part sends to outer circuits the information of handled tree structure memorized in B shift register HTB and the information of not handled tree structure through formerly mentioned handled tree structure output terminal HHT and not handled tree structure output terminal HNT respectively.

The description of treatment of Eq.(21) when Eq.(21) is input signal of this part or handled tree structure deciding part, is as follows. The row of letters in Eq.(22) expressing a tree structure is read-in in parallel fashion to A shift register HTA at the instance of transition of states from $S_0$ to $S_A$ through the effect of $C_{OA}$. The row of letters in Eq.(21) which is read-in, continuously traverses, during the states $S_A$, $S_B$ and $S_C$ to the left in HTA every time clock pulse arrives and is erased from memory contents of HTA, through the leftest memory stage of HTA corresponding to first output terminal HT1 of HTA, by piecewise fashion from the leftest remaining letter. To explain the situation, letters in Eq.(21) with indication, under the letters, expressing the state of this handled tree structure deciding part HTD when corresponding letter is at the stage of HT1. The result is Eq.(23).

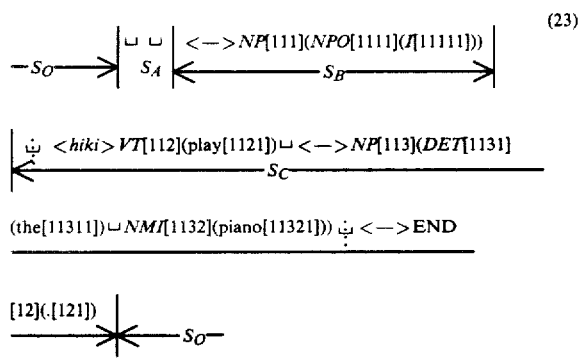

(23)

As output of A shift register HTA is accommodated in B shift register HTB during the state of $S_B$, the component of letters in Eq.(23) corresponding to the indication of state $S_B$ enters in B shift register and finally sent to handled tree structure memorizing part HTM and the component corresponding to the indication of state $S_C$ enters to C shift register HTC and finally sent to not handled tree structure memorizing part NHM. As seen before, the effect of state transition in response to state transition signal does not appear until the next clock pulse after the state transition and accordingly the border of states are laid between state transition signal and next signal. Above explanation is for the operation of handled tree structure deciding part HTD.

Next the separating part IHP is dealt with. The typical operation of this part is expressed as follows. IHP obtains the tree structure in FIG. 50 from the output of handled tree structure memorizing part HTM and sends the instruction and handled tree structure deprived of instruction shown in FIG. 52 to output deciding part SDS and tree structure memorizing part IET respectively. When this part is realized by electronic circuit, input to separating part IHP, output to output deciding part SDS and output to tree structure memorizing part IET can be written as is Eq.(24), (25) and (26) respectively.

$$<hiki> VT[112](play[1121])  \quad (24)$$

$$<hiki>  \quad (25)$$

$$VT[112](play[1121])  \quad (26)$$

The circuit to do the operation has almost the same configuration with handled tree structure deciding part HTD and has also four states. The only difference consists of the fact that state transition signal $C_{BC}$ for the state transition from $S_B$ to $S_C$ becomes to be appearance of right angle parenthesis ">" at first output terminal HT1 of A shift register HTA instead of appearance of right parenthesis ")" and space at first output terminal HT1 and second output terminal HT2 respectively in the case of HTD. So the detailed explanation for this part is abbreviated. At the separating part IHP, the instruction output to output deciding part SDS is obtained from the part corresponding to B shift register HTB and output to tree structure memorizing part IET is obtained from the part corresponding to C shift register HTC.

Next the part of partial pattern finding part PPD is dealt with. FIG. 73 is the circuit for the part constituted by electronic circuit. PPD has four input terminals which are clock input terminal CLC, tree structure input terminal PPT receiving signal from tree structure memorizing part IET, pattern dictionary information input terminal PTT receiving information from pattern dictionary PTD and start pulse input terminal PST which receives start pulse telling that the operation of tree structure memorizing part IET has been completed and indicating the start of operation in this part of PPD. PPD has four output terminals. They are completion pulse output terminal SCT receiving completion pulse which expresses success of comparison and indicates reading-in of dictionary contents to pattern memorizing part MPM, dictionary contents output terminal PTS which sends out, unaltered, the signal coming in from pattern dictionary information input terminal PTT, help signal output terminal HLT which emits help signal to stop all the circuits in the mechanical translation system in FIG. 7 and requests intervention of man at the occasion of failure in finding comparison pattern and dictionary scanning information output terminal DST which emits, to pattern dictionary PTD, dictionary scanning information requesting the term next to the term emitted presently at pattern dictionary PTD.

As pattern dictionary PTD can be realized by, for example, shift registers or ROM's (read only memory) or magnetic tapes with apparatuses to memorize presently emitted output, the realization method is not explained here. The pattern dictionary PTD must be designed to give its output continuously to this part through pattern dictionary information input terminal PTT. PTD does also the operation of beginning to emit the term next to the term formerly emitted when output appears at the dictionary scanning information output terminal DST. At the end of registered terms in pattern dictionary PTD, plural of "z" which is the last letter of alphabet is written and when comparison is not concluded after scanning dictionary to this term, this part generates help signal at help signal output terminal HLT.

Following is description of composing elements in partial pattern finding part PPD concentrating on elements which have not been explained before. PPA and PPB are A shift register and B shift register respectively among which PPA memorizes output of pattern dictionary PTD and PPB memorizes output of tree structure memorizing part IET which is tree structure to be compared. PPA and PPB, as shown in FIG. 73, can read-in signals, simultaneously, to their all memorizing stages. Output terminal of PPA is first output terminal PA1 and output terminal of PPB are first output terminal PB1 and second output terminal PB2. Clock terminals of PPA and PPB are PAL and PBL respectively. AZD is $A_0$ detector emitting 1 when it detects letter $A_0$. LLD and RLD are left large parenthesis detector and right large parenthesis detector respectively and they generate 1 when corresponding letters are detected. CSD is coincidence detector which emits 1 when signals coming in to its two input terminals are identical. ZDG is z detector group consisting of a plurality of z detectors of the same number with the number of the stages in A shift register PPA. It operates in accordance with AND circuit which follows it and which emits 1 when output signals of all stages of PPA are z's. PFA, PFB, PFC, PFD and PFE are flip-flops corresponding to the states having names of the last letters in the name of above flip-flops. For example PFA is A state flip-flop. The condition when each of the flip-flops becomes "on" is explained formerly. This part has states $S_A$, $S_B$, $S_C$, $S_D$ and $S_E$ corresponding to each state flip-flops and $S_0$ corresponding to the condition in which all the flip-flops are "off". ZDT is 0 detector emitting 1 when up-down counter is counting 0. The terminal denoted by RST situated in up-down counter UDC is reset terminal receiving signal to reset the counter.

Figure 74:
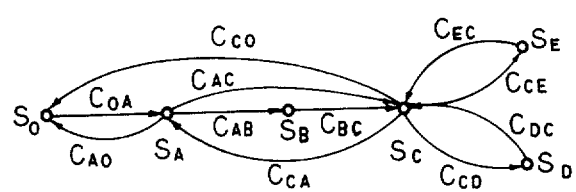
FIG. 74 is state diagram of partial pattern finding part PPD.

As the presentation of composing element in FIG. 73 is concluded, the explanation for the operation of partial pattern finding part PPD as a whole will be done next. The state diagram of PPD has the structure shown in FIG. 74. $C_{0A}$ is signal constituted with completion pulse showing the completion of operation in tree structure memorizing part IET, coming in as start pulse of this part, at the start pulse input terminal PST. At the instance of this pulse A state flip-flop PFA becomes "on", and moreover, dictionary contents and tree structure to be compared with are read-in through pattern dictionary information input terminal PTT and tree structure input terminal PPT respectively. These condition can be observed by FIG. 73.

tree, is considered. The S equation of the tree structure in FIG. 18 is as follows.

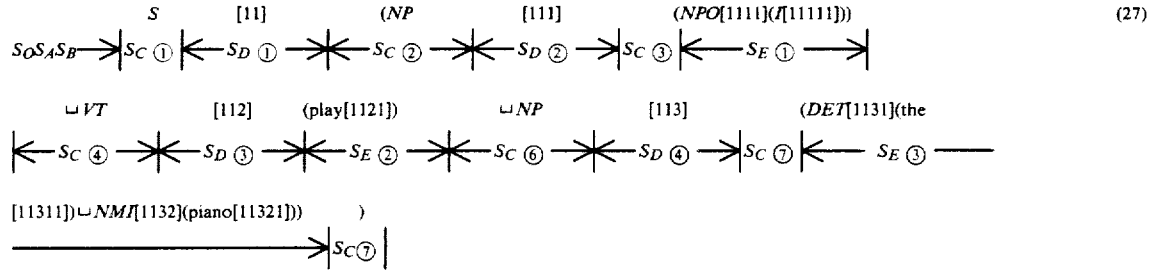

(27)

As the operation is apparent from FIG. 73, only the results are presented now. $C_{A0}$ occurs, as formerly explained, when all stages of A shift register emit z's and as a result help signal is generated at help signal output terminal HLT. $C_{AB}$ occurs when space is emitted at PB1 terminal in B shift register PPB. $C_{AC}$ occurs when, on the contrary, the letter other than space is generated. $C_{BC}$ occurs when a letter other than space comes at PB2 terminal of PPB. $C_{CA}$ occurs when output of PA1 terminal in A shift register PPA and that of PB1 terminal in B shift register PPB is inconsistent and output of PA1 terminal is not $A_0$. At the occasion, output appears at dictionary scanning information output terminal DST and pattern dictionary PTD is directed to emit the next term and, moreover, re-reading-in of tree structure and reading-in of new dictionary term is conducted through tree structure input terminal PPT and pattern dictionary information input terminal PTT respectively. $C_{CD}$ is generated when left large parenthesis "[" occurs at PB2 terminal and $C_{DC}$ occurs when right large parentheses "]" is emitted at PB1 terminal. $C_{CE}$ is the case when $A_0$ is generated at PA1 terminal and then up-down counter UDC is reset. $C_{EC}$ occurs when right parenthesis ")" occurs at PB2 terminal and also up-down counter is emitting 0. $C_{CO}$ is the signal which is generated when A shift register PPA and B shift register PPB become empty telling the success of comparison. At this instance, this part emits completion pulse at completion pulse output terminal SCT.

Following is the operation of this partial pattern finding part PPD at each state. At states $S_A$ through $S_E$, clock pulse is fed to clock terminal PBL of B shift register PPB making this shift register to shift its memory contents to the left by one memory stage every time clock signal arrives. Only at $S_C$ clock is fed to clock terminal PAL of A shift register PPA. $S_0$ is, as mentioned before, idle state of this part. The operation of this part is expressed using an example. The typical operation of PPD is to decide, by piling-up, whether there is any partial pattern selected from terms in pattern dictionary PPD which coincides with output of tree structure memorizing part IET which is, by now, the tree structure in FIG. 18. Now, the case of piling up pattern P-2 shown in FIG. 6(b) to above mentioned The tree structure expressing P-2 in FIG. 6(b), to be registered in pattern dictionary can be written by following Eq.(28) using aforementioned symbol for arbitrarization measures $A_o$.

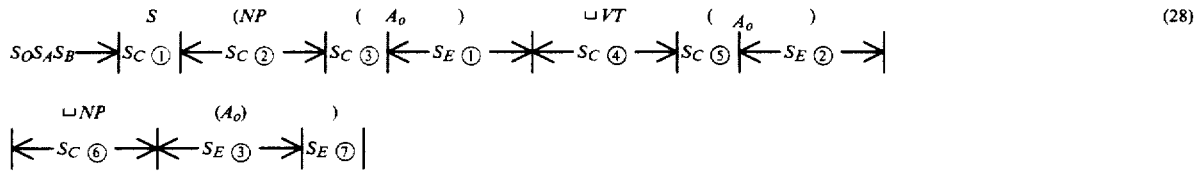

(28)

Figure 75:
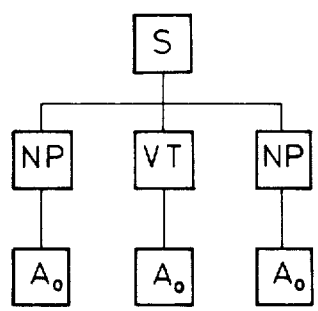
FIG. 75 is the figure of an example of contents in pattern dictionary PTD.

Of course Eq.(28) can be expressed by tree structure in FIG. 75. When start pulse or state transition signal $C_{0A}$ arrives at start pulse input terminal PST, the state of PPD is switched over from $S_0$ to $S_A$. At the case where memory contents of B shift register PPB is not "stuffed to the left" or contents does not begin at the first stage of the register, state transition signal $C_{AB}$ occurs immediately afterword and the state is transferred to state $S_B$ and B shift register PPB begins to shift its memory contents or row of letters shown in Eq.(27) to the left. At the explanation for later operation the description for state transition is almost omitted. The state changes over to $S_C$ when the left-most letter S in FIG. 27 arrives at PB2 terminal at B shift register PPB. At the instance when first clock pulse in state $S_C$ comes, the row of letters expressed in Eq.(27) is memorized in "stuffed to the left" fashion in consequence of the fact that memory contents including the letter S is shifted by one memory stage directly after the state transition. The dictionary registering method in which a term consisting of row of letters like the example of Eq.(28) can be memorized in A shift register PPA, at the occasion of simultaneous input to all stages in PPA, in "stuffed to the left" fashion, must be utilized. The state transfers to $S_D$ after the existence of $S_C$ by only one clock interval, as the consequence of the fact that a letter corresponding to left large parenthesis "[" next to S in Eq.(27) appears at PB2 terminal when first clock pulse after the state transition to $S_D$ comes. At the instance of first clock signal of state S, the part after and including left large parenthesis "[" next to S among the letters in Eq.(27) is memorized in B shift register PPB and the part after and including left parenthesis "(" next to S is memorized in A shift register PPA. During the duration of state $S_D$ in which only B shift register PPB continues to send its memory contents to the left, the instance in which right large parenthesis "]" which is fifth letter in Eq.(27) is generated at PB1 terminal switching the state back to state $S_C$. From this instance on, both of registers PPA and PPB begin to send their memory contents to the left simultaneously.

When left large parenthesis "[" which is ninth letter in Eq.(27) appears at PB2 terminal the state transfers to state $S_D$ and when right large parenthesis "]" which is thirteenth letter appears at PB1, the state comes back to state $S_C$. At the instance when first clock signal of state $S_C$ of this round appears, the fifth letter in Eq.(28) and fourteenth letter in Eq.(27), both of which are left parentheses "(", are appearing at PA1 terminal and PB1 terminal respectively.

$A_o$ in Eq.(28) comes to PA1 terminal at the next clock pulse and state is transferred to state $S_E$ and up-down counter UDC is reset. The condition of occurrence of $C_{EC}$ where right parenthesis ")" comes when up-down counter UDC is counting 0 and 1 is generated at the output of 0 detector, is satisfied when right parenthesis ")" which is seventh letter in Eq.(28) appears at PA1 terminal and right parenthesis ")" which is thirty-second letter in Eq.(27) at PB1 terminal. At the instance of above occasion, state transfers to $S_C$ and both A and B shift registers begin to send their memory contents to the left simultaneously. The initial condition of above state is that first space in both of Eq.(27) and Eq.(28) are appearing at PA1 terminal and PB2 terminal respectively. As explained above, the pattern piling up with arbitrarization measures becomes possible by utilizing arbitrarization symbol $A_o$. By continuing above operation, at the example, the piling up is successfully completed making both registers PPA and PPB empty and sending completion pulse which reports success of comparison, at completion pulse output terminal SCT.

Pattern memorizing part MPM situated "downstream" of this partial pattern finding part PPD, reads-in, at the instance of occurrence of this completion pulse, the output at dictionary contents output terminal PTS of PPD which emits the same signal as the pattern dictionary PTD output and memorizes it in memorizing region in MPM. This operation is made possible because the dictionary term presently dealt with and corresponds to coincident pattern still exists at the instance of completion pulse. To make above reading-in possible, information must take the shape in which the information which should be memorized in each memorizing region in MPM, namely pattern memorizing region MPR, extraction indication memorizing region MER and production rule memorizing region PRT, exists following the registered term written in Eq.(28). As pattern memorizing part MPM can be realized by simple RAM (random access memory), the structure and operation of this part will not be explained here.

Above is the expression for the case of the successful comparison and the situation when the comparison fails, will be treated now. When, at the duration of state $S_C$, the condition that output of terminal PA1 and that of PB1 are not the same and output of PA1 terminal is not $A_o$, the system decides that the piling up comparison has failed and brings the state back to $S_A$. Simultaneously the measures are taken in which the dictionary scanning information occurs at dictionary scanning information output terminal DST indicating to stop emitting presently generated term and to emit next term and operation of reading-in of next term from pattern dictionary PTD and re-reading-in of tree structure to be compared from tree structure memorizing part IET is done. Doing above-mentioned operation this part PPD re-starts its operation. When fail of comparison by piling up is found after the comparison for all terms in dictionary, state transition signal $C_{A0}$ occurs through the effect of the special term in pattern dictionary PTD, with letter "z" in all its constituting columns, and z detector group ZDG and AND circuit following it. As a result, the state is transferred from state $S_A$ which is state of preparation for re-start to state $S_0$ and simultaneously help signal requesting for intervention of operating man is generated at help signal output terminal HLT.

Above is the explanation for composition and operation of partial pattern finding part PPD. PPD sends coincident pattern and accompanying extraction indication and production rule to pattern memorizing part MPM when comparison is successfully made and sends help signal requesting intervention by human hand, when comparison fails. Comments under each letter in Eq. (27) and (28) express the states of this system when corresponding letters are appearing at PA1 and PB1 respectively. For the case when the same state is repeatedly taken, the number of repetitions is indicated by numbers in circles. It will be found from these equations that state $S_D$ is the state for exception of large parenthesis and its contents from piling up operation and state $S_E$ is the state for arbitrarization symbol $A_o$.

Figure 76A:
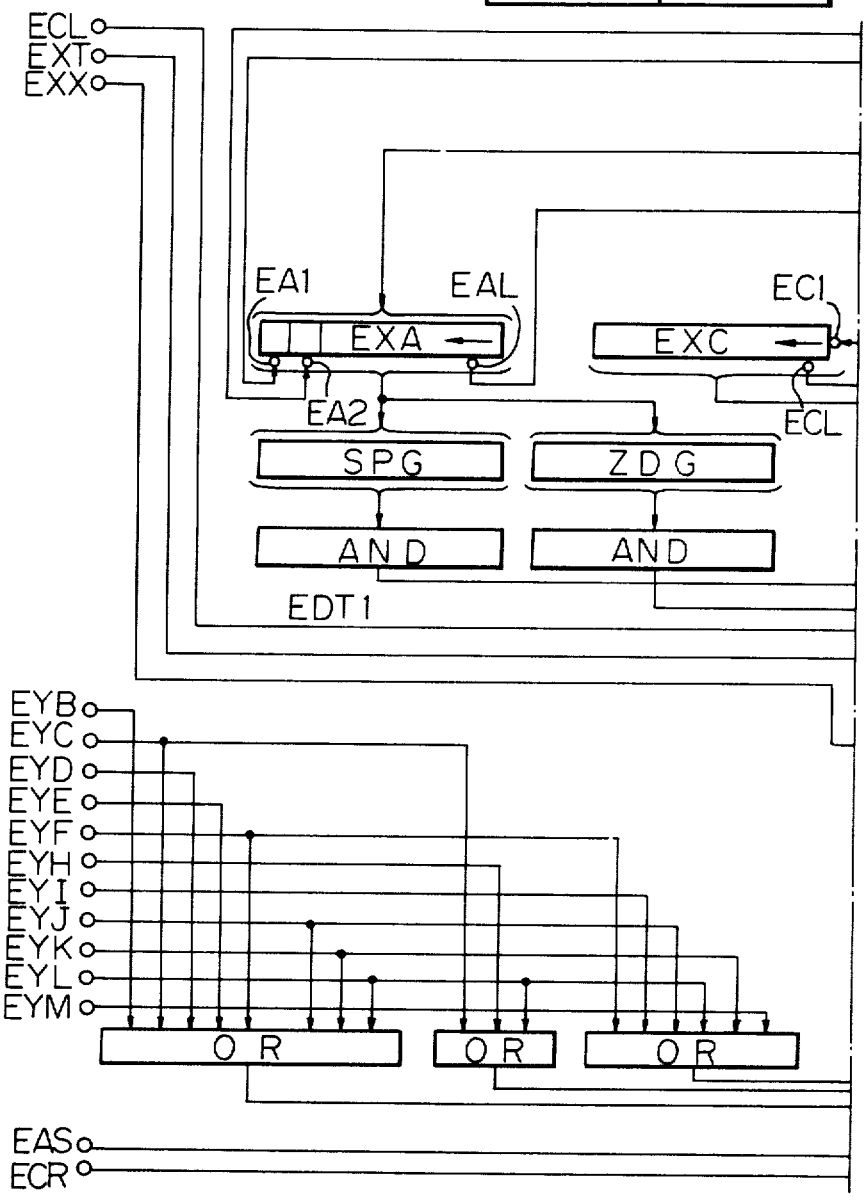
FIG. 76 if figure of a portion of extraction generating part EXG realized by electronic circuit.
Figure 76B:
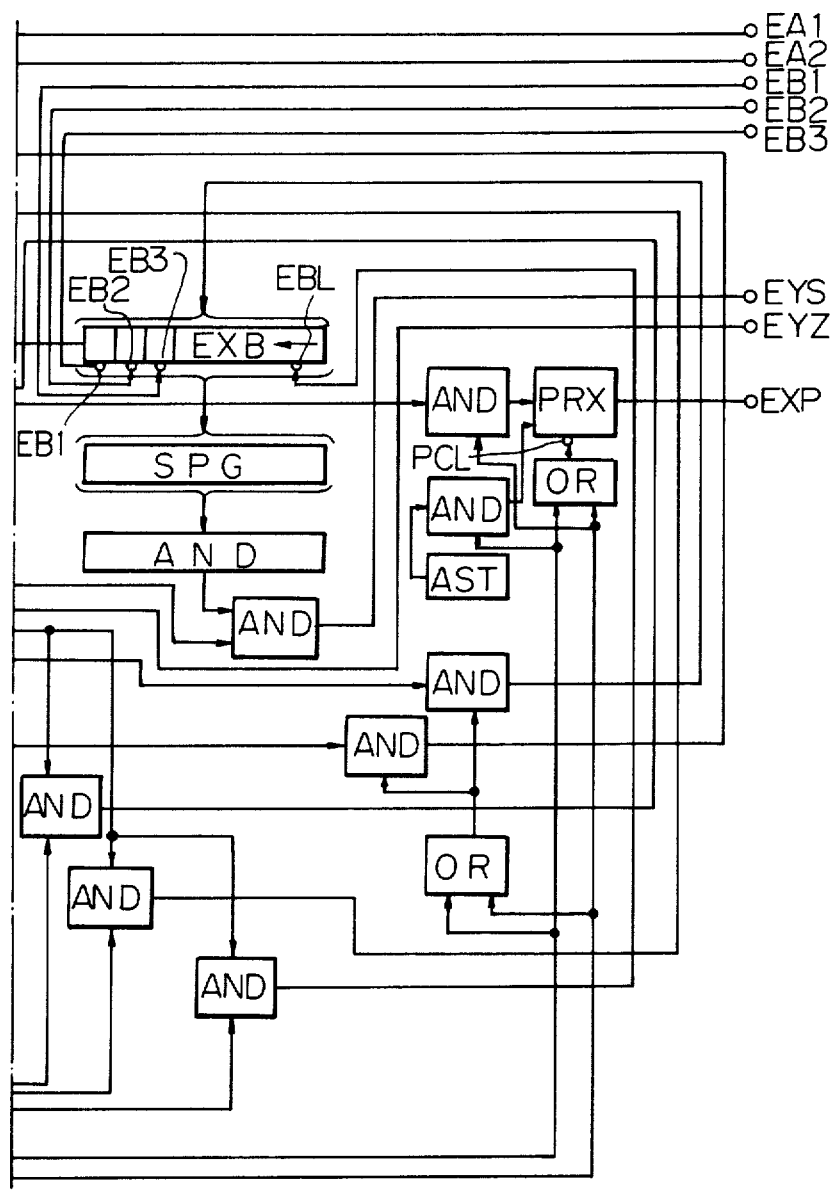
Figure 77B:
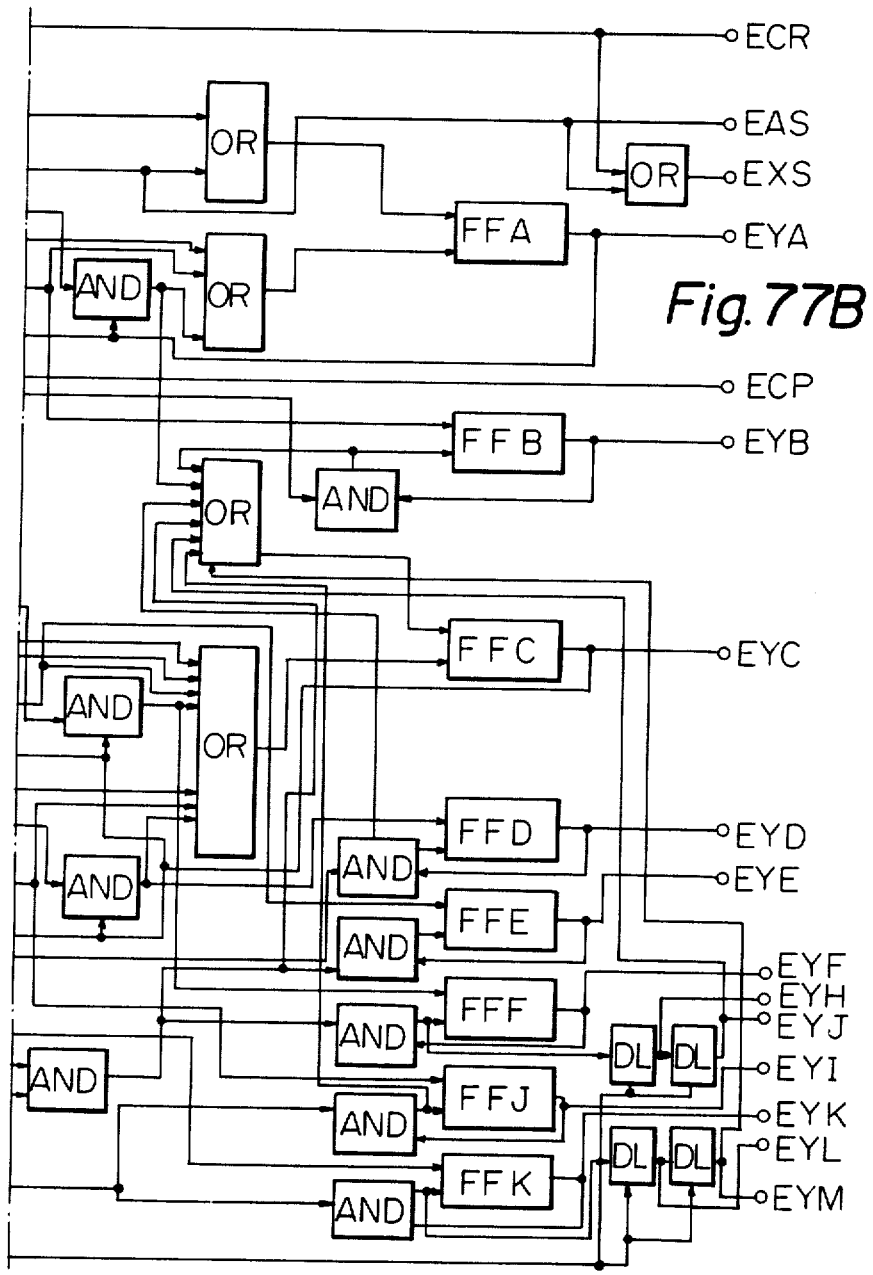

Next, composition method by electronic circuit and operation of extraction generating part EXG is treated. This part somewhat resembles partial pattern finding part PPD but is a little complicated. FIGS. 76 and 77 show its composition. As the structure is complicated, it is expressed by two figures.

The input terminals receiving signals from outer circuits situated at this part are clock input terminal ECL, tree structure input terminal EXT receiving signal from tree structure memorizing part IET, extraction indication input terminal EXX and start pulse input terminal EST receiving start pulse of this part which is also completion pulse of partial pattern finding part PPD. The output terminals of this part are completion pulse output terminal ECP generating completion pulse which shows that operation in this part has completed, output terminal EXP which generates the output of this part EXG to output deciding part SDS, next information requesting output terminal EXS which sends signal, to extraction indication memorizing region, for the purpose of requesting next information requesting signal to request information next to the one being generated. Extraction indication memorizing region MER mentioned before as realized by RAM (random access memory) is composed by shift-register-like circuit which is clocked by one stage at the arrival of next information requesting signal and sends extraction indication information next to the presently generated one.

As the figure for this part is divided in two parts, connecting terminals between FIG. 76 and FIG. 77 is introduced. EYA, EYB, EYC, EYD, EYE, EYF, EYH, EYI, EYJ, EYK, EYL and EYM generate 1 when extraction generating part EXG takes the states of $S_A$, $S_B$, $S_C$, $S_D$, $S_E$, $S_F$, $S_H$, $S_I$, $S_J$, $S_K$, $S_L$ and $S_M$ respectively and 0 otherwise. Among above terminals for respective states, EYA, for example, is called A state connecting terminal. EAS and ECR are parts at which pulse is generated when operation for single extraction indication ends. EAS, among them, is no coincidence connecting terminal which generates no coincidence pulse when comparison fails and ECR, among them, is coincidence connecting terminal which generates coincidence pulse when comparison succeeds. EYS and EYZ are space state connecting terminal and z state connecting terminal respectively and transmit information that all stages in A shift register EXA (described later) are memorizing space and that all stages in B shift register EXB (described later) are memorizing z respectively. EA1 and EA2 are first and second A shift register connecting terminals dealing with signals from first and second output terminal of A shift register EXA respectively. Similarly EB1, EB2, EB3 are similar connecting terminals concerning B shift register and, for example, EB1 is first B register connecting terminal. In FIG. 76 EXA is A shift register and memorizes extraction indication information. EXB is B shift register and memorizes output signal from tree structure memorizing part IET. EXC is C shift register memorizing extraction indication information to be sent outside. A shift register EXA has single input terminals which are clock terminal EAL, first and second output terminals EA1 and EA2, except for the measures for simultaneous reading-in. Similarly B shift register EXB has clock terminal EBL and first, second and third output terminals EB1, EB2 and EB3. C shift register EXC has clock terminal ECL and input terminal EC1. Connecting terminals concerning A and B registers are of the same name as corresponding output terminals concerning A and B registers because of the fact that they denote the same position. Table arranging part PRX arranges information emerged from this part EXG to a table to make decision at output deciding part SDS easier and has the function to shift by one address every time a pulse comes at shifting pulse input terminal PCL which is one of the input terminals of PRX. This part can be realized by shift-register-like circuit. AST in the figure is asterisk generator which generates the symbol of asterisk "*". Now the parts in FIG. 77 are explained. FFA, FFB, FFC, FFD, FFE, FFF, FFJ and FFK are flip-flops which become "on" at the states $S_A$, $S_B$, $S_C$, $S_D$, $S_E$, $S_F$, $S_J$ and $S_K$ respectively and have names of corresponding states. For example FFA is A state flip-flop. The parts denoted by DL are delay elements of one clock time interval and, for this purpose, each DL receives clock signal. Among newly introduced detectors, AUD is upper A detector which detects $A^o$ and EZD is E detector which detects $E_o$ and EUD is upper E detector which detects $E^o$, all of which emits 1 when corresponding letter or symbol is detected. Above is explanation of composing parts in extraction generating part EXG and following is the operation as a whole.

Figure 78:
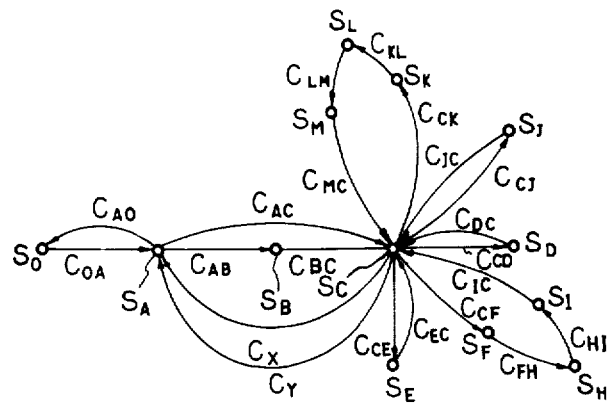
FIG. 78 is state diagram of extraction generating part EXG.

FIG. 78 is the state diagram of extraction generating part EXG. First, state translation signal will be explained concerning the figure. It is formerly expressed that $C_{OA}$ is start pulse of EXG and it comes in through start pulse input terminal EST. $C_{A0}$ occurs when extraction indications in extraction indication memorizing region MER is all scanned out and pseud-information which is constituted with all z memorized at the last position of extraction indications, is detected at z detector group ZDG and AND circuit connected to it. At this instance EXG emits completion pulse at completion pulse output terminal ECP. $C_{AB}$ corresponds to space symbol generated at EB1 terminal of B shift register EXB. $C_{BC}$ is symbol or letter other than space occurred at EB2 terminal in B shift register EXB. $C_{AC}$ is letter other than space at EB1 terminal. $C_{CD}$ is left large parenthesis "[" generated at EB2 terminal and $C_{DC}$ is right large parenthesis "]" generated at EB1 terminal. $C_{CE}$ is signal of $A_o$ generated at EA1 terminal of A shift register EXA. $C_{EC}$ occurs when right parenthesis ")" occurs during the period when up-down counter is counting 0. $C_{CF}$ occurs when $A^o$ signal appears at EA2 terminal. $C_{FH}$ is the same signal with $C_{EC}$ and $C_{HI}$ is generated automatically by delay element DL one clock interval after the end of state $S_F$. $C_{IC}$ is generated also automatically one clock interval after the end of state $S_H$ or two clock interval after the end of state $S_F$. $C_{CJ}$ occurs when $E_o$ appears at EA1 terminal and $C_{JC}$ occurs when left large parenthesis "[" occurs at EB3 terminal. $C_{CK}$ is generated when $E^o$ appears at EA2 terminal. $C_{KL}$ occurs when left large parenthesis "[" is generated at EB3 terminal and $C_{LM}$, by the aid of delay element DL, occurs one clock interval after the end of state $S_K$ and similarly $C_{MC}$ occurs one clock interval after the end of state $S_L$. There are two paths directing from state $S_C$ to state $S_A$ and state transition signal corresponding one of them is $C_X$ which appears when comparison coincidence is made and, concretely speaking, appears as pulse at coincidence connecting terminal ECR resulted from signal appearing at space state connecting terminal EYS. The other path results from state transition signal $C_Y$ caused by the inconsistence between EA1 output and EB1 output. $C_Y$ corresponds to a pulse at no coincidence connecting terminal EAS. By either of the above conditions, namely pulse occurrence at either of ECR and EAS terminals, pulse is generated at next information requesting output terminal EXS to request information of next term from extraction indication memorizing region MER. By the pulse at EXS terminal, re-reading-in of output from tree structure memorizing part IET and reading-in of extraction indication from MER are conducted. At either of the above cases, table arranging part progresses its address and prepares for extraction information generated by next extraction indication. Corresponding to the case of consistence accompanying a pulse at coincidence connecting terminal ECR, among above two cases, memory contents of C shift register is read-in in table arranging part PRX. Corresponding to the case of inconsistence accompanying a pulse at no coincidence connecting terminal EAS, asterick symbol "*" from output terminal of asterisk generator AST is read-in into PRX. Above is the explanation for state transition signal and following is the expression of operation of this extraction generating part EXG during each state of it.

At the state of $S_0$ no clock pulse is fed to all the shift registers in EXG and so EXG is in idle condition. It is in idle condition also at state $S_A$. This state is one in which EXG is waiting for the next operation after the conclusion of a unit of operation corresponding to an extraction indication. In state $S_B$ clock signal is fed only to B shift register EXB. In state $S_C$ clock pulse is fed to both of A shift register EXA and B shift register EXB and coincidence between output signals from both shift registers is being detected. State $S_D$ is the state where clock pulse is fed only to B shift register. State $S_E$ corresponds to occurrence of $A_o$, where clock pulse is fed to EXB. State $S_F$ corresponds to occurrence of $A^o$ and clock pulse is fed to B shift register EXB and C shift register EXC. In the state of $S_H$, clock pulse is fed to all of A, B and C shift registers. State $S_I$ is the state in which clock signal is fed only once to C shift register EXC to add one space at the left of memory contents of C shift register EXC. State $S_J$ corresponds to occurrence of $E_o$ and clock pulse is fed to B shift register EXB.

State $S_K$ is to cope with $E^o$ and clock pulse is fed to B shift register EXB and C shift register EXC. State $S_L$ is the after processing state of the state $S_K$ and clock pulse is fed only once to all the A, B and C shift registers. State $S_M$ is to add space at memory contents in C shift register EXC and clock pulse is fed once to C shift register EXC.

Above is explanation for state transition signal and also operation of each state. Next, the operation of EXG is explained using an example. The example used here is the case where the tree structure input coming in at tree structure input terminal EXT and coming from tree structure memorizing part IET is chosen to be row of letters or S equation corresponding to tree structure in FIG. 18 and extraction indication information coming in at extraction indication input terminal EXX of EXG and coming from extraction indication memorizing region MER is chosen to be tree structures corresponding to these of FIG. 19(b) and (a). The S equation corresponding to tree structure in FIG. 18 is shown in following Eq. (29) and S equation corresponding to FIGS. 19(b), 19(a) is shown in Eq. (30) and (31) respectively.

$$S[11](NP[111](NPO[1111](I[11111]))\sqcup VT[112] \quad (29)$$

$$(play[1121])\sqcup NP[113](DET[1131](the[11311]$$

$$\sqcup NMI[1132](piano[11321])))$$

$$S(NP(A_o)\sqcup VT(E^o)NP(DET(E_o)\sqcup E^o(E_o))) \quad (30)$$

$$S(NP(A_o)\sqcup VT(E^o)\sqcup NP(E^o(E_o))) \quad (31)$$

S equation in Eq. (29) is introduced to B shift register EXB and S equation in Eq. (30) or Eq. (31) is introduced to A shift register EXA. After the operation, output signals of both shift registers are compared and the result of inspection measures, according to necessity, is introduced to C shift register EXC. The processing process for the pair of FIG. 18 and FIG. 19(b) or the pair of Eq. (20) and Eq. (30) and that for the pair of FIG. 18 and FIG. 19(a) or Eq. (29) and Eq. (31) are shown in Eq. (32) and Eq. (33) respectively.

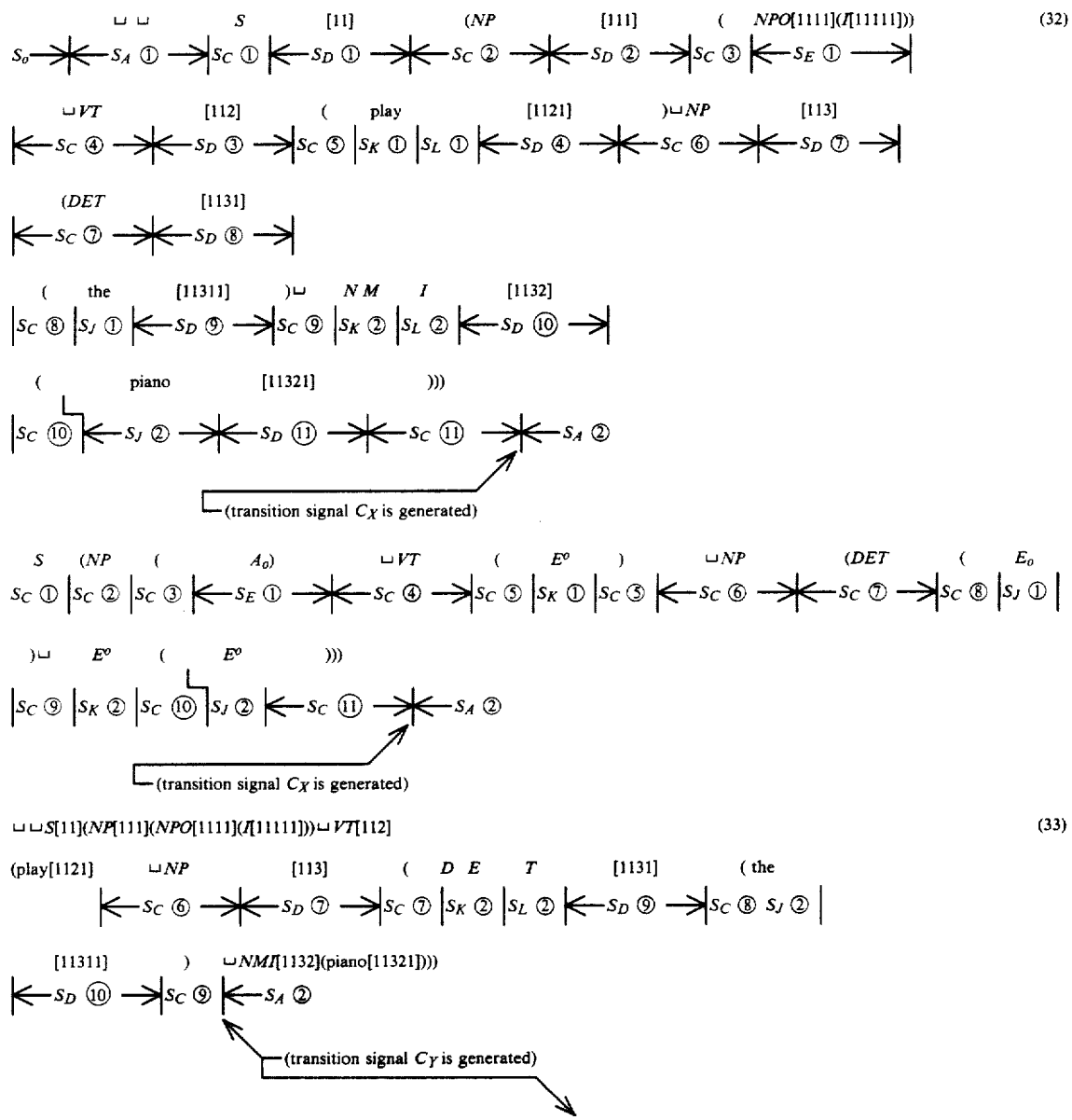

-continued $$S(NP(A_o) \sqcup VT(E^o)) \quad \sqcup NP \quad ( \quad E^o \quad ( \quad E_o \quad ) \quad ))$$

$$\overset{\longleftarrow}{S_C} \circledS \quad \overset{\longrightarrow}{S_C} \circledT \quad \big| S_K \circledZ \quad \big| S_C \circledS \quad \big| S_J \circledZ \quad \big| S_C \circledNine \quad \overset{\longleftarrow}{} S_A \circledZ$$

Under the letters in the equation which is the S equation for the tree structure introduced in B shift register EXB and which is written at the upper side in Eq. (32), states of EXG at the time when corresponding letter in above equation appears, shifted to the left in EXB, at the first output terminal EA1 as the output signal, are added. Similarly under the letters in the equation which is S equation of extraction indication introduced to A shift register EXA and which is written at lower side in Eq. (32), states of EXG at the time when corresponding letter in above equation, sent to the left in EXA, appears at the first output terminal EA1, are added. The numbers in the circles show the time in which corresponding states are taken. It is apparent from explanation of above mentioned state transition signals and states taken by EXG, that at the state of $S_F$ and $S_K$ when $A^o$ and $E^o$ are appearing at first output terminal EA1 of A shift register, EXG does the arbitrarization measures and inspection measures consisting of reading-in the contents of B shift register into C shift register and that EXG does arbitrarization measures when $A_o$ and $E_o$ are appearing at the same terminal. As for the case of Eq. (32), state transition signal $C_X$ is generated finally as a result of above-mentioned operations showing that comparison is successfully completed and following Eq. (34) is memorized at table arranging part PRX.

$$\text{play} \sqcup \text{NMI} \tag{34}$$

As for the case of Eq. (33), state transition signal $C_Y$ is generated as a result of the fact that a space is generated at EB1 terminal directly afterward of the state $S_C\circledNine$ and, moreover, right parenthesis ")" is generated at EA1 terminal, resulting in inconsistency and asterisk "*" is memorized in table arranging part PRX. The description of states which are common with these in Eq. (32) is largely abbreviated in Eq. (33) to avoid complication in expression. Above is explanation of piling-up operation accompanying with arbitrarization measures and inspection measures, which constitutes major part of this invention, through the expression for the operation of this part, EXG. Example of composition of EXG in FIGS. 76 and 77 corresponds to the treatment method in which only the case where right parenthesis ")" must be situated after $A_o$ or $A^o$, is treated or, in other words, the case where treatment is only done for lower portion from certain designated coincident part, as shown in FIG. 19, is treated. If output "play" must be obtained by piling up extraction indication in FIG. 22 on tree structure in FIG. 18, the state transition signals concerning with completion of state $S_E$ or $S_F$ must be changed from occurrence of right parenthesis ")" at EB3 terminal to consistency of row of letters at EA2, EA3—outputs and at EB2, EB3—outputs. The composition to cope with this case is abbreviated here to avoid complexity. Of course EAi and EBi (i is some integer) are i'th output terminals of A shift register EXA and B shift register EXB respectively.

Above is description for extraction generating part EXG and, now, output deciding part SDS will be treated. To output deciding part SDS, tables such as Table 1 to Table 10 are introduced from separating part IHP, and also instruction information and extraction information are introduced from formerly mentioned extraction generating part EXG and from table arranging part PRX in FIG. 76 respectively. Arrangement in left side of input part of each table of production rule can be obtained by attaching extraction rule information arranged at PRX in EXG after the instruction information from IHP. This part or SDS takes coincidence of thus obtained arrangement, dealt with as a word, and each line in the table expressing production rule and finds coincident line and finally emits instruction to lower layer and object language pattern. As above operation can be realized by a coincidence detection circuit, the composition and operation of SDS is abbreviated.

Here the part named as node number dealing part NMH which is composed by synthesizing node number affixing part NMP and node number processing part NNH, is treated. The circuit of NMH is shown in FIG. 79. Input terminals of the part connected to outer circuits, are clock input terminal CLC, tree structure input terminal NMT receiving signal from tree structure memorizing part IET, pattern input terminal MPT receiving coincident pattern from pattern memorizing region MPR, start pulse input terminal NST receiving completion signal of pattern memorizing part MPM which is situated "upstream" of this part, dealt with as start pulse in this part. The output terminals of this part or node number dealing part NMH are node number arrangement output terminal NMS which emits node number arrangement constituting output signal of this part and completion pulse output terminal NCT to express that operation of this part is completed. This part NMH has also three shift registers, namely A shift register NMA which accommodates pattern information from pattern input terminal MPT, B shift register NMB which accommodates tree structure from tree structure input terminal and C shift register to store information to emit. A shift register NMA has output terminal NA2 which corresponds to the stage directly right from left-most stage and clock terminal NAL together with input measures by simultaneous read-in to all stages. B shift register has output terminals NB1 and NB2, clock terminal NBL together with measures for simultaneous read-in and out to and from all stages. C shift register has clock terminal NCL aside from measures for simultaneous read-out from all stages and also input terminal CIN. The input terminal CIN is, as explained before, input terminal of right-most stage at the shift register. The up-down counter UDC has reset terminal RSC. NFA, NFB, NFC and MFE are state flip-flops and of course, for example, NFA is called as A state flip-flop.

The composition and operation of the circuit in FIG. 79 will be explained here using FIG. 80 which is state diagram of this part concentrating on state transition signal and operation in each state. As the detail of operation at each composing part can be understood by tracing FIG. 79, it will be curtailed here to avoid complication. Further this method is used hereafter in the explanation of other composing parts for the same reason.

Figure 80:
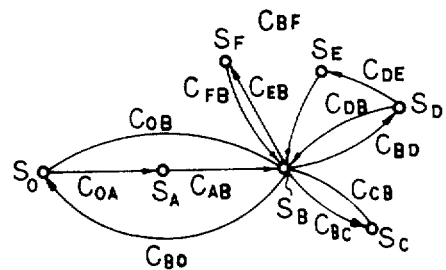
FIG. 80 is state diagram of node number dealing part NMH.

As shown in FIG. 80, this part has seven states including idle state $S_0$. The transition signals connecting them are shown also in the figure. Following is the explanation for state transition signals. $C_{AB}$ occurs when start pulse arrives at start pulse input terminal NST and NB1 terminal of B shift register NMB emits space, and then simultaneously, coincident pattern input is read-in into A shift register NMA through pattern input terminal NPT and also output of tree structure memorizing part IET is read-in into B shift register NMB through tree structure input terminal NMT. State transition signal $C_{OB}$ corresponds the case where NB1 output is space at the instance when start pulse comes and simultaneous reading-in to A and B shift registers is also conducted. State transition signal $C_{OA}$ corresponds to the case where signal other than space occurs at EB2 terminal. $C_{B0}$ appears when B shift register NMB becomes empty and completion pulse which reports that node number dealing part NMH has completed its operation, is generated at completion pulse output terminal NCT. $C_{BC}$ occurs when letter other than left large parenthesis "[" occurs at NA2 terminal and left large parenthesis "]" occurs at NB2 terminal. $C_{CB}$ corresponds to the situation of appearance of right large parenthesis "]" at NB1 terminal. $C_{BD}$ corresponds to occurrence of left large parenthesis "[" at both NA2 and NB2 terminals. $C_{DB}$ corresponds to occurrence of right large parenthesis "]" and letter other than left parenthesis "(" at NB1 and NB2 respectively. $C_{DE}$ occurs when right large parenthesis "]" is generated at NB1 terminal and left parenthesis "(" is generated at NB2 terminal and simultaneous with above state transition signals, up-down counter UDC is reset. State transition signal $C_{EB}$ is generated when right parenthesis ")" appears at NB2 terminal during the period up-down counter UDC is counting 1. $C_{BF}$ corresponds to the situation where right large parenthesis "]" and left large parenthesis "[" are generated at NA1 and NB2 terminals respectively. $C_{FB}$ is the case when right large parenthesis "]" is generated at NB1 terminal.

Next, the operation of node number dealing part NMH at the states $S_A$ through $S_E$ is shown. In state $S_0$ all flip-flops are "off" and this part is in idle condition. In state $S_A$, clock pulse is fed only to B shift register for the purpose of stuffing meaningful (not space) information to the left in the memory contents of B shift register NMB, when there is space at the left side of the meaningful information. State $S_B$ corresponds to the condition that memory contents at the first output terminals of both of A and B shift registers are the same and clock pulse is sent to both of A and B shift registers. In state $S_C$ clock pulse is supplied only to B shift register NMB. At state $S_D$, clock pulse is fed to both of B shift register NMB and C shift register NMC and, at the state, memory contents in B shift register NMB is conveyed to C shift register NMC. In state $S_E$ clock pulse is fed only to B shift register NMB.

As before, the operation of node number dealing part NMH is explained by the use of typical example. S equation of tree structure in FIG. 18 is shown here again.

$$S[11](NP[111](NPO[1111](I[11111]))\sqcup VT[112](play \quad (35)$$
$$[1121])\sqcup NP[113](DET[1131](the[11311])\sqcup NMI[1132]$$
$$(piano[11321])))$$

The S equation corresponding to coincident partial pattern in FIG. 6(b) is expressed by S equation as in following Eq. (36).

$$S(NP\sqcup VT\sqcup NP) \quad (36)$$

Nevertheless, some modification for S equation in which left large parenthesis "[" and right large parenthesis "]" are attached after the nodes which are designed to request node numbers, must be introduced. When the modification is applied to Eq. (36), following Eq. (37) is obtained which becomes memory contents of pattern memorizing region MPR.

$$S](NP[\sqcup VT[\sqcup NP[) \quad (37)$$

Right large parenthesis "]" in Eq. (37) requires that state must be transferred from $S_B$ to $S_F$ and requires also that node number corresponding to the node directly left of the right large parenthesis "]" in Eq. (37) is introduced to C shift register NMC and, furthermore, requires that state goes back again to $S_B$. Left large parenthesis requires that state must be transferred from $S_B$ to $S_D$ and requires also that node number corresponding to the node left of the left large parenthesis "[" is introduced to C shift register NMC and, furthermore, requires that row of letters corresponding to the part of nodes lower than above mentioned node in tree structure must be skipped at reading. In following Eq. (38), the situation of NMH, when row of letters expressed in Eq. (35) and Eq. (37) is introduced to NMB and NMA respectively at the beginning of operation at NMH, is expressed.

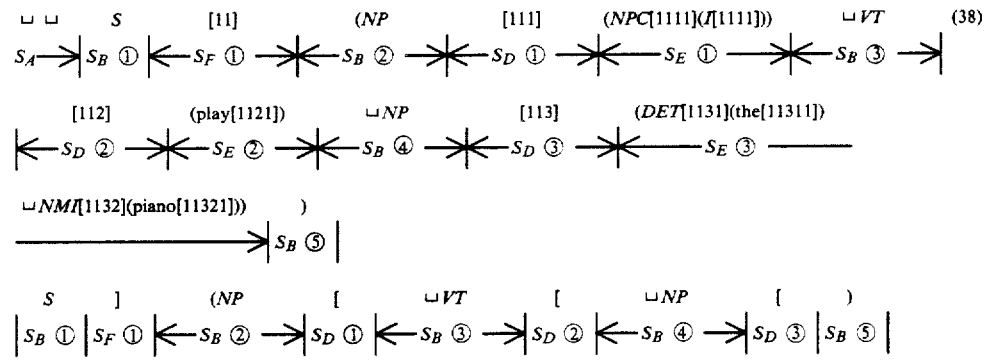

Upper equation in Eq. (38) shows the contents of NMB with comments on the states of this part NMH when each corresponding letter is sent to the left and is situated at NB1 terminal. Lower equation in Eq. (38) is contents of NMA and situation of NMH when corresponding letter is at NA1 terminal. As input terminal CIN of C shift register NMC is directly connected to the first output terminal NB1 of B shift register NMB which memorizes Eq. (35) or upper equation in Eq. (39), memory contents of NMC, after completion of operation at the node number dealing part NMH, becomes to be that in following Eq. (39) as a result of the fact that letters corresponding to state $S_D$ and state $S_F$ flows into NMC from NMB.

$$[11][111][112][113] \tag{39}$$

The output of this part composed of Eq. (39) corresponds to FIG. 24. This equation corresponds to the structure in which node number in source language is arranged according to structure order and hence, as expected, this part NMH operates as the cascade connection of node number affixing part NMP and node number processing part NNH both in FIG. 7.

Figure 81B:
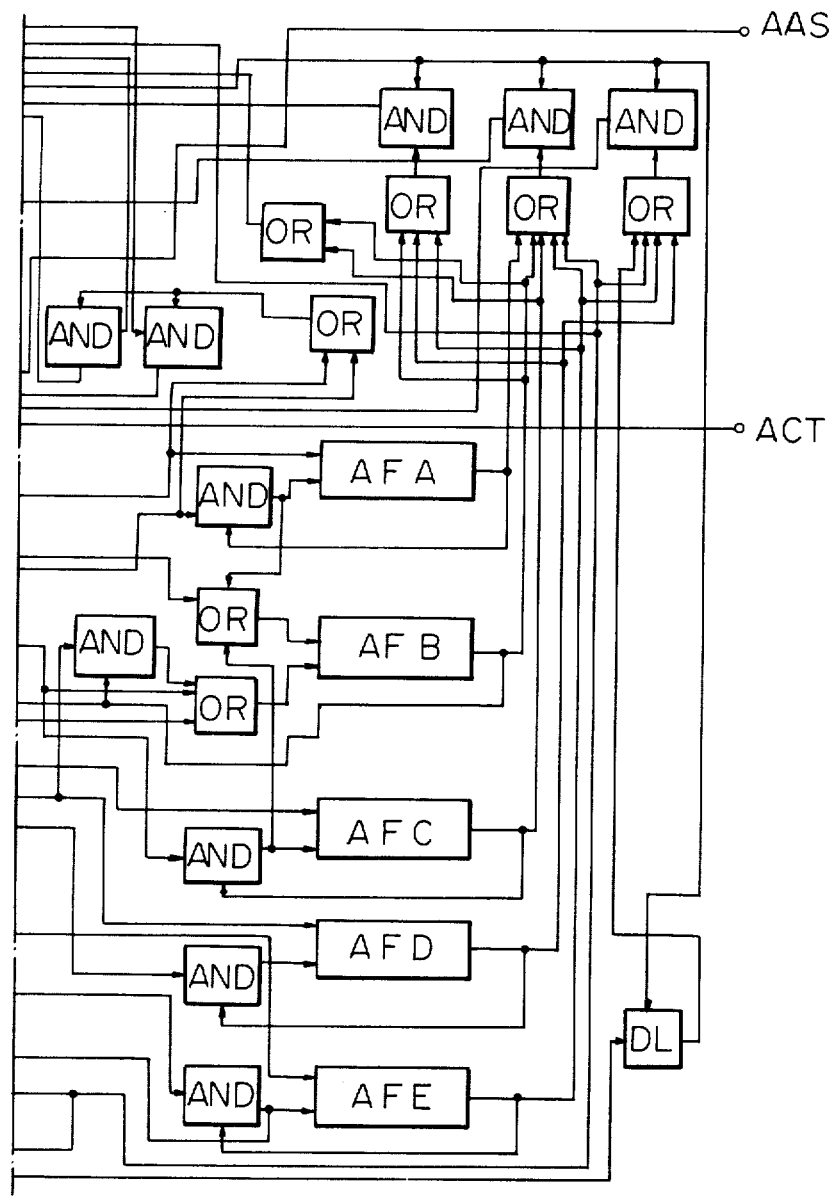

The explanation of NMH is concluded. Next, explanation is made for the part composed of by uniting instruction affixing part INA and erasing part MPE and called here as instruction dealing part INH. The circuit for this part is shown in FIG. 81. Input terminal of this part connected from outer circuits are clock input terminal CLC, instruction input terminal ATR receiving instruction to lower layer from output deciding part SDS, tree structure input terminal AAT receiving tree structure from tree structure memorizing part IET, start pulse input terminal AST receiving start pulse for this part constituted of completion signal at output deciding part SDS. The output terminals of this part are output terminal AAS which emits tree structure with instruction which is composed of group of tree structures having instructions at the highest nodes and completion pulse output terminal ACT emitting the completion pulse when the operation of this part is over. Following is the explanation for composing elements of this part. Newly two detectors LHD and RHD which are left angle parenthesis detector and right angle parenthesis detector to detect corresponding symbols are introduced. Shift registers in the part are A shift register AAA, B shift register AAB and C shift register AAC which accommodate instruction information coming from output deciding part SDS through instruction input terminal ATR, tree structure information from tree structure memorizing part IET through tree structure input terminal AAT and information to be emitted, respectively. A shift register AAA, aside from measures for simultaneous input to its entire stages, has first and second output terminals AA1 and AA2 and also clock terminal AAL. B shift register, apart from measures for simultaneous input and output at its entire stages, has first and second output terminals AB1 and AB2 and also clock terminal ABL. C shift register AAC has, aside from measures for simultaneous input and output at its entire stages, clock terminal ACL. AFA, AFB, AFC, AFD, AFE and AFF are state flip-flops and, for example, AFA is called as A state flip-flop. Up-down counter UDC has reset terminal RST.

Figure 82:
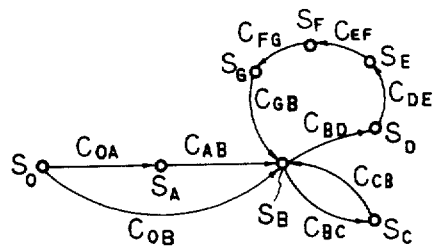
FIG. 82 is the state diagram of instruction dealing part INH.

This part INH has state diagram in FIG. 82 and so, has eight states including $S_0$ which is idle state. State transition signal $C_{0A}$ occurs when space is appearing at AB1 terminal at the instance when start signal comes in, and then instruction information and tree structure which is tree structure memorizing part IET output are read-in into A and B shift registers respectively. $C_{OB}$ is generated when a letter other than space is appearing at AB1 terminal at the instance of arrival of start pulse. In this case, reading-in to both shift registers is also conducted. $C_{AB}$ is signal other than space appearing at AB2 terminal. $C_{B0}$ corresponds to the emptiness of B shift register AAB accompanying generation of completion pulse at ACT terminal. State transition signals $C_{BC}$ and $C_{BD}$ correspond to the appearance of left large parenthesis at AB2 terminal and left angle parenthesis "<" at AA2 terminal respectively. $C_{DE}$ is the case where right angle parenthesis ">" is generated at AA1 terminal. $C_{EF}$ is generated when left large parenthesis "[" is generated at AB2 terminal. At the instance of above $C_{EF}$, reset pulse is sent to the reset terminal RST of up-down counter UDC resetting this counter. $C_{FG}$ emerges on condition that up-down counter is counting 0 and, as a result, zero detector ZDT which emits 1 when its input is 0, is emitting 1. $C_{GB}$ is the information telling that 1 clock interval elapses after the end of state $S_G$. This information is generated automatically by the effect of delay element DL. $C_{CB}$ occurs when right large parenthesis "]" is generated at AB1 terminal.

Next, operation of instruction dealing part INH at the states $S_0$ through $S_G$ is shown. $S_0$ is state of idling in this part and all the flip-flops in the part are "off". State $S_A$ is the state where clock pulse is fed only to B shift register AAB to "stuff to the left" the information in AAB when there are space letters in the left of meaningful information. $S_B$ is the state in which clock pulse is supplied to both of A and B shift registers and output signals of first output terminals of A shift register and B shift register are identical to each other. At state $S_C$ clock is fed only to B shift register. At state $S_D$ clock pulse is sent to A shift register AAA and C shift register AAC transferring output contents of AAA to AAC. At state $S_E$ clock pulse is supplied to all of the shift registers, and there, output signals of A and B shift register are identical and C shift register AAC is reading-in the output of A shift register AAA. State $S_F$ is the one where clock pulse is fed to B shift register AAB and C shift register AAC and, as a result, C shift register AAC is reading-in the memory contents of B shift register AAB. At state $S_G$ clock pulse is supplied only to C shift register AAC inserting one space after the memory contents in C shift register. This state can be realized by the aid of delay element DL.

As before, the operation of this instruction dealing part INH is explained by an example. The S equation corresponding to FIG. 18 which is output signal of tree structure memorizing part IET is expressed by following Eq. (40).

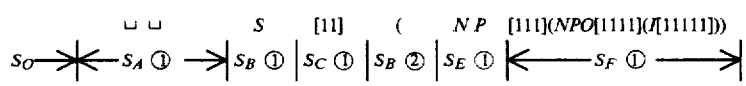

(40)

-continued

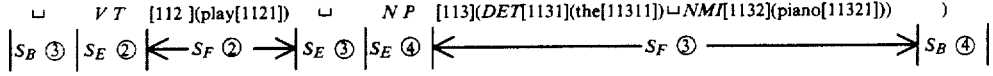

S equation corresponding to tree structure in FIG. 27 which is instruction to lower layer emerged from output deciding part SDS is expressed by following Eq. (41).

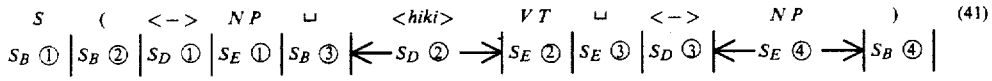

Explanation for this part is fulfilled here by affixing, at Eq. (40), the states of this instruction dealing part INH when corresponding letters in Eq. (40) are at the first output terminal AB1 in B shift register AAB and also by affixing, at Eq. (41), states of INH when corresponding letters in Eq. (41) are at the first output terminal AA1 of A shift register AAA. Finally, the row of letters introduced in C shift register AAC until the end of operation in this part becomes to be, including one space sending at state $S_G$, the row of letters shown in following Eq. (42).

$$<-> NP[111](NPO[1111](J[11111]))\sqcup <hiki> VT[112] \quad (42)$$

$$(play[1121])\sqcup <-> NP[113](DET[1131](the[11311])$$

$$\sqcup NMI[1132](piano)[11321]))$$

It is seen from above equation that this instruction dealing part INH generates "rest tree structure group" and that INA plays the role of the circuit constructed by connecting instruction affixing part INA and erasing part MPE in cascade fashion.

Figures 83, 83A:
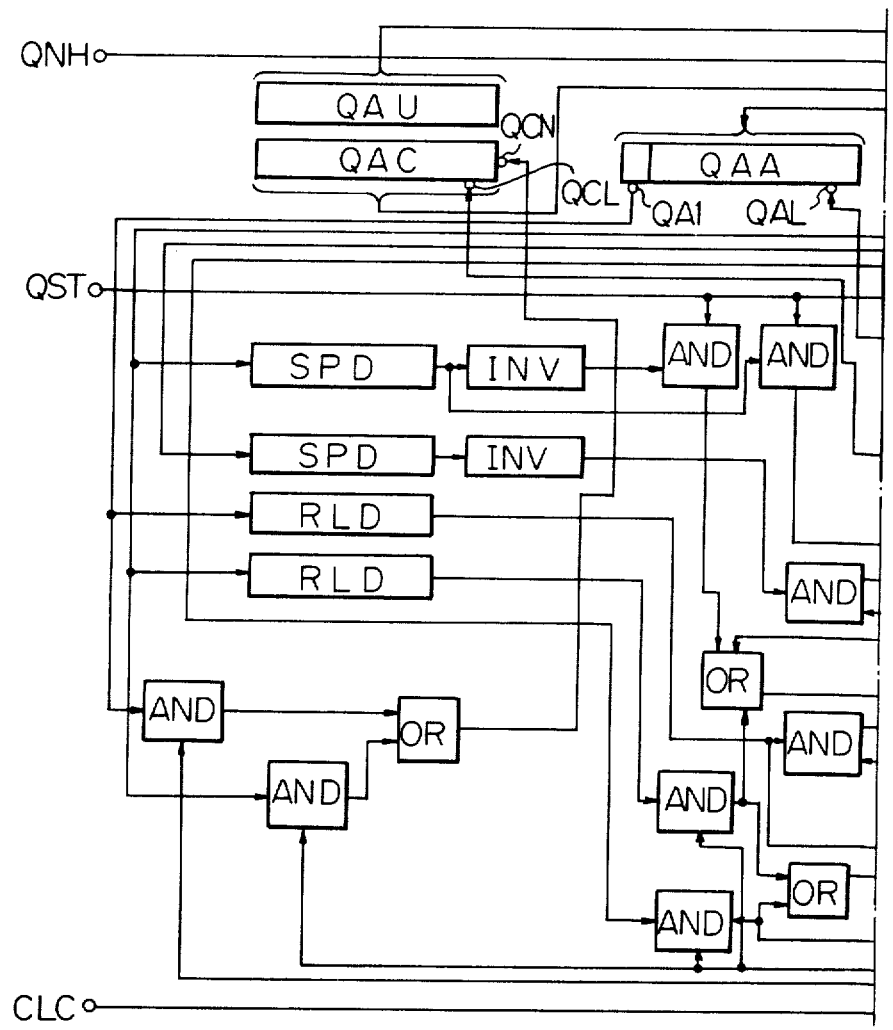
FIGS. 83, 83(a) and 83(b) are the figures of first number arranging part NNA1 realized by electronic circuit.
Figure 83B:
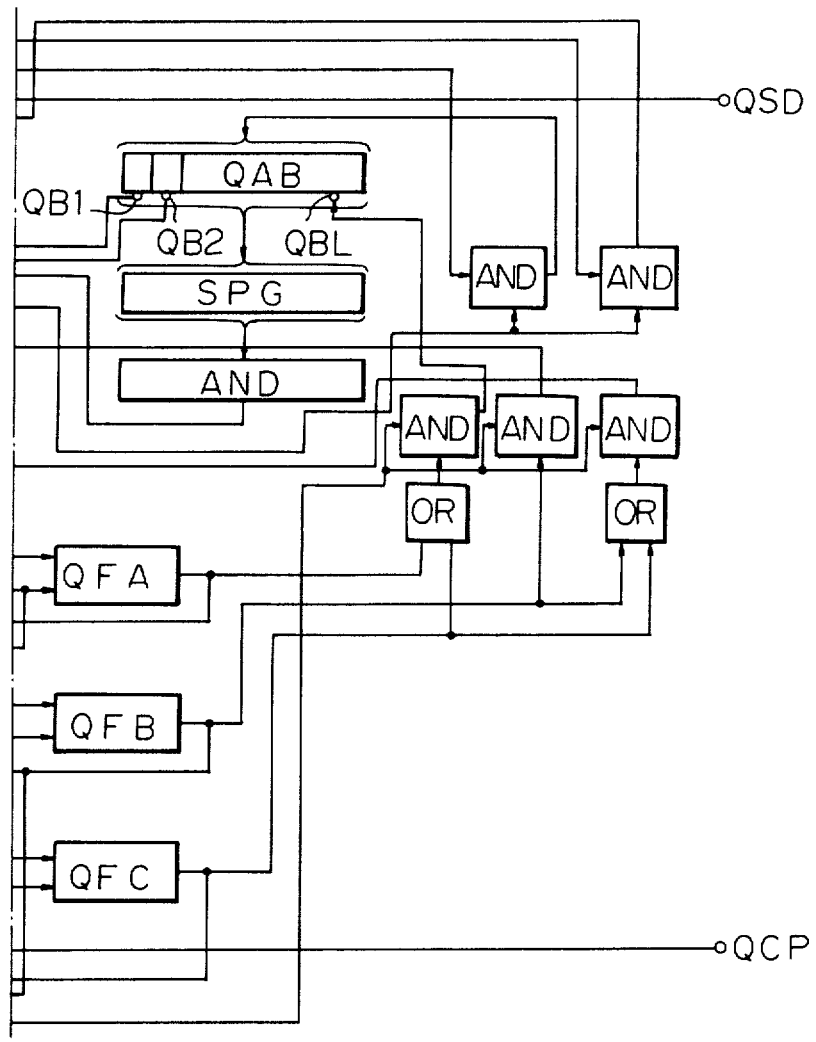

Next, the constitution and operation of node number arranging part NNA are shown. This part must be constituted by cascade connection of two circuits at the realization by electronic circuit. First, explanation is done for the first node number arranging part NNA1, which is first stage at the cascade connection. The structure is shown in FIG. 83. The circuit in FIG. 83 has three input terminals and two output terminals. Input terminals are constituted of clock input terminal CLC, start pulse input terminal QST which receives completion signal of aforementioned instruction dealing part INH coming in as start pulse of this NNA1 and node number information input terminal QNH which receives, from node number dealing part NMH, node number information shown in Eq. (39) constituted with node numbers arranged according to structure order in source language. This part of first node number arranging part NNA1 has two output terminals one of which is output terminal QSD which emits output consisting of node row with source language node number to second node number arranging part NNA2 which constitutes, with this NNA1, node number arranging part NNA, and the other of which is completion pulse output terminal QCP to show that the operation of NNA1 is completed. QAA, QAB and QAC are A, B and C shift registers respectively. A shift register QAA has measures for simultaneous input and ouput at all stages and also first output terminal QA1 and clock terminal QAL. B shift register QAB has, together with measures for simultaneous input and output at all stages, two output terminals QB1 and QB2 and clock terminal QBL. C shift register has, aside from measures for simultaneous input and output at all stages, clock terminal QCL and input terminal QCN. The part denoted by QAU is static number memory having the same length as that of A shift register QAA and can be realized by a ROM (read only memory). QFA, QFB and QFC are state flip-flops and QFA, for example, is A state flip-flop corresponding state $S_A$ mentioned later.

Figure 84:
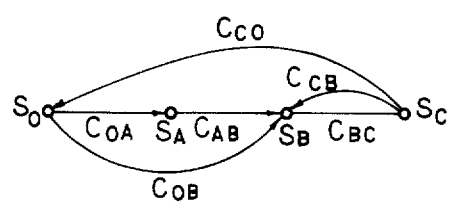
FIG. 84 is state diagram of first number arranging part NNA1.

State diagram for this part is shown in FIG. 84. NNA1, as seen in the figure, has four states which are $S_O$, $S_A$, $S_B$ and $S_C$. Among transition signals in the figure $C_{OA}$ and $C_{OB}$ occur when space is generated at QB1 terminal or letter other than space is generated at the same terminal, respectively at the instance of arrival of start pulse. At the generation of either of $C_{OA}$ and $C_{OB}$, the operation of reading-in node number dealing part NMH output and static number memory QAU output into B shift register QAB and A shift register QAA, respectively, is done. $C_{AB}$, $C_{BC}$ and $C_{CB}$ are generated when letter other than space occurs at QB1 terminal, right large parenthesis "]" appears at QA1 terminal and right large parenthesis "]" is generated at QB1 terminal, respectively. $C_{CD}$ is generated when B shift register QAB becomes empty generating completion pulse at completion pulse output terminal QCP.

At state $S_A$ clock pulse is fed only to B shift register QAB. State $S_B$ is the one where clock pulse is supplied to A shift register QAA and C shift register QAC and, as a result, signal appearing at first output terminal QA1 of QAA is read-in into QAC. At state $S_C$, clock pulse is fed to B shift register QAB and C shift register QAC and reading-in of signal at first output terminal QB1 of QAB into QAC is being conducted.

Explanation of this part is done using formerly used example. At the static number memory QAU, the row of 2-figured numbers successively increasing by value of 1 at the progress of terms which is shown in following Eq. (43), is memorized.

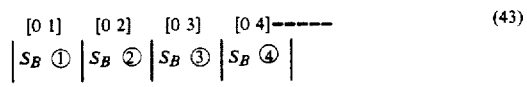

The structure in Eq. (43) and the structure generated at the output of node number dealing part NMH which is formerly given as Eq. (39) and written again in following Eq. (44) are introduced to A shift register QAA and B shift register QAB respectively at the instance of start pulse.

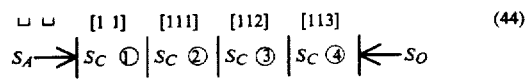

The design of static number memory QAU must be done so as to ensure the "stuffed to the left" accommodation of information of the type of Eq. (43) in QAA. The state names in Eq. (43) and (44) shows, as usual, the state of NNA1 when corresponding letters are at the first output terminals of QAA and QAB respectively. As the states progress at the order of $S_B①$, $S_C①$, $S_B②$, $S_C②$, ..., the row of letters shown in following Eq. (45) having the shape of input information shown in Eq. (44) but numbers are attached at the left of each term, is generated at C shift register QAC.

$$[0\ 1]\ [1\ 1]\ [0\ 2]\ [111]\ [0\ 3]\ [112]\ [0\ 4]\ [113] \quad (45)$$

This information is sent to the second node number arranging part NNA2 via output terminal QSD. This information is called "node row with source language number".

Figure 85A:
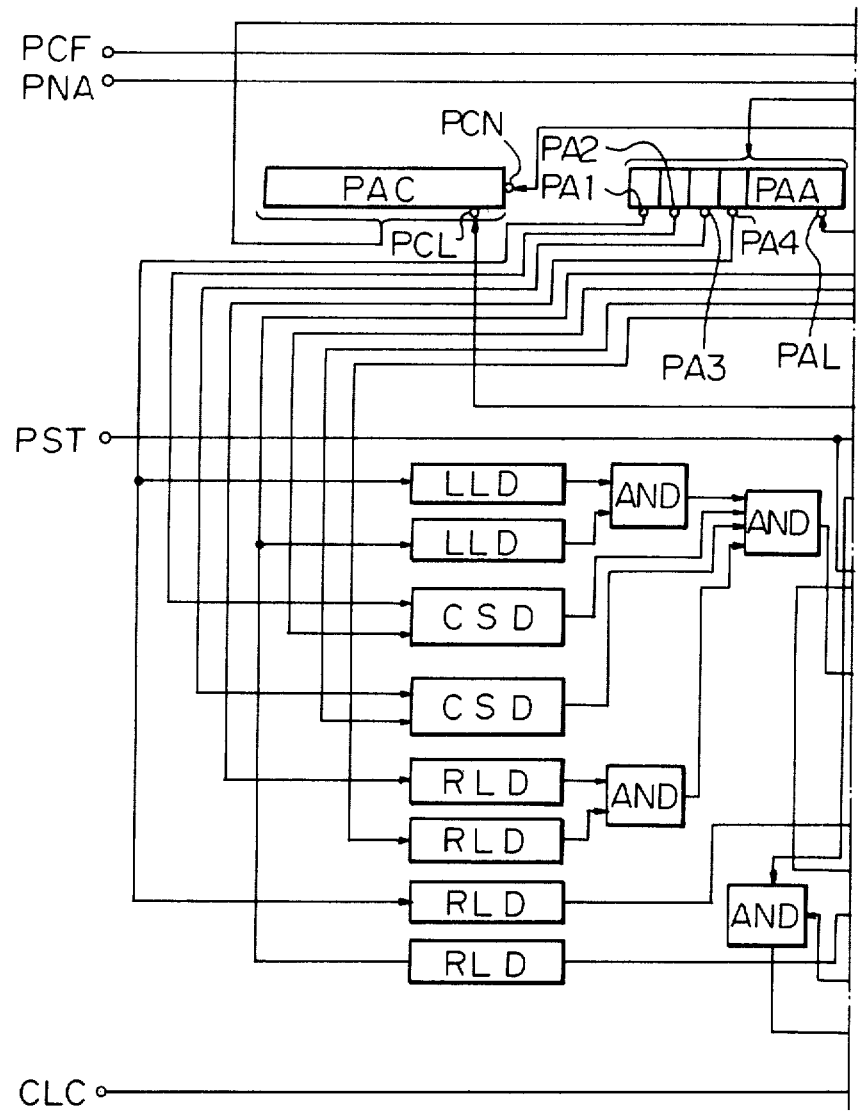
Figure 85B:
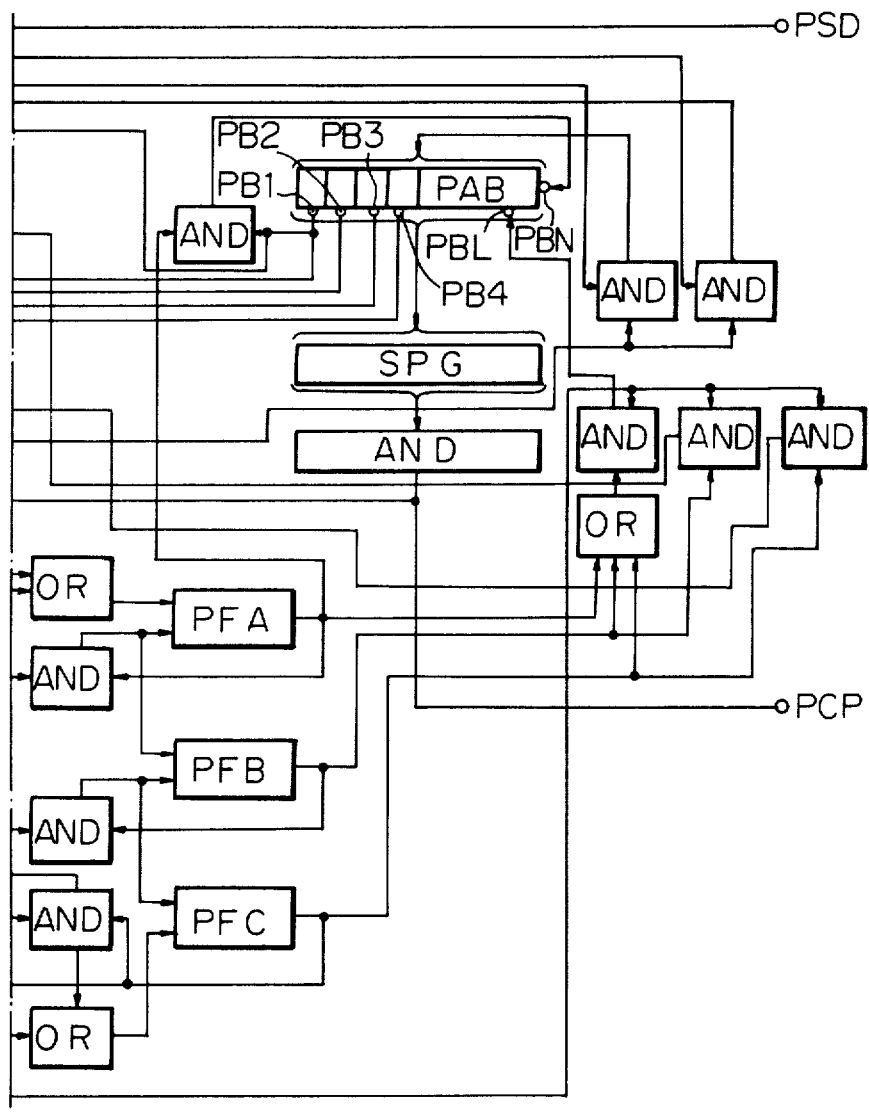

Now, the explanation for second node number arranging part NNA2 which constitutes node number arranging part NNA together with above-mentioned first node number arranging part NNA1, is done. The composition is as shown in FIG. 85. The circuit in FIG. 85 has four input terminals and two output terminals. Input terminals are clock input terminal CLC, start pulse input terminal PST receiving start pulse which is completion pulse at first node number arranging part NNA1 situated in front this part, coming in as start pulse to this part, input terminal PNA receiving "node row with source language node number" which is output signal of former NNA1 and correspondence table input terminal PCF receiving information of "structure order correspondence table" giving indication of transfer from structure order of source language to structure order of target language. Output terminals of this part are output terminal PSD which emits row of node number arranged in accordance with structure order of target language which is called target language order output, completion pulse output terminal PCP emitting pulse to show operation of NNA2 has ended. PAA, PAB and PAC are A, B and C shift registers respectively and have clock terminals of PAL, PBL, PCL respectively. Description for measures for simultaneous output and input at all stages is abbreviated hereafter as it is apparent from figures. PAA has four output terminals of PA1 through PA4 and similarly PAB has output terminals of PB1 through PB4. B shift register PAB and C shift register PAC have input terminals PBN and PCN respectively. PFA, PFB and PFC are state flip-flops and PFA, for example, PFA is called as A state flip-flop.

Figure 86:
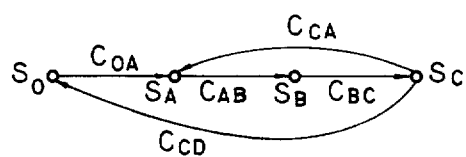
FIG. 86 is state diagram of second number arranging part NNA2.

The state diagram for this second node number arranging part NNA2 is shown in FIG. 86. This part has four states which are $S_0$, $S_A$, $S_B$ and $S_C$. The state transition signal $C_{0A}$ occurs when start pulse comes. $C_{AB}$ is generated when the condition in which output signals of both of PA1 terminal and PB1 terminal are left large parenthesis "[" and output signals of both of PA4 terminal and PB4 terminal are right large parenthesis "]" and output signals from PA2 terminal and PB2 terminal are identical and finally PA3 output and PB3 output are identical, is met. $C_{BC}$, $C_{CA}$ and $C_{Co}$ correspond to the appearance of right large parenthesis "]" at PA1 terminal, appearance of also right large parenthesis "]" at PB1 terminal and emptiness of B shift register PAB respectively. Above is the description of state transition signal and following is description of operation of NNA2 at each state. State $S_D$ is idle state. At the state $S_A$, a connection connecting first output terminal PB1 and input terminal PBN of B shift register composing the input terminal of rightmost stage of PAB, is made and, as a result, output signal of PB1 is directly introduced to PBN. At the state, clock pulse is fed only to B shift register PAB. State $S_B$ is the state where clock is fed to both of A and B shift registers. At state $S_C$, clock pulse is sent to B shift register PAB and C shift register PAC and output signal of PB1 terminal is read-in by PAC.

Now, description of operation of NNA2 is made using above-mentioned example. The output of first node number arranging part PPA1 which is called as "node row with source language node number" is shown in Eq. (45). It is reproduced as following Eq. (46).

$$\begin{array}{cccccccc}[01] & [11] & [02] & [111] & [03] & [112] & [04] & [114] \\ S_A① & |S_B① & |S_C① & |S_B② & |S_C② & |\leftarrow S_A③ \rightarrow & |S_B③ & |S_C③| \end{array} \quad (46)$$

$$|\leftarrow \quad S_A④ \quad \rightarrow |S_B④ \quad |S_C④|$$

As is apparent from Eq. (46), node number is shown after the number which corresponds to structure order in source language and which begins with 01 and increases by value 1 according to progress of each term. The information at Eq. (46) comes at input terminal PNA. The structure order correspondence table which is one of output tree structure memorizing part SPM comes at correspondence table input terminal PCF. The information corresponds to FIG. 20(b) and has the shape expressed in following Eq. (47).

$$\begin{array}{cccc}[0\ 1] & [0\ 2] & [0\ 4] & [0\ 3] \\ |S_B① & |S_B② & |S_B③ & |S_B④| \end{array} \quad (47)$$

As is explained formerly concerning FIG. 20(b), this information is indication of change of arrangement directing that node number in fourth position should be transferred to third position and node number in third position should be shifted to fourth position, at the row of node numbers which is input signal of first node number arranging part NNA1 and corresponds to node numbers arranged in accordance with structure order in source language. With arrival of start pulse, "node row with source language node number" shown in Eq. (45) or Eq. (46) is read-in into B shift register PAB through input terminal PNA and similarly, at the same instance, tree structure order correspondence table shown in Eq. (47) is read-in by A shift register PAA through correspondence table input terminal PCF. Thus the operation of this part or NNA2 begins. Under the letters in Eq. (46) and (47), the state of NNA2 when corresponding letters are at first output terminal PB1 of B shift register and first output terminal PA1 of A shift register respectively, are shown. The states progress as shown in following Eq. (48).

$$S_A①, S_B①, S_C①, S_A②, S_B②, S_C②, S_A③,$$
$$S_B③, S_C③, S_A④, S_B④, S_C④ \quad (48)$$

The letters dealt with at and after $S_A④$ in Eq. (46) which are memorized in B shift register PAB are letters which come back again at the vicinity of PB1 terminal passing the connection between input and output terminals in PAB. As reading-in to C shift register PAC from B shift register PAB takes place at the state of $S_C$, the memory contents in PAC finally becomes the information shown in following Eq. (49), which turns out to be the total output of whole NNA or node number arranging part.

$$[1\ 1][111][113][112] \tag{49}$$

Figure 54B:
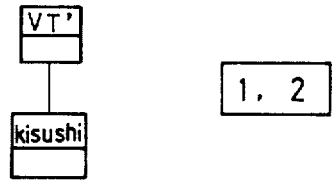
FIG. 54(b) shows the figure of target language pattern P'-kiss-1.

At output of the node number arranging part NNA, Eq. (49) which corresponds to FIG. 25 and which is row of node numbers arranged at the structure order of target language is obtained based on the input information of NNA expressed by Eq. (44) which corresponds to FIG. 24 and which is row of node numbers arranged at the structure order of source language and also based on the indication of structure order correspondence table shown in Eq. (47) directing that third and fourth number should be interchanged. At the description for NNA, the case when maximum node number is limited to that of two figures, is dealt with. Nevertheless, this figure number can be freely changed by changing number of coincidence detector CSD in the circuit of FIG. 54.

Figure 87A:
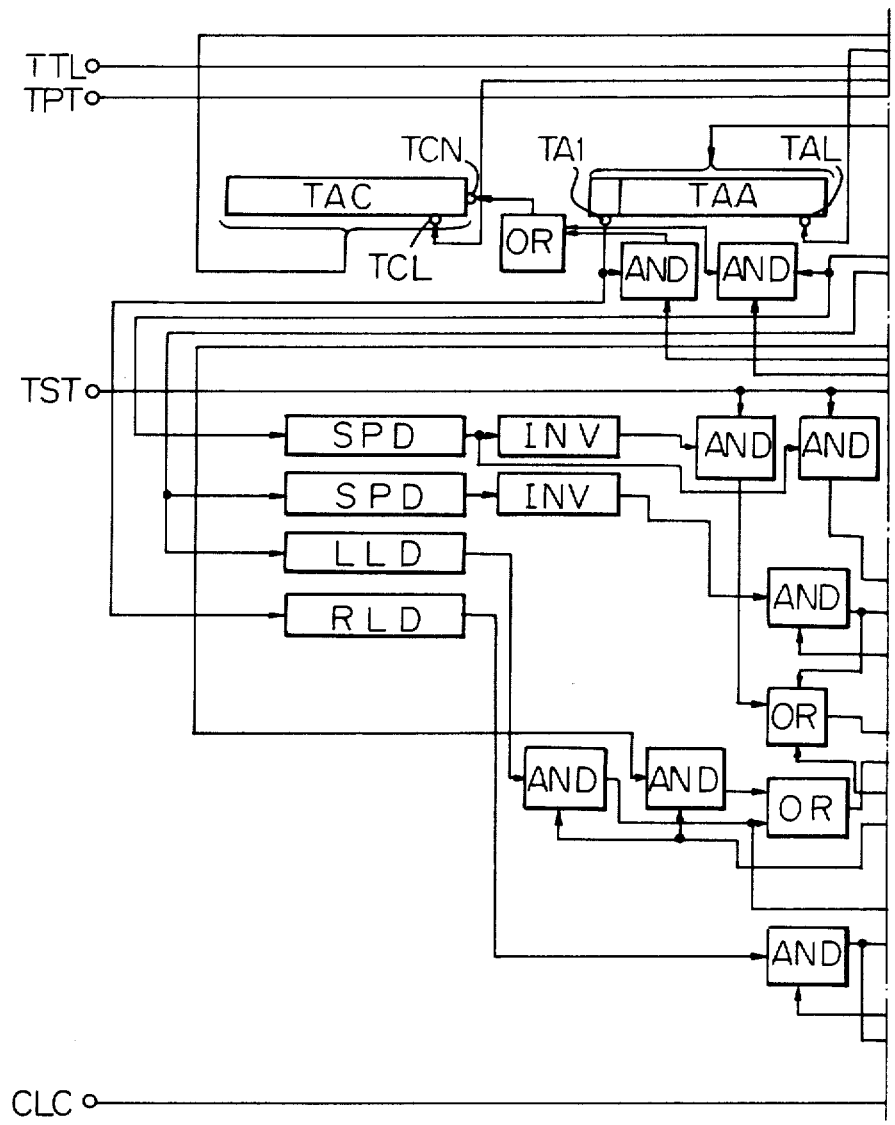
Figure 87B:
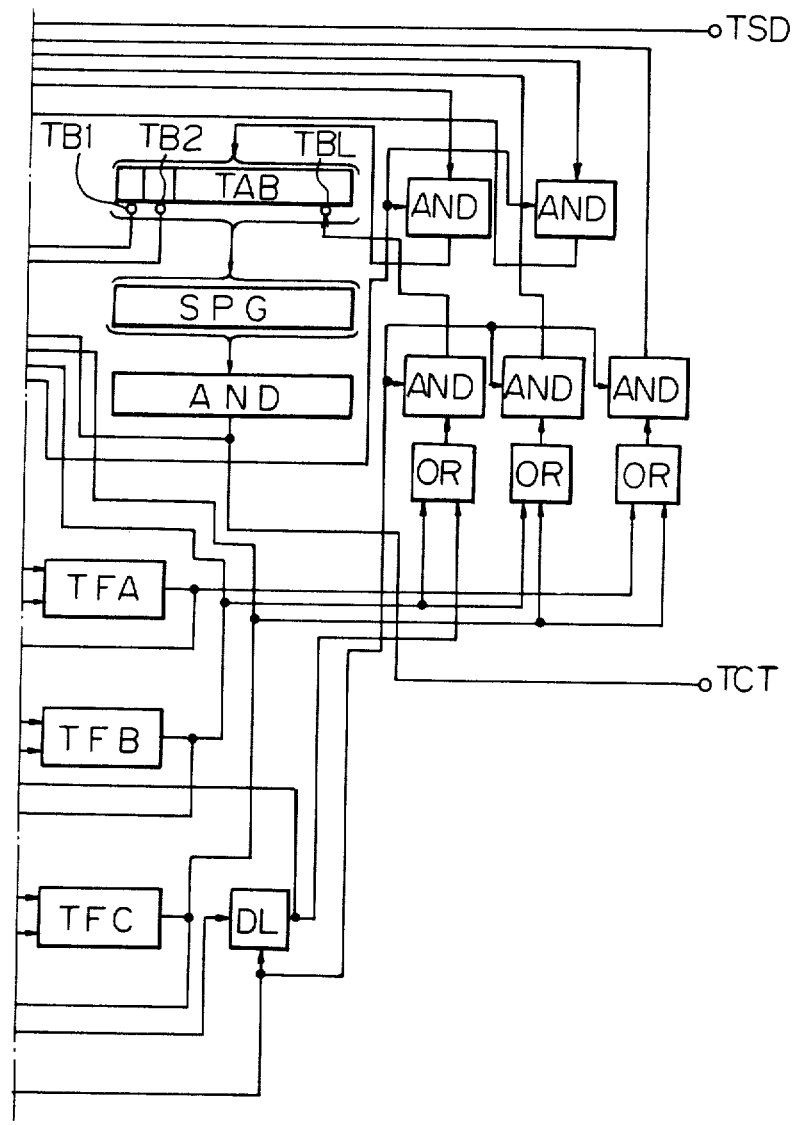

Next, output tree structure generating part SPG will be described. This part has configuration shown in FIG. 87. This part has four input terminals and two output terminals. Input terminals are clock input terminal CLC, start pulse input terminal TST receiving start pulse generated as completion pulse at the formerly mentioned second node number arranging part NNA2, output tree structure input terminal TPT receiving signal which is generated as one of output signals at the output deciding part SDS and comes in as output tree structure via output tree structure memorizing part SPM and target language node row input terminal TTL which receives, from above mentioned second node number arranging part NNA2, node numbers arranged in accordance with structure order of target language. Output terminals in this part are completion pulse output terminal TCT to express that operation of this part is completed and output terminal TSD to emit target language tree structure with node number. TAA, TAB and TAC are A, B and C shift registers respectively and TAL, TBL and TCL are their clock terminals observing the same order. A shift register TAA has output terminal TA1. B shift register TAB has two output terminals TB1, TB2 and C shift register TAC has input terminal TCN. TFA, TFB and TFC are state flip-flops and, for example, TFA is A state flip-flop corresponding to state $S_A$.

Figure 88:
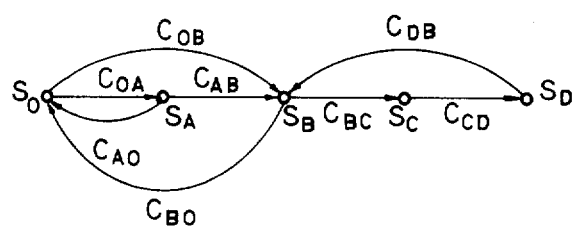
FIG. 88 is state diagram of output tree structure generating part SPG.

State diagram of this part SPG is shown in FIG. 88. This part has five states which are $S_0$, $S_A$, $S_B$, $S_C$ and $S_D$. State transition signal $C_{0A}$ occurs when start pulse arrives and TB1 terminal is emitting space. On the other hand, $C_{0B}$ occurs when start pulse arrives and TB1 is emitting letter other than space. $C_{BC}$ and $C_{CD}$ correspond to the condition when left large parenthesis "[" is generated at TB2 terminal and when right large parenthesis "]" is appearing at TA1 terminal, respectively. $C_{DB}$ is generated automatically, by the effect of delay element DL, one clock interval after the generation of $C_{CD}$. $C_{B0}$ appears when B shift register TAB becomes empty and at this instance the completion pulse is emitted to outer circuit.

At the state of $S_0$ this part is in idle condition. At state $S_A$ clock pulse is fed only to B shift register. State $S_C$ is the one where clock pulse is supplied to A and C shift registers and output of first output terminal TA1 of A shift register TAA is introduced to C shift register TAC via its input terminal TCN. At state $S_D$ the pulse making C state flip-flop "off" but delayed by delay element DL for one clock interval, clocks B shift register TAB once.

Operation of output tree structure generation part SPG is explained by the use of the example used so far. Row of node numbers arranged according to the structure order of target language comes in, via target language node row input terminal TTL, from second node number arranging part NNA2. This information is shown in Eq. (49) and is reproduced in following Eq. (50).

$$S_A \rightarrow \begin{array}{|c|c|c|c|} [1\ 1] & [111] & [113] & [112] \\ S_C① & S_C② & S_C③ & S_C④ \end{array} \tag{50}$$

On the other hand, S equation corresponding to the tree structure in FIG. 20(a) comes in as output tree structure, via output tree structure input terminal TPT, from output tree structure memorizing part SPM. The operation corresponding to this situation has been described in detail at the part of former half of the description of FIG. 20(a). The equation corresponding to structure in FIG. 20(a) can be written as shown in following Eq. (51).

$$\begin{array}{ccccccccc} S' & [ & (NP & [ & \sqcup J'(wa)\sqcup NP & [ & \sqcup J'(o)\sqcup VT & [ & \sqcup JD'(masu)) \\ |S_B① |S_D① |S_B② |S_D② |\!\leftarrow\! S_B③ \rightarrow\!| S_D\ 3 |\!\leftarrow\! S_B④ \rightarrow\!| S_D④ |\!\leftarrow\! S_B⑤ \rightarrow\!| \end{array} \tag{51}$$

At the description in Eq. (51) left large parenthesis "[" is used to show the empty columns to be filled with node numbers. The empty column indication written in Eq. (51) is used in production rule memorizing region PRT in pattern memorizing part MPM and, as a result, equation of this type comes to this part via output deciding part SDS and output tree structure input terminal TPT in this part. With start pulse, information in Eq. (50) and that in Eq. (51) is read-in into A shift register TAA and B shift register TAB respectively commencing the operation of this part. Input to B shift register TAB can be obtained from static table and, by virtue of the fact, can be accommodated in B shift register in the "stuffed to the left" shape. On the other hand, the information arriving at A shift register TAA is output of node number arranging part NNA and, as a result, may have spaces caused by certain processing at the left of meaningful information when accommodated at A shift register. So state of $S_A$ is one where "stuffing to the left" operation is done by shifting memory contents in A shift register to the left. For the case explained so far, the "stuffing to the left" operation is done to B shift registers. Under the letters in Eq. (50) and (51), the state of this part or SPG at the instance when corresponding letters are at the first output terminals of A and B shift registers respectively is depicted. At the state of $S_B$ the portion of letters in Eq. (51) denoted as $S_B$ under the letters is introduced to C shift register TAC from B shift register TAB and also at the state of $S_C$ the portion of letters in Eq. (50) denoted as $S_C$ under the letters is introduced to C shift register TAC from A shift register TAA. As a result, C shift register TAC becomes to have information shown in following Eq. (52) which is S equation corresponding to one of the output tree structures shown in FIG. 26.

$$S'[11](NP'[111] \cup J'(wa) \cup NP'[113] \cup J'(o) \cup VT'[112]JP'(masu)) \quad (52)$$

This information is sent to output tree structure affixing part SPA at the instance of generation of completion pulse.

As output tree structure affixing part SPA can be realized by a circuit generating one output signal using two input signals through the utilization of simple AND circuits and OR circuits, the description of its constitution and operation is skipped.

Explanation for output tree structure memorizing part PGM is also omitted because this part can be composed by RAM (random access memory).

Figure 89A:
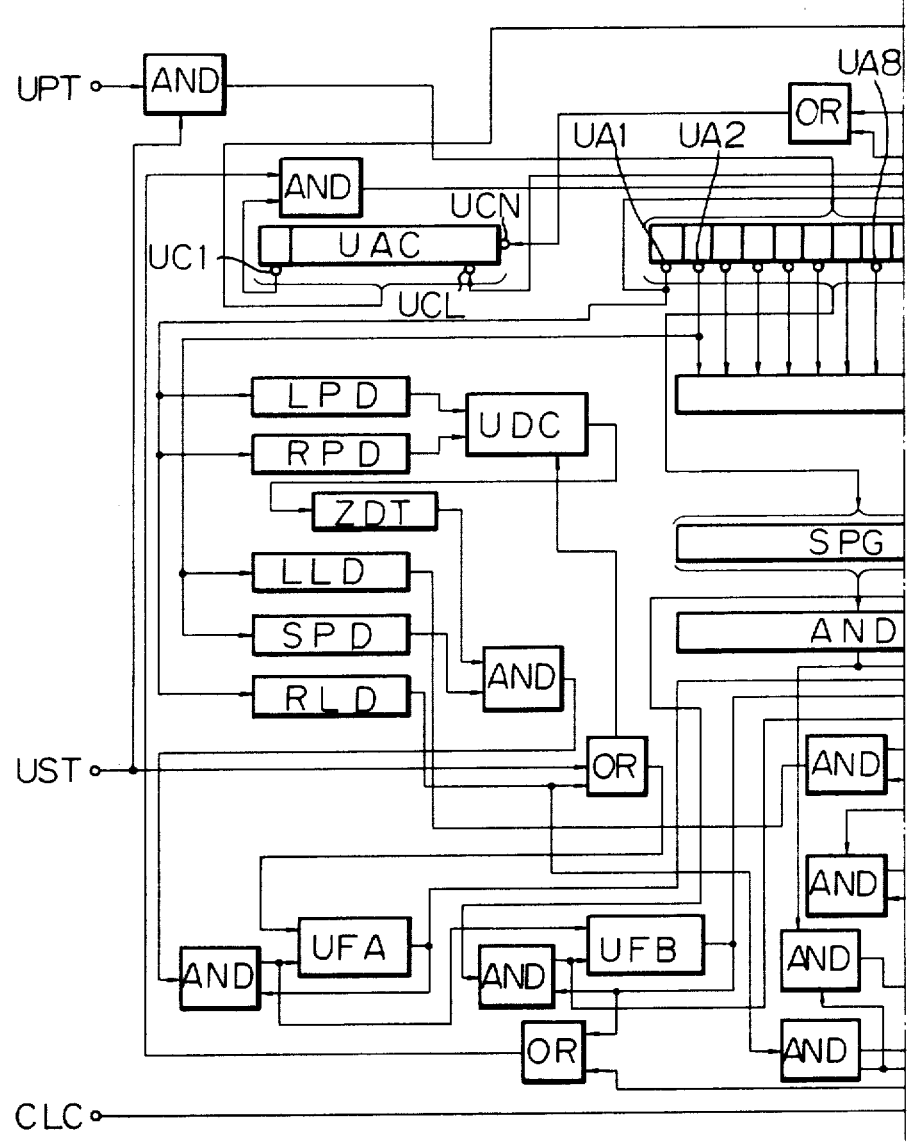
Figure 89B:
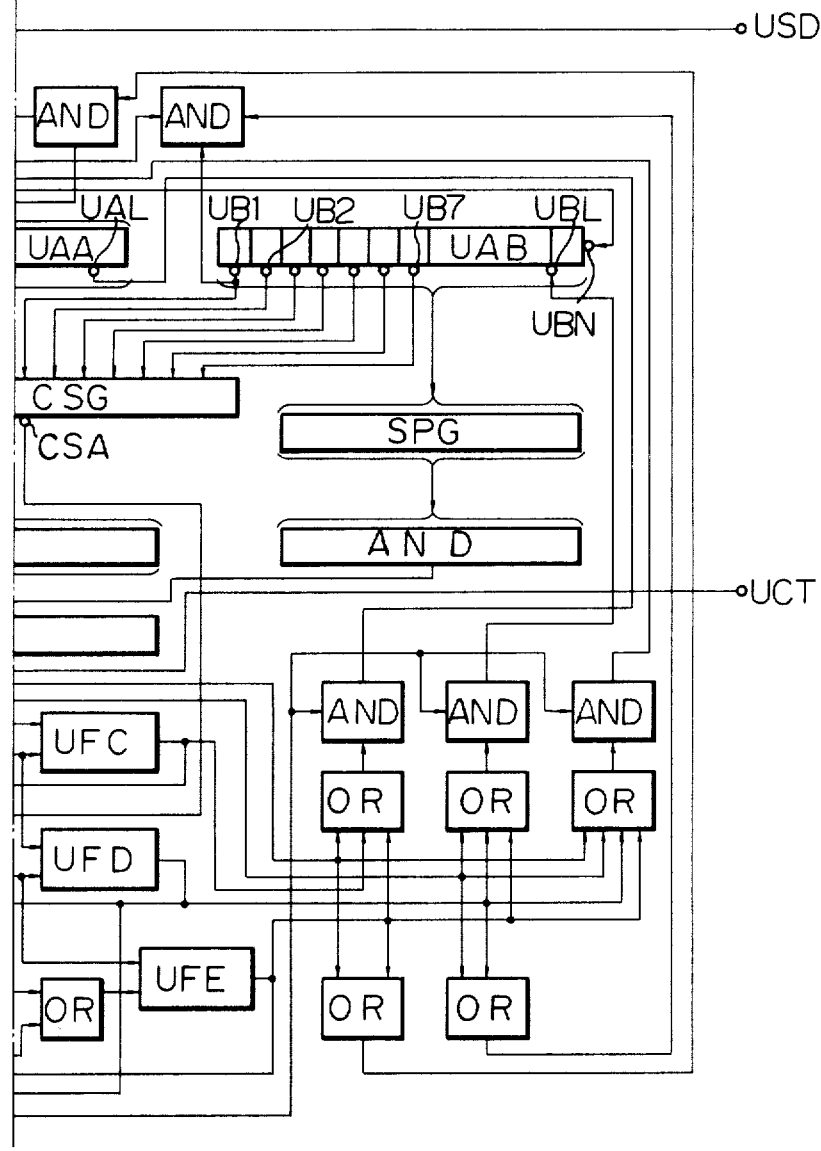

Next, description is made for the composition and operation of output tree structure connecting part SPC shown in FIG. 89. This part has three input terminals and two output terminals. One of input terminals is clock input terminal CLC and another is start pulse input terminal UST which receives start pulse indicating that tree structure information has vanished from circulation part in this mechanical transformation system expressed in FIG. 7 and directing that this part SPC should start its operation. Start pulse is, as shown in the figures, result of "and" calculation between information of emptiness in handled tree structure memorizing part HTM and completion signal of handled tree structure deciding part HTD. The last among the input terminals is tree structure group input terminal UPT which receives tree structure group emerged from output tree structure group memorizing part PGM. Output terminals of this part consist of completion pulse output terminal UCT to show completion of operation at this part, and tree structure output terminal USD to emit output tree structure. UAA, UAB and UAC are A, B and C shift registers and UAL, UBL and UCL are their clock terminals respectively. A shift register UAA has eight output terminals which are UA1 through UA8. Similarly B shift register UAB has output terminals UB1 through UB7. C shift register has first output terminal UC1. For the terminals UA1 through UA8 and UB1 through UB7, names of terminals are attached only for the ones located at the vicinity of both ends of the terminals at FIG. 89 to simplify the description. UBN and UCN are input terminals of B shift register UAB and C shift register UAC respectively and of course composed of the input terminals at the rightmost memory stage of both shift registers. UFA, UFB, UFC, UFD and UFE are A, B, C, D and E state flip-flops respectively. Up-down counter UDC has reset terminal RST.

Figure 90:
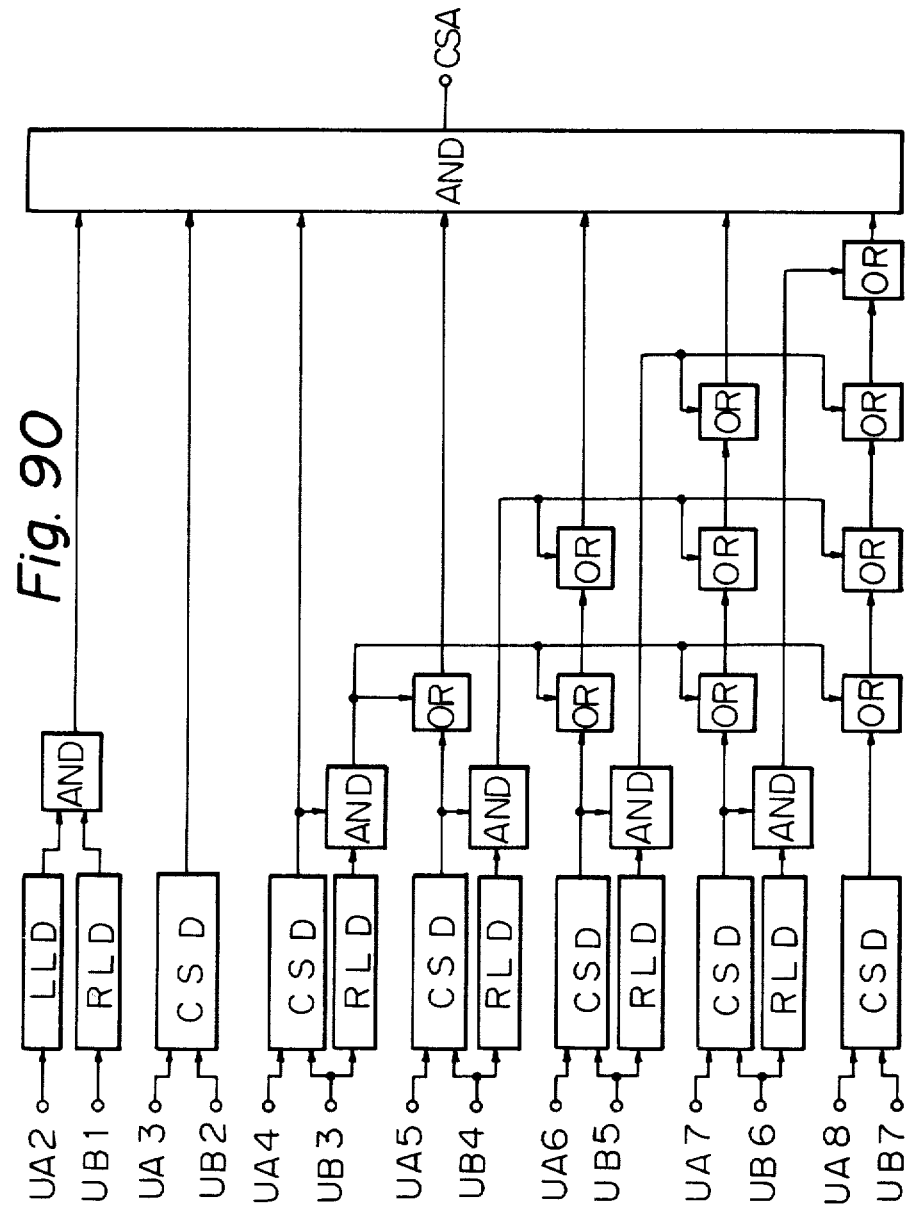
FIG. 90 is the figure of limited coincidence detector CSG.

The part denoted as CSG is limited coincidence detector which has structure shown in FIG. 90. This part has input terminals of UA2 through UA8 and UB1 through UB7 each of which receives signals from output terminal of the same name situated at A shift register UAA and B shift register UAB, and has single output terminal CSA called coincidence detection output terminal. Among the component parts in FIG. 90, the parts expressed as AND and OR are of course AND and OR circuits respectively and LLD and RLD are formerly mentioned left large parenthesis detector and right large parenthesis detector respectively and moreover the part CSD is also aforementioned coincidence detector. The basic operation of this limited coincidence detector CSG consists of usual coincidence detection where CSG emits 1 when input signals at the all pairs of input terminals $UA(i+1)$ and UAi ($i=1, \ldots, 7$) are identical and otherwise emits 0. Nevertheless, when both signals at the composing parts of a pair, say terminals UA5 and UB4, are identical and right large parenthesis "]" and, moreover, signals of the pairs up to the pair are also identical, CGS emits 1 even when signals at the terminal pairs of higher number, say UA7 and UB6, are not identical. From the reason mentioned above, this part CSG is called "limited" coincidence detector. For example, CGS judges that coincidence relation is established when signals at the UA2, UA3, UA4 and UA5 terminals are [, 1,1 and] respectively and output from UB1, UB2, UB3 and UB4 terminals are also the same irrespective of the signals at higher numbered terminals. The function can be easily seen from FIG. 90 and so the operation of limited coincidence detector CGS will not be treated further. FIG. 90 corresponds to the construction of investigation for up to five figures excepting large parenthesis, but expansion to more figures is of course possible by increasing numbers coincidence detector CSD, right parenthesis detectors LLD and RLD and AND and OR circuits, using the same design of configuration. Above is the description of composing parts in output tree structure connecting part SPC.

Figure 91:
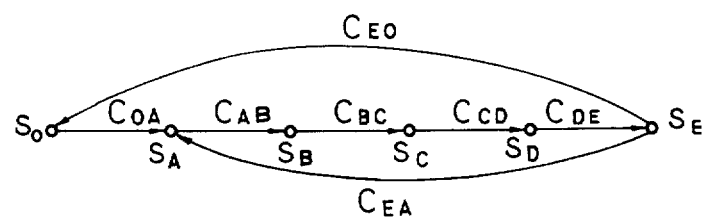
FIG. 91 is state diagram of output tree structure connecting part SPC.

Output tree structure connecting part SPC has state diagram shown in FIG. 91. SPC has states which are $S_0$, $S_A$, $S_B$, $S_C$, $S_D$ and $S_E$. $C_{0A}$, among state transition signals shown in FIG. 91, is generated when start pulse arrives at start pulse input terminal UST and, at the instance, input signal generated at tree structure group input terminal UPT is read-in to A shift register UAA and also up-down counter UDC is reset through it reset terminal RST. $C_{AB}$ is generated when space appears at the UA2 terminal and up-down counter is counting 0. $C_{BC}$ corresponds to the emptiness of B shift register UAB and $C_{CD}$ appears when left large parenthesis "[" appears at UA2 terminal. $C_{DE}$ appears when limited coincidence detector CSG emits 1 showing coincidence is established. $C_{EA}$ is generated when right large parenthesis "]" appears at UA1 terminal and, by the signal, UDC is also reset. $C_{E0}$ emerges when A shift register UAA becomes empty and, then, completion pulse is generated at completion pulse output terminal UCT.

At state $S_0$, this part is in idle condition. At state $S_A$ clock pulse is sent to A shift register UAA and C shift register UAC and the signal appearing at first output terminal UA1 of UAA is being read-in into C shift register UAC through its input terminal UCN. State $S_B$ is one where clock is fed to B and C shift registers and, as a result, output signal at first output terminal UB1 of B shift register UAB is read-in into C shift register UAC and also signal appearing at first output terminal UC1 of UAC is read-in into UAB through its input terminal UBN. At state $S_C$ clock is supplied only to UAA. At state $S_D$ clock is fed to UAB and UAC and accordingly output of UAB is read-in into UAC and also output of UAC is read-in into UAB. State $S_E$ is the state in which clock signal is fed to all the shift registers UAA, UAB and UAC and UAC is reading-in the output signal of UAA. Some speciality of this output tree structure connecting part SPC consists in the design in which the signal path from first output terminal UC1 of C shift register UAC to input terminal UBN situated at the right-most stage of B shift register UAB makes a loop circuit together with the path between B shift register to C shift register, permitting circulation of signal at the number of times equal to the number of trees in the tree group introduced to the part.

Figure 62:
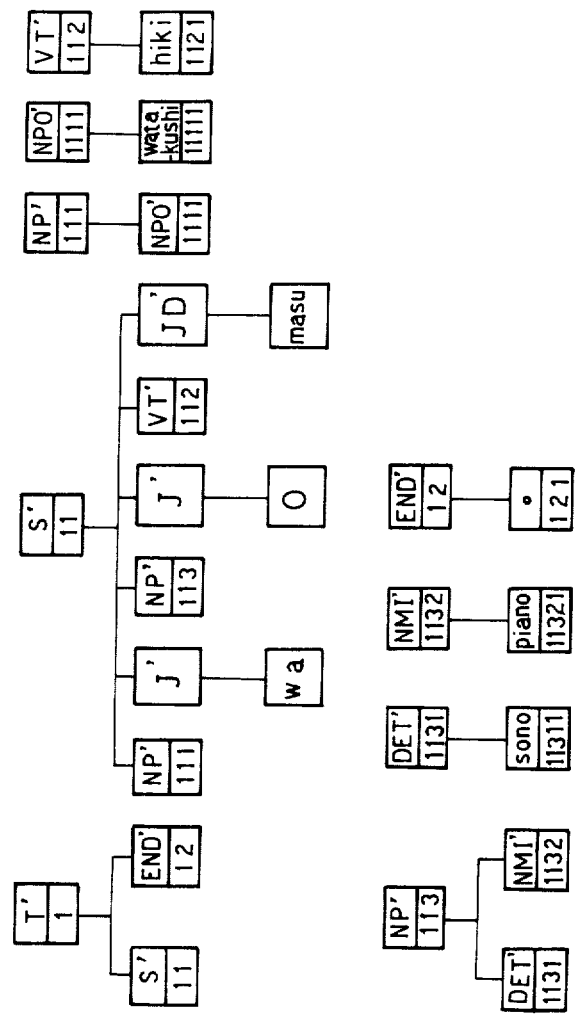
FIG. 62 shows the memory contents of output tree structure memorizing part SPG after the completion of operation of circulation.
Figure 63:
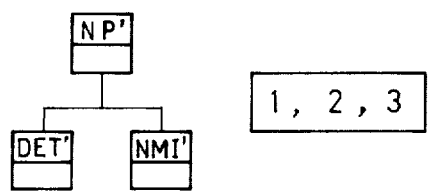
FIG. 63 is the figure of target language pattern P'-3-1.
Figure 64:
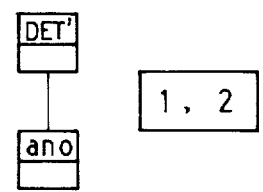
FIG. 64 is the figure of target language pattern P'-the-1.
Figure 65:
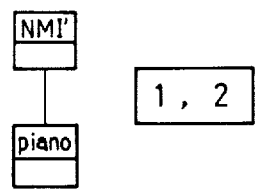
FIG. 65 is the figure of target language pattern P'-piano-1.
Figure 66:
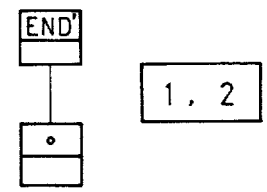
FIG. 66 is the figure of target language pattern P'-period-1.

Following is the description of operation of output tree structure connecting part SPC using an example. The example used here is the case where S equation in Eq. (50) which corresponds to tree structure group consisting of nine trees shown in FIG. 62, is introduced as input information. In Eq. (50) a space is inserted between successive tree structures, nevertheless this circuit works normally even when the number of space is more than one.

coincidence of the node number [11]. At the state $S_E$①  the part memorized in the A shift register UAA and located at the right among the two parts denoted by $S_E$① in Eq. (52) is read-in into C shift register UAC. The part of $S_E$① located at the left is memorized in B shift register UAB, which goes out of UAB through first output terminal UB1 and vanishes. Transition signal from $S_E$① to next state of $S_A$② is of course $C_{EA}$ and which signal is generated by the appearance of right large parenthesis "]" at UA1 terminal. At the end of state $S_E$①, the part composed by connecting the part denoted by $S_E$① directly after the part denoted by $S_D$①, all in Eq. (52) is memorized in C shift register UAC and the part of ⊔END[112]) composed by re-

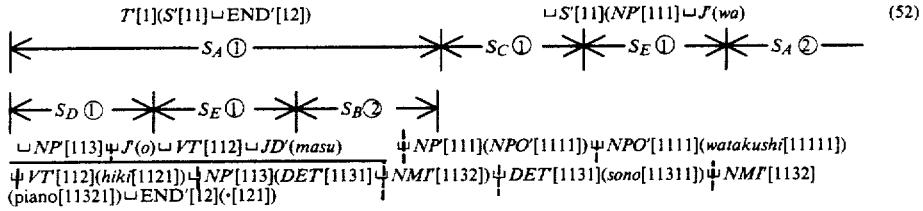

As mentioned before, the dotted vertical lines are added to show the border of trees only for explaining purposes and there are no such lines at actual signal.

In SPC the whole letters in Eq. (52) is read-in into A shift register UAA at the instance of start pulse and the part denoted as $S_A$① at the Eq. (52) is successively read-in into C shift register UAC. Next, the state is transferred to $S_B$① at the state transition signal $C_{AB}$ which occurs when count of up-down counter is 0 and space appears at UA2 terminal but, as B shift register UAB is empty, the state is immediately transferred to $S_C$①. As before the numbers in circles show the times of occurrence, so far, of the same states. At $S_C$① the part ⊔S' is remoted from A shift register UAA and vanishes, so at the end of $S_C$①, the part denoted by $S_A$① in Eq. (52) is memorized at C shift register UAC "stuffed to the right" and the part [11] succeeding $S_C$① is memorized in A shift register UAA "stuffed to the left". The transition of $S_C$① to next state of $S_D$① is caused by appearance of left large parenthesis "[" at the UA2 terminal. At state $S_D$①, the memory contents of C shift register UAC which is denoted as $S_A$① in the equation goes out via UC1 terminal and come into B shift register UAB through its input terminal UBN and going through UAB halfway, part of the letters comes in UAC again. After the operation in $S_D$①, the part denoted as $S_D$① among the part denoted by $S_A$① is memorized in UAC and remaining part of $S_A$① remains in UAB.

Transition from $S_D$① to $S_E$① is caused by the coincidence of the part [11] situated directly in front of the part denoted by $S_C$① at the leftest memory location in A shift register UAA, and also the part [11] located directly after the portion denoted $S_D$①. This coincidence is of course detected at aforementioned limited coincidence detector CSG. In spite of the fact that the part ⊔END'—follows after the part of [11] situated directly after the part denoted as $S_D$① and the part (NP'[111]—follows after the part of [11] situated directly after $S_C$① and, as a result, corresponding output signals at pairs of terminals in A shift register UAA and B shift register UAB are different to each other after the closing of large parenthesis, limited coincidence detector CSG shown in FIG. 90 detects the moving the part of $S_0$① and $S_B$① from the part of $S_A$① is situated in B shift register UAB and the whole portion including and after the part denoted by $S_E$① succeeding abovementioned memory contents of B shift register, is memorized in A shift register UAA.

At state $S_A$② the part denoted by $S_A$ 2 in Eq. (52) comes into C shift register UAC directly succeeding the letters T[1](S[11] memorized in UAC. At the end of state $S_A$②, the part denoted by $S_D$①, $S_E$① and $S_A$② is memorized at C shift register UAC in the above order "stuffed to the right" and the part ⊔END[12]) among the letters denoted by $S_A$① is memorized in B shift register UAB and the part denoted as $S_A$② and the part succeeding it is memorized in A shift register UAA. Then, the state transition signal $C_{AB}$ occurs from the condition that up-down counter UDC is counting 0 and space appears at UA2 terminal, and the state is transferred to second round of $S_B$ or $S_B$②. At state $S_B$②, the part denoted by $S_B$ ② in Eq. (52) is conveyed to C shift register UAC from B shift register UAB in succession. Condition for state transition signal $C_{BC}$ is met at the moment when all of the letters denoted by $S_B$② enters in UAC making B shift register UAB empty and the state is then transferred to $S_C$② which is the $S_C$ occurring for the second time. At the beginning of $S_C$②, the letters shown in following Eq. (53) are memorized in C shift register UAC and the letters shown in following Eq. (54) are memorized in A shift register UAA.

$$T[1](S'[11](NP'[111]⫞J'(wa)NP'[113]⊔J'(o) \quad (53)$$

$$⊔VT'[112]⊔JD'(masu)⊔END'[12])$$

$$(54)$$

⫞NP[111](NPO'[111])  (NPO'[1111](watakushi[11111])

VT[112](hiki[1121])  NP[113](DET[1131]⫞NMT

[1132])  DET'[1131](sono[11311])  NMT[1132])piano

[11321])⫞END'[12]($o$[121])

The memory contents of C shift register UAC shown in Eq. (53) takes the shape in which first two tree structures in Eq. (53) are merged at the node of S'[11] into one tree structure. At the initial phase of $S_C$ ② one tree structure is memorized at C shift register UAC and remaining seven tree structures are situated in A shift register.

Through the first one circulation of signal in both A and B shift registers so far described, the merge is conducted at the node number [11] situated in the leftmost position in the second tree structure in Eq. (52). This node is, of course, the highest node in the second tree structure. At the next circulation of signal, merge is operated at the node NP'[111] which is situated at the left end of leftmost tree structure, between the tree structure in Eq. (54) and the tree structure written in Eq. (53). This operation is successively done until the tree structures given in FIG. 62 and shown in Eq. (52) are united to one tree structure. Then A shift register UAA becomes empty generating state transition signal $C_{E0}$ and completing the operation of this part SPC. At the moment, completion pulse appears at completion pulse output terminal UCT and output tree structure is sent out from C shift register UAC via tree structure output terminal USD. The output obtained from operation of this part based on the input structure shown in Eq. (52) is shown in FIG. 69 and expressed in following Eq. (55).

$$T[1](S'[11](NP[111](NPO'[1111](watakushi[11111])) \quad (55)$$
$$\sqcup J'(wa) \sqcup NP[113](DET'[1131](sono[11311]) \sqcup NMT$$
$$[1132](piano[11321])) \sqcup J'(o) \sqcup VT[112](hiki[1121])$$
$$\sqcup JD'(masu)) \sqcup END'[12](o[121]))$$

Figure 92A:
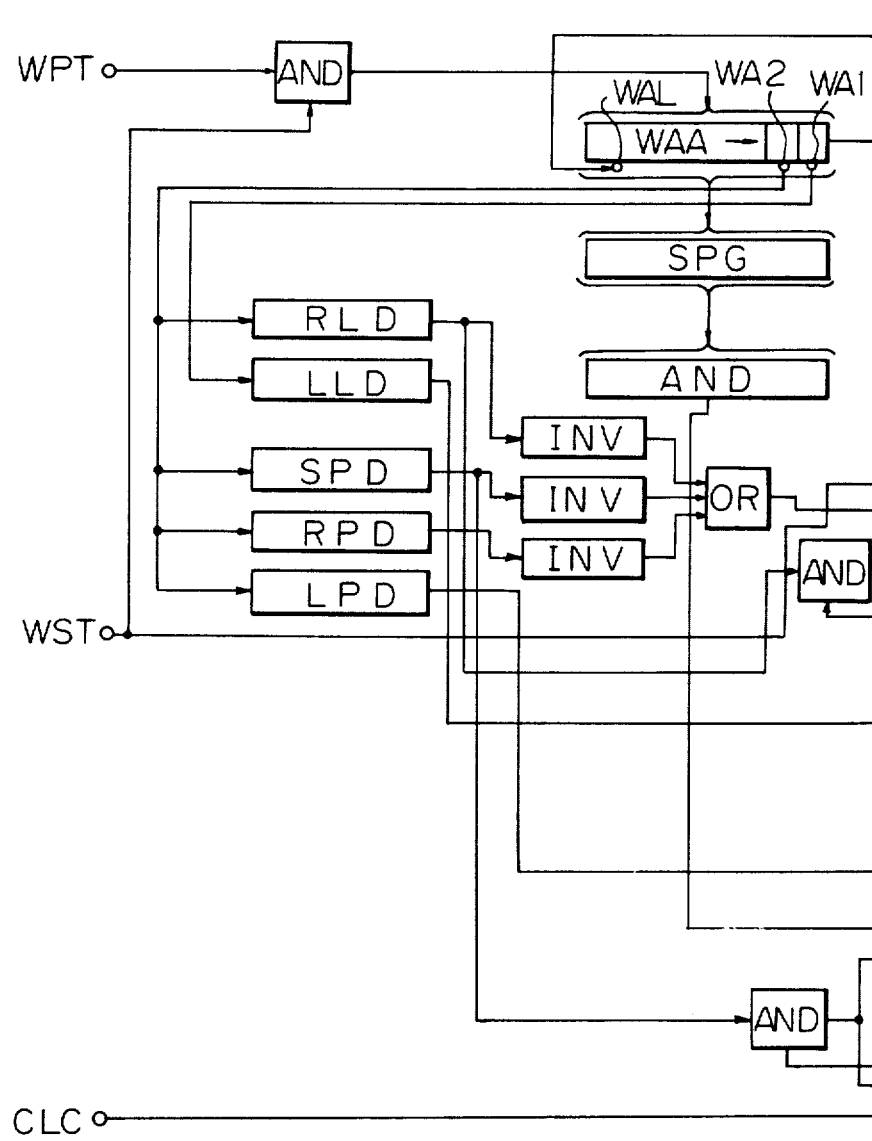
Figure 92B:
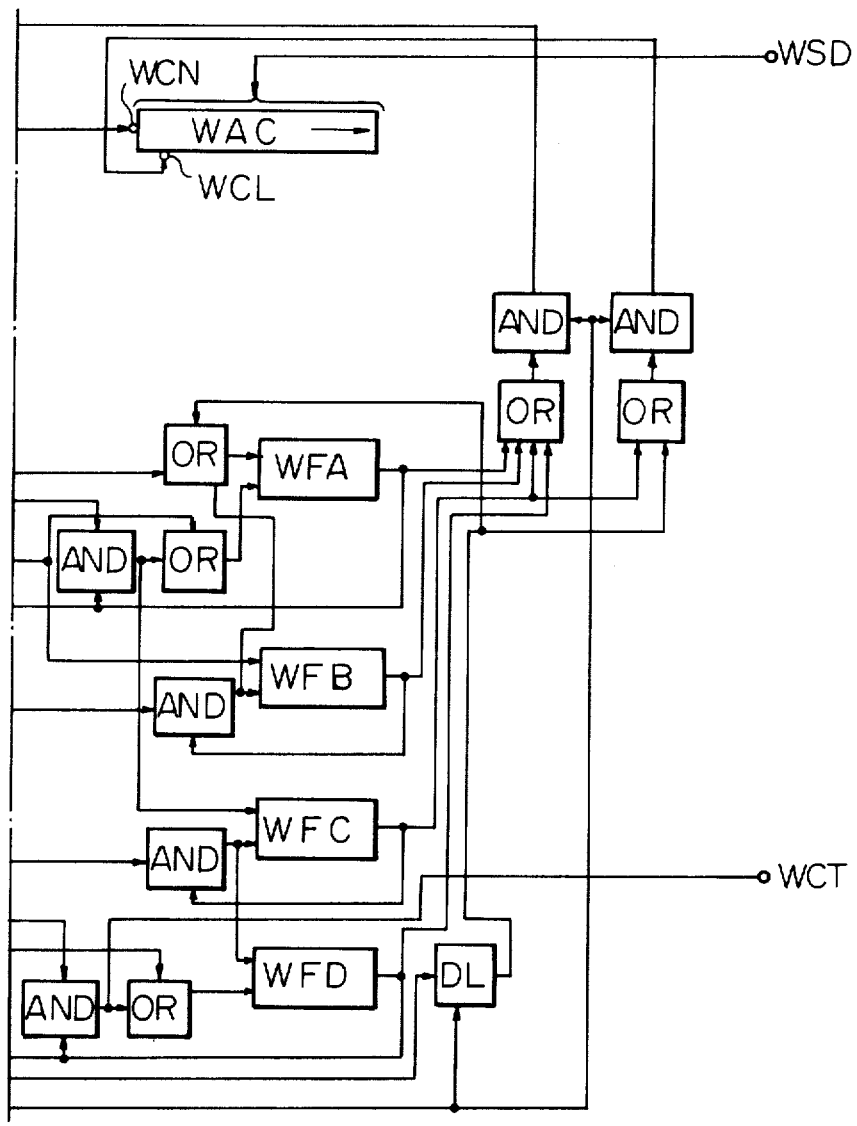

Next, the structure and operation of target language pattern linearizing part SPL is described. This part has the composition shown in FIG. 92. This part has three input terminals and two output terminals. Input terminals are constituted of clock terminal CLC, start pulse input terminal WST receiving the signal comprised of completion pulse of abovementioned output tree structure connecting part SPC which becomes to be start pulse of this part and tree structure input terminal WPT receiving tree structure information from above mentioned tree structure connecting part SPC. Output terminals of this part are completion pulse output terminal WCT to emit completion pulse indicating that operation of this part is completed and output terminal WSD to generate, finally, sentence of target language. WAA and WAC are A and C shift registers respectively and WAL and WCL are their clock terminals. WA1 and WA2 are first and second output terminals of A shift register WAA and WCN is input terminal of C shift register WAC. To the contrary to the all shift registers expressed so far, which have shifted their memory contents to the left every time clock pulse comes, shift registers dealt with here shift their memory contents to the right. As a consequence, output terminals in these two shift registers are numbered from the right beginning with rightmost stage, opposing to the method used so far in which output terminals are numbered from the left. So first output terminal WA1 of A shift register WAA is the output terminal of rightmost memory stage and of course input terminal WCN of shift register WAC is situated at the input terminal of the leftmost memory stage. WFA, WFB, WFC and WFD are A, B, C and D state flip-flops respectively.

Figure 93:
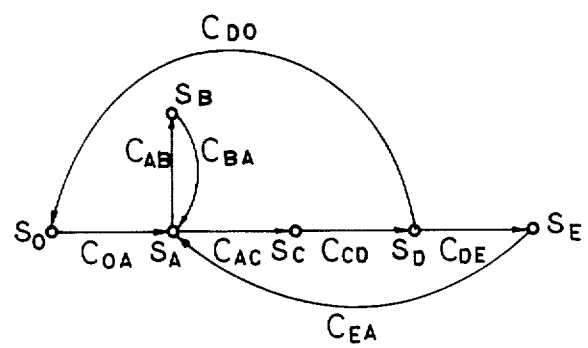
FIG. 93 is state diagram of target language pattern linearizing part SPL.

State diagram of target language pattern linearizing part SPL is shown in FIG. 93. This part has six states which are $S_0$, $S_A$, $S_B$, $S_C$, $S_D$ and $S_E$. $C_{0A}$, among state transition signals, is start pulse coming in via start pulse input terminal WST and then, input signal from tree structure input terminal WPT is introduced in A shift register WAA. $C_{AB}$ and $C_{BA}$ occur when right large parenthesis "]" is generated at WA2 terminal and when left large parenthesis "[" is generated at WA1 terminal respectively. $C_{AC}$ is generated when letter other than space "$\sqcup$", right parenthesis ")" or right large parenthesis "]" appears at WA2 terminal. $C_{DE}$ occurs when left parenthesis is generated at WA2 terminal. $C_{EA}$ is obtained when space appears at WA2 terminal. $C_{EA}$ is generated automatically by the effect of delay element, 1 clock interval after the making "off" of D state flip-flop WFD. $C_{D0}$ happens when A shift register WAA becomes empty. At the state $S_0$ this target language pattern linearizing part SPL is on idle condition. At state $S_A$ clock pulse is sent only to A shift register WAA and at the stage of $S_B$ also only WAA is clocked. The state $S_C$ is one where clock pulse is supplied to A shift register WAA and C shift register WAC and, as a consequence, output signal at first output terminal WA1 of A shift register WAA is read-in at input terminal WCN of C shift register WAC. At $S_D$ clock pulse is only fed to A shift register WAA. State $S_E$ aims to send the memory contents of WAC by one stage to the right by sending a clock pulse to C shift register WAC.

Now, operation of target language pattern linearizing part SPL will be described using the example formerly used at the description of output tree structure connecting part SPC. The input signal, for the case, was expressed by Eq. (55) which is reproduced here as Eq. (56). At the explanation of SPC, the states taken by SPC when the letters in following Eq. (56) are at the first output terminal WA1 of A shift register WAA, are indicated under the corresponding letters in Eq. (56).

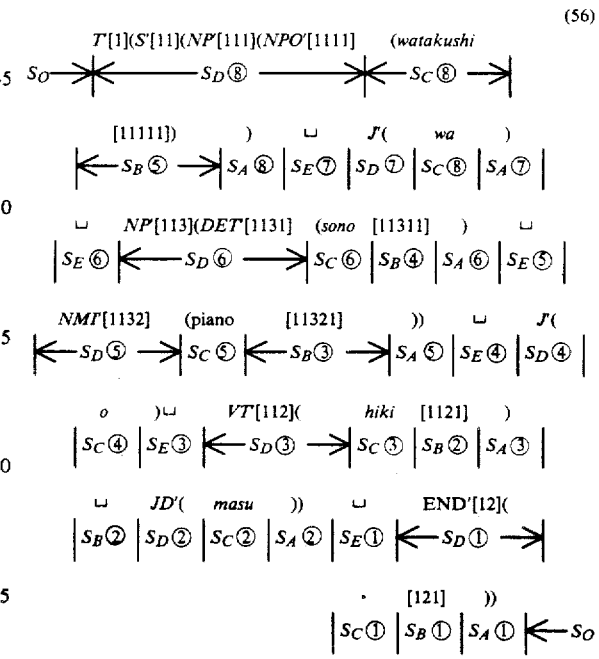

Numbers in the circles are of course the times of occurrence of the states. Only at the state $S_C$ the signal is introduced to C shift register WAC from A shift register WAA. And by the effect of state $S_E$, one space is added at the left of input signal to C shift register WAC. Resulting from above operation the target language (Japanese) sentence shown in following Eq. (57) is generated in C shift register WAC at the end of operation of this part.

$$Watakushi \sqcup wa \sqcup sono \sqcup piano \sqcup o \sqcup hiki \sqcup masu \qquad (57)$$

The description for structure and operation of composing parts in the system of this invention in FIG. 7 constituted by electronic circuit, is now completed. At the actual composition, the prime "'" in the output tree structure discriminating tree structure in target language is not utilized because no confusion occurs at the composition by electronic circuit. The prime "'" has been introduced only for explanation purposes. By the description made so far, it is found that the invention can be realized by electronic circuit and also by computer language designed to do the same operation. At the realization by electronic circuit, the input information to the system is S equation expression of source language like the structure shown in Eq. (15) and the output information is sentence in target language as is shown in Eq. (57). Description for this invention has been made for the example of English to Japanese translation, nevertheless, it can be applied to all languages analyzed into tree structure and can be applicable to nearly all pairs of language.

What is claimed is:

1. A machine translation system (FIG. 7) which generates sentences in target language using tree structure expression in source language comprising;

a pattern dictionary (PTD, FIG. 7) for storing a table of target language and source language, means (PPD, FIG. 7) having at least a first shift register (PPA) having source tree patterns from said pattern dictionary, a second shift register (PPB) having source tree which is to be translated, a coincidence detector (CSD) for comparing outputs of said first (PPA) and second (PPB) shift registers; for providing coincident pattern of patterns contained in the pattern dictionary and partial pattern of tree structure in source language including the topmost mode of said tree structure;

means (SDS, FIG. 7) for producing a pattern in said target language and an instruction to lower layer utilizing the information of information from instruction from upper layer, extraction information (EXG, FIG. 7), and production rule (stored in PRT, FIG. 7) peculiar to said coincident pattern;

means (INA, MPE, FIG. 7) having a first shift register (AAA) storing said instruction to lower layer, a second shift register (AAB) storing said tree structure, AND-OR logic means for coupling the output of said first shift register (AAA) to the output of said second shift register (AAB) to eliminate said coincident pattern;

means (SPC, FIG. 7) having a first shift register (UAA) storing separated partial target trees, a second arithmetic register (UAB) for performing operation to signal in said first shift register (UAA), and a third shift register (UAC) for storing the output of said second register (UAB), so as to produce a final target language tree which is connected to the result of said partial target tree through repeating said means (SPC) until the whole of said tree structure is eliminated; and means (SPL, FIG. 7) for receiving the output of said SPC means and generating final sentence in target language.

* * * * *